US011808854B2

(12) United States Patent
Hall et al.

(10) Patent No.: US 11,808,854 B2
(45) Date of Patent: Nov. 7, 2023

(54) MULTIPLE PIXEL SCANNING LIDAR

(71) Applicant: VELODYNE LIDAR USA, INC., San Jose, CA (US)

(72) Inventors: David S. Hall, San Jose, CA (US); Pieter J. Kerstens, Gilroy, CA (US); Mathew Noel Rekow, Santa Cruz, CA (US); Stephen S. Nestinger, Santa Clara, CA (US)

(73) Assignee: Velodyne Lidar USA, Inc., San Jose, CA (US)

( * ) Notice: Subject to any disclaimer, the term of this patent is extended or adjusted under 35 U.S.C. 154(b) by 0 days.

(21) Appl. No.: 16/546,131

(22) Filed: Aug. 20, 2019

(65) Prior Publication Data
US 2020/0142070 A1 May 7, 2020

Related U.S. Application Data

(63) Continuation of application No. 15/610,975, filed on Jun. 1, 2017, now Pat. No. 10,393,877.
(Continued)

(51) Int. Cl.
*G01S 17/89* (2020.01)
*G01S 7/481* (2006.01)
(Continued)

(52) U.S. Cl.
CPC ............... *G01S 17/89* (2013.01); *G01C 1/06* (2013.01); *G01C 3/08* (2013.01); *G01S 7/487* (2013.01);
(Continued)

(58) Field of Classification Search
CPC ........ G01S 17/89; G01S 17/87; G01S 7/4817; G01S 7/4815; G01S 7/487; G01S 17/10; G01C 3/08; G01C 1/06
(Continued)

(56) References Cited

U.S. PATENT DOCUMENTS 3,064,252 A    11/1962   Varela
3,373,441 A    3/1968    Zadig
(Continued)

FOREIGN PATENT DOCUMENTS

CA    2089105 A1    8/1994
CH    641583 A5     2/1984
(Continued)

OTHER PUBLICATIONS

Accetta et al., Active Electro-Optical Systems, The Infrared and Electro-Optical Systems Handbook (1993, ed. by Clifton Fox), pp. 3-76. (IPR Nos. '255 and '256 Exhibit 2158).
(Continued)

*Primary Examiner* — Daniel L Murphy
(74) *Attorney, Agent, or Firm* — Kilpatrick Townsend & Stockton LLP

(57) ABSTRACT

Methods and systems for performing three-dimensional (3-D) LIDAR measurements with multiple illumination beams scanned over a 3-D environment are described herein. In one aspect, illumination light from each LIDAR measurement channel is emitted to the surrounding environment in a different direction by a beam scanning device. The beam scanning device also directs each amount of return measurement light onto a corresponding photodetector. In some embodiments, a beam scanning device includes a scanning mirror rotated in an oscillatory manner about an axis of rotation by an actuator in accordance with command signals generated by a master controller. In some embodiments, the light source and photodetector associated with each LIDAR measurement channel are moved in two dimensions relative to beam shaping optics employed to collimate light emitted from the light source. The relative motion causes the illumination beams to sweep over a range of the 3-D environment under measurement.

25 Claims, 10 Drawing Sheets

Related U.S. Application Data

(60) Provisional application No. 62/344,259, filed on Jun. 1, 2016.

(51) Int. Cl.
| | |
|---|---|
| *G01S 17/10* | (2020.01) |
| *G01C 3/08* | (2006.01) |
| *G01C 1/06* | (2006.01) |
| *G01S 7/487* | (2006.01) |
| *G01S 17/87* | (2020.01) |

(52) U.S. Cl.
CPC .......... *G01S 7/4815* (2013.01); *G01S 7/4817* (2013.01); *G01S 17/10* (2013.01); *G01S 17/87* (2013.01)

(58) Field of Classification Search
USPC ........................................................ 356/5.01
See application file for complete search history.

(56) References Cited

U.S. PATENT DOCUMENTS

| | | |
|---|---|---|
| 3,551,845 A | 12/1970 | Zelina |
| 3,636,250 A | 1/1972 | Haeff |
| 3,686,514 A | 8/1972 | Dube et al. |
| 3,781,111 A | 12/1973 | Fletcher et al. |
| 3,862,415 A | 1/1975 | Harnden, Jr. et al. |
| 3,897,150 A | 7/1975 | Bridges et al. |
| 3,921,081 A | 11/1975 | Lane |
| 4,179,216 A | 12/1979 | Theurer et al. |
| 4,199,697 A | 4/1980 | Edwards |
| 4,201,442 A | 5/1980 | McMahon et al. |
| 4,212,534 A | 7/1980 | Bodlaj |
| 4,220,103 A | 9/1980 | Kasahara et al. |
| 4,477,184 A | 10/1984 | Endo |
| 4,516,837 A | 5/1985 | Soref et al. |
| 4,634,272 A | 1/1987 | Endo |
| 4,656,462 A | 4/1987 | Araki et al. |
| 4,681,433 A | 7/1987 | Aeschlimann |
| 4,700,301 A | 10/1987 | Dyke |
| 4,730,932 A | 3/1988 | Iga et al. |
| 4,742,337 A | 5/1988 | Haag |
| 4,834,531 A | 5/1989 | Ward |
| 4,862,257 A | 8/1989 | Ulich |
| 4,895,440 A | 1/1990 | Cain et al. |
| 4,896,343 A | 1/1990 | Saunders |
| 4,902,126 A | 2/1990 | Koechner |
| 4,944,036 A | 7/1990 | Hyatt |
| 4,952,911 A | 8/1990 | D'Ambrosia et al. |
| 4,967,183 A | 10/1990 | D'Ambrosia et al. |
| 5,004,916 A | 4/1991 | Collins, Jr. |
| 5,006,721 A | 4/1991 | Cameron et al. |
| 5,023,888 A | 6/1991 | Bayston |
| 5,026,156 A | 6/1991 | Bayston et al. |
| 5,033,819 A | 7/1991 | Tanaka |
| 5,059,008 A | 10/1991 | Flood et al. |
| 5,175,694 A | 12/1992 | Amato |
| 5,177,768 A | 1/1993 | Crespo et al. |
| 5,210,586 A | 5/1993 | Grage et al. |
| 5,212,533 A | 5/1993 | Shibuya et al. |
| 5,233,367 A | 8/1993 | Curry |
| 5,241,481 A | 8/1993 | Olsen |
| 5,249,157 A | 9/1993 | Taylor |
| 5,291,261 A | 3/1994 | Dahl et al. |
| 5,309,212 A | 5/1994 | Clark |
| 5,314,037 A | 5/1994 | Shaw et al. |
| 5,319,201 A | 6/1994 | Lee |
| 5,357,331 A | 10/1994 | Flockencier |
| 5,365,218 A | 11/1994 | Otto |
| 5,463,384 A | 10/1995 | Juds |
| 5,465,142 A | 11/1995 | Krumes et al. |
| 5,515,156 A | 5/1996 | Yoshida et al. |
| 5,546,188 A | 8/1996 | Wangler et al. |
| 5,563,706 A | 10/1996 | Shibuya et al. |
| 5,572,219 A | 11/1996 | Silverstein et al. |
| 5,691,687 A | 11/1997 | Kumagai et al. |
| 5,710,417 A | 1/1998 | Joseph et al. |
| 5,757,472 A | 5/1998 | Wangler et al. |
| 5,757,501 A | 5/1998 | Hipp |
| 5,757,677 A | 5/1998 | Lennen |
| 5,789,739 A | 8/1998 | Schwarz |
| 5,793,163 A | 8/1998 | Okuda |
| 5,793,491 A | 8/1998 | Wangler et al. |
| 5,805,468 A | 9/1998 | Blohbaum |
| 5,847,815 A | 12/1998 | Albouy et al. |
| 5,847,817 A | 12/1998 | Zediker et al. |
| 5,877,688 A | 3/1999 | Morinaka et al. |
| 5,889,479 A | 3/1999 | Tabel |
| 5,895,984 A | 4/1999 | Renz |
| 5,903,355 A | 5/1999 | Schwarz |
| 5,903,386 A | 5/1999 | Mantravadi et al. |
| 5,923,910 A | 7/1999 | Nakahara et al. |
| 5,942,688 A | 8/1999 | Kimura et al. |
| 5,949,530 A | 9/1999 | Wetteborn |
| 5,953,110 A | 9/1999 | Burns |
| 5,991,011 A | 11/1999 | Damm |
| 6,034,803 A | 3/2000 | Sullivan et al. |
| 6,043,868 A | 3/2000 | Dunne |
| 6,069,565 A | 5/2000 | Stern et al. |
| 6,088,085 A | 7/2000 | Wetteborn |
| 6,091,071 A | 7/2000 | Franz et al. |
| 6,100,539 A | 8/2000 | Blumcke et al. |
| 6,137,566 A | 10/2000 | Leonard et al. |
| 6,153,878 A | 11/2000 | Jakob et al. |
| 6,157,294 A | 12/2000 | Urai et al. |
| 6,201,236 B1 | 3/2001 | Juds |
| 6,259,714 B1 | 7/2001 | Kinbara |
| 6,297,844 B1 | 10/2001 | Schatz et al. |
| 6,321,172 B1 | 11/2001 | Jakob et al. |
| 6,327,806 B1 | 12/2001 | Paige |
| 6,329,800 B1 | 12/2001 | May |
| 6,335,789 B1 | 1/2002 | Kikuchi |
| 6,365,429 B1 | 4/2002 | Kneissl et al. |
| 6,396,577 B1 | 5/2002 | Ramstack |
| 6,420,698 B1 | 7/2002 | Dimsdale |
| 6,441,363 B1 | 8/2002 | Cook, Jr. et al. |
| 6,441,889 B1 | 8/2002 | Patterson |
| 6,442,476 B1 | 8/2002 | Poropat |
| 6,473,079 B1 | 10/2002 | Kacyra et al. |
| 6,504,712 B2 | 1/2003 | Hashimoto et al. |
| 6,509,958 B2 | 1/2003 | Pierenkemper |
| 6,593,582 B2 | 7/2003 | Lee et al. |
| 6,621,764 B1 | 9/2003 | Smith |
| 6,636,300 B2 | 10/2003 | Doemens et al. |
| 6,646,725 B1 | 11/2003 | Eichinger et al. |
| 6,650,402 B2 | 11/2003 | Sullivan et al. |
| 6,664,529 B2 | 12/2003 | Pack et al. |
| 6,665,063 B2 | 12/2003 | Jamieson et al. |
| 6,670,905 B1 | 12/2003 | Orr |
| 6,682,478 B2 | 1/2004 | Nakamura |
| 6,687,373 B1 | 2/2004 | Yeh et al. |
| 6,710,324 B2 | 3/2004 | Hipp |
| 6,742,707 B1 | 6/2004 | Tsikos et al. |
| 6,747,747 B2 | 6/2004 | Hipp |
| 6,759,649 B2 | 7/2004 | Hipp |
| 6,789,527 B2 | 9/2004 | Sauler et al. |
| 6,798,527 B2 | 9/2004 | Fukumoto et al. |
| 6,812,450 B2 | 11/2004 | Hipp |
| 6,839,042 B2 | 1/2005 | Conemac et al. |
| 6,876,790 B2 | 4/2005 | Lee |
| 6,879,419 B2 | 4/2005 | Richman et al. |
| 6,969,558 B2 | 11/2005 | Walston et al. |
| 7,030,968 B2 | 4/2006 | D'Aligny et al. |
| 7,041,962 B2 | 5/2006 | Dollmann et al. |
| 7,089,114 B1 | 8/2006 | Huang |
| 7,106,424 B2 | 9/2006 | Meneely et al. |
| 7,129,971 B2 | 10/2006 | McCutchen |
| 7,130,672 B2 | 10/2006 | Pewzner et al. |
| 7,131,586 B2 | 11/2006 | Tsikos et al. |
| 7,190,465 B2 | 3/2007 | Froehlich et al. |
| 7,240,314 B1 | 7/2007 | Leung |
| 7,248,342 B1 | 7/2007 | Degnan |
| 7,281,891 B2 | 10/2007 | Smith et al. |

(56) References Cited

U.S. PATENT DOCUMENTS

| | | |
|---|---|---|
| 7,295,298 B2 | 11/2007 | Willhoeft et al. |
| 7,313,424 B2 | 12/2007 | Mayevsky et al. |
| 7,315,377 B2 | 1/2008 | Holland et al. |
| 7,319,777 B2 | 1/2008 | Morcom |
| 7,345,271 B2 | 3/2008 | Boehlau et al. |
| 7,358,819 B2 | 4/2008 | Rollins |
| 7,373,473 B2 | 5/2008 | Bukowski et al. |
| 7,408,462 B2 | 8/2008 | Pirkl et al. |
| 7,477,360 B2 | 1/2009 | England et al. |
| 7,480,031 B2 | 1/2009 | Mack |
| 7,544,945 B2 | 6/2009 | Tan et al. |
| 7,570,793 B2 | 8/2009 | Lages et al. |
| 7,583,364 B1 | 9/2009 | Mayor et al. |
| 7,589,826 B2 | 9/2009 | Mack et al. |
| 7,619,477 B2 | 11/2009 | Segarra |
| 7,623,222 B2 | 11/2009 | Benz et al. |
| 7,640,068 B2 | 12/2009 | Johnson et al. |
| 7,642,946 B2 | 1/2010 | Wong et al. |
| 7,684,590 B2 | 3/2010 | Kampchen et al. |
| 7,697,581 B2 | 4/2010 | Walsh et al. |
| 7,741,618 B2 | 6/2010 | Lee et al. |
| 7,746,271 B2 | 6/2010 | Furstenberg |
| 7,868,665 B2 | 1/2011 | Tumer et al. |
| 7,944,548 B2 | 5/2011 | Eaton |
| 7,969,558 B2 * | 6/2011 | Hall ................. G01S 7/4811 356/5.01 |
| 8,042,056 B2 | 10/2011 | Wheeler et al. |
| 8,072,582 B2 | 12/2011 | Meneely |
| 8,077,047 B2 | 12/2011 | Humble et al. |
| 8,107,056 B1 | 1/2012 | Riza |
| 8,139,685 B2 | 3/2012 | Simic et al. |
| 8,203,702 B1 | 6/2012 | Kane et al. |
| 8,274,037 B2 | 9/2012 | Ritter et al. |
| 8,310,653 B2 | 11/2012 | Ogawa et al. |
| 8,451,432 B2 | 5/2013 | Crawford et al. |
| 8,605,262 B2 | 12/2013 | Campbell et al. |
| 8,675,181 B2 | 3/2014 | Hall |
| 8,736,818 B2 | 5/2014 | Weimer et al. |
| 8,767,190 B2 | 7/2014 | Hall |
| 8,797,623 B2 | 8/2014 | Weiss et al. |
| 8,875,409 B2 | 11/2014 | Kretschmer et al. |
| 8,976,340 B2 | 3/2015 | Gilliland et al. |
| 8,995,478 B1 | 3/2015 | Kobtsev et al. |
| 9,059,562 B2 | 6/2015 | Priest et al. |
| 9,063,549 B1 | 6/2015 | Pennecot et al. |
| 9,069,061 B1 | 6/2015 | Harwit |
| 9,069,080 B2 | 6/2015 | Stettner et al. |
| 9,086,273 B1 | 7/2015 | Gruver et al. |
| 9,093,969 B2 | 7/2015 | Gebeyehu et al. |
| 9,110,154 B1 | 8/2015 | Bates et al. |
| 9,128,190 B1 | 9/2015 | Ulrich et al. |
| 9,151,940 B2 | 10/2015 | Chuang et al. |
| 9,191,260 B1 | 11/2015 | Grund |
| 9,194,701 B2 | 11/2015 | Bosch |
| RE45,854 E | 1/2016 | Gittinger et al. |
| 9,239,959 B1 | 1/2016 | Evans et al. |
| 9,246,041 B1 | 1/2016 | Clausen et al. |
| 9,250,327 B2 | 2/2016 | Kelley et al. |
| 9,285,477 B1 | 3/2016 | Smith et al. |
| 9,286,538 B1 | 3/2016 | Chen et al. |
| 9,310,197 B2 | 4/2016 | Gogolla et al. |
| 9,383,753 B1 | 7/2016 | Templeton et al. |
| 9,453,914 B2 | 9/2016 | Stettner et al. |
| 9,529,079 B1 | 12/2016 | Droz et al. |
| 9,735,885 B1 | 8/2017 | Sayyah et al. |
| 9,772,607 B2 | 9/2017 | Decoux et al. |
| RE46,672 E | 1/2018 | Hall |
| 9,964,632 B1 | 5/2018 | Droz et al. |
| 9,983,297 B2 | 5/2018 | Hall et al. |
| 9,989,629 B1 | 6/2018 | LaChapelle |
| 10,003,168 B1 | 6/2018 | Villeneuve |
| 10,018,726 B2 | 7/2018 | Hall et al. |
| 10,048,374 B2 | 8/2018 | Hall et al. |
| 10,094,925 B1 | 10/2018 | LaChapelle |
| 10,109,183 B1 | 10/2018 | Franz et al. |
| 10,120,079 B2 | 11/2018 | Pennecot et al. |
| 10,126,412 B2 | 11/2018 | Eldada et al. |
| 10,132,928 B2 | 11/2018 | Eldada et al. |
| 10,244,187 B2 * | 3/2019 | Stettner ............... H04N 13/239 |
| 10,309,213 B2 | 6/2019 | Barfoot et al. |
| 10,330,780 B2 | 6/2019 | Hall et al. |
| 10,386,465 B2 | 8/2019 | Hall et al. |
| 10,393,874 B2 | 8/2019 | Schmidtke et al. |
| 10,393,877 B2 | 8/2019 | Hall et al. |
| 10,436,904 B2 | 10/2019 | Moss et al. |
| 10,545,222 B2 | 1/2020 | Hall et al. |
| RE47,942 E | 4/2020 | Hall |
| 10,613,203 B1 | 4/2020 | Rekow et al. |
| 10,627,490 B2 | 4/2020 | Hall et al. |
| 10,627,491 B2 | 4/2020 | Hall et al. |
| 10,712,434 B2 | 7/2020 | Hall et al. |
| 10,754,034 B1 | 8/2020 | Chamberlain et al. |
| 10,782,392 B2 | 9/2020 | Ishikawa et al. |
| 10,983,218 B2 | 4/2021 | Hall et al. |
| 11,137,480 B2 | 10/2021 | Hall et al. |
| 2001/0011289 A1 | 8/2001 | Davis et al. |
| 2001/0017718 A1 | 8/2001 | Ikeda et al. |
| 2002/0003617 A1 | 1/2002 | Doemens et al. |
| 2002/0060784 A1 | 5/2002 | Pack et al. |
| 2002/0117545 A1 | 8/2002 | Tsikos et al. |
| 2002/0175294 A1 | 11/2002 | Lee et al. |
| 2003/0041079 A1 | 2/2003 | Bellemore et al. |
| 2003/0043363 A1 | 3/2003 | Jamieson et al. |
| 2003/0043364 A1 | 3/2003 | Jamieson et al. |
| 2003/0057533 A1 | 3/2003 | Lemmi et al. |
| 2003/0066977 A1 | 4/2003 | Hipp et al. |
| 2003/0076485 A1 | 4/2003 | Ruff et al. |
| 2003/0090646 A1 | 5/2003 | Riegl et al. |
| 2003/0163030 A1 | 8/2003 | Arriaga |
| 2004/0021852 A1 | 2/2004 | DeFlumere |
| 2004/0066500 A1 | 4/2004 | Gokturk et al. |
| 2004/0134879 A1 | 7/2004 | Kochergin et al. |
| 2004/0150810 A1 | 8/2004 | Muenter et al. |
| 2004/0213463 A1 | 10/2004 | Morrison |
| 2004/0240706 A1 | 12/2004 | Wallace et al. |
| 2004/0240710 A1 | 12/2004 | Lages et al. |
| 2004/0247157 A1 | 12/2004 | Lages et al. |
| 2005/0023353 A1 | 2/2005 | Tsikos et al. |
| 2005/0168720 A1 | 8/2005 | Yamashita et al. |
| 2005/0211893 A1 | 9/2005 | Paschalidis |
| 2005/0232466 A1 | 10/2005 | Kampchen et al. |
| 2005/0246065 A1 | 11/2005 | Ricard |
| 2005/0248749 A1 | 11/2005 | Kiehn et al. |
| 2005/0279914 A1 | 12/2005 | Dimsdale et al. |
| 2006/0007350 A1 | 1/2006 | Gao et al. |
| 2006/0073621 A1 | 4/2006 | Kneissel et al. |
| 2006/0089765 A1 | 4/2006 | Pack et al. |
| 2006/0100783 A1 | 5/2006 | Haberer et al. |
| 2006/0115113 A1 | 6/2006 | Lages et al. |
| 2006/0132635 A1 | 6/2006 | Land |
| 2006/0176697 A1 | 8/2006 | Arruda |
| 2006/0186326 A1 | 8/2006 | Ito |
| 2006/0197867 A1 | 9/2006 | Johnson et al. |
| 2006/0231771 A1 | 10/2006 | Lee et al. |
| 2006/0290920 A1 | 12/2006 | Kampchen et al. |
| 2007/0035624 A1 | 2/2007 | Lubard et al. |
| 2007/0071056 A1 | 3/2007 | Chen |
| 2007/0121095 A1 | 5/2007 | Lewis |
| 2007/0181810 A1 | 8/2007 | Tan et al. |
| 2007/0201027 A1 | 8/2007 | Doushkina et al. |
| 2007/0219720 A1 | 9/2007 | Trepagnier et al. |
| 2007/0241955 A1 | 10/2007 | Brosche |
| 2007/0272841 A1 * | 11/2007 | Wiklof ................... G06K 9/20 250/234 |
| 2008/0002176 A1 | 1/2008 | Krasutsky |
| 2008/0013896 A1 | 1/2008 | Salzberg et al. |
| 2008/0074640 A1 | 3/2008 | Walsh et al. |
| 2008/0079371 A1 | 4/2008 | Kang et al. |
| 2008/0154495 A1 | 6/2008 | Breed |
| 2008/0170826 A1 | 7/2008 | Schaafsma |
| 2008/0186501 A1 | 8/2008 | Xie |
| 2008/0302971 A1 | 12/2008 | Hyde et al. |
| 2009/0010644 A1 | 1/2009 | Varshneya et al. |
| 2009/0026503 A1 | 1/2009 | Tsuda |

(56) References Cited

U.S. PATENT DOCUMENTS

| | | |
|---|---|---|
| 2009/0085901 A1 | 4/2009 | Antony |
| 2009/0122295 A1 | 5/2009 | Eaton |
| 2009/0142053 A1 | 6/2009 | Varshneya et al. |
| 2009/0168045 A1 | 7/2009 | Lin et al. |
| 2009/0218475 A1 | 9/2009 | Kawakami et al. |
| 2009/0245788 A1 | 10/2009 | Varshneya et al. |
| 2009/0299633 A1* | 12/2009 | Hawes ............... B60R 21/0134 |
| | | 701/300 |
| 2009/0323737 A1 | 12/2009 | Ensher et al. |
| 2010/0006760 A1 | 1/2010 | Lee et al. |
| 2010/0020306 A1 | 1/2010 | Hall |
| 2010/0045965 A1 | 2/2010 | Meneely |
| 2010/0046953 A1* | 2/2010 | Shaw ..................... H01S 5/423 |
| | | 398/115 |
| 2010/0067070 A1 | 3/2010 | Mamada et al. |
| 2010/0073780 A1 | 3/2010 | Ito |
| 2010/0074532 A1 | 3/2010 | Gordon et al. |
| 2010/0134596 A1 | 6/2010 | Becker |
| 2010/0188722 A1 | 7/2010 | Yamada et al. |
| 2010/0198487 A1 | 8/2010 | Vollmer et al. |
| 2010/0204964 A1 | 8/2010 | Pack et al. |
| 2010/0239139 A1 | 9/2010 | Hunt et al. |
| 2010/0258708 A1 | 10/2010 | Meyers et al. |
| 2010/0265077 A1 | 10/2010 | Humble et al. |
| 2010/0271615 A1 | 10/2010 | Sebastian et al. |
| 2010/0302528 A1 | 12/2010 | Hall |
| 2011/0028859 A1 | 2/2011 | Chian |
| 2011/0040482 A1 | 2/2011 | Brimble et al. |
| 2011/0176183 A1 | 7/2011 | Ikeda et al. |
| 2011/0211188 A1 | 9/2011 | Juenemann et al. |
| 2011/0216304 A1 | 9/2011 | Hall |
| 2011/0228068 A1 | 9/2011 | Park |
| 2011/0228073 A1 | 9/2011 | Lee et al. |
| 2011/0235018 A1 | 9/2011 | Mori et al. |
| 2011/0305250 A1 | 12/2011 | Chann et al. |
| 2012/0038903 A1 | 2/2012 | Weimer et al. |
| 2012/0195597 A1 | 8/2012 | Malaney |
| 2012/0287417 A1 | 11/2012 | Mimeault |
| 2013/0024176 A2 | 1/2013 | Woodford |
| 2013/0038915 A1 | 2/2013 | Kusaka et al. |
| 2013/0050144 A1 | 2/2013 | Reynolds |
| 2013/0050486 A1 | 2/2013 | Omer et al. |
| 2013/0070239 A1 | 3/2013 | Crawford et al. |
| 2013/0093583 A1 | 4/2013 | Shapiro |
| 2013/0094960 A1 | 4/2013 | Bowyer et al. |
| 2013/0151198 A1 | 6/2013 | Brown |
| 2013/0168673 A1 | 7/2013 | Yu et al. |
| 2013/0206967 A1 | 8/2013 | Shpunt et al. |
| 2013/0207970 A1 | 8/2013 | Shpunt et al. |
| 2013/0241761 A1* | 9/2013 | Cooper .................. G01S 17/42 |
| | | 342/54 |
| 2013/0242283 A1 | 9/2013 | Bailey et al. |
| 2013/0258312 A1 | 10/2013 | Lewis |
| 2013/0286404 A1 | 10/2013 | Cenko et al. |
| 2013/0300479 A1 | 11/2013 | Thibault |
| 2013/0314711 A1 | 11/2013 | Cantin et al. |
| 2013/0336375 A1 | 12/2013 | Ranki et al. |
| 2013/0342366 A1 | 12/2013 | Kiefer et al. |
| 2014/0043309 A1 | 2/2014 | Go et al. |
| 2014/0063189 A1* | 3/2014 | Zheleznyak ............ G06T 7/521 |
| | | 348/46 |
| 2014/0063483 A1 | 3/2014 | Li |
| 2014/0071234 A1 | 3/2014 | Millett |
| 2014/0078519 A1 | 3/2014 | Steffey et al. |
| 2014/0104592 A1 | 4/2014 | Tien et al. |
| 2014/0176657 A1 | 6/2014 | Nemoto |
| 2014/0240317 A1 | 8/2014 | Go et al. |
| 2014/0240721 A1 | 8/2014 | Herschbach |
| 2014/0253369 A1 | 9/2014 | Kelley et al. |
| 2014/0259715 A1 | 9/2014 | Engel |
| 2014/0267848 A1 | 9/2014 | Wu |
| 2014/0274093 A1 | 9/2014 | Abdelmonem |
| 2014/0293263 A1 | 10/2014 | Justice et al. |
| 2014/0347650 A1 | 11/2014 | Bosch |
| 2015/0002852 A1 | 1/2015 | de Groot et al. |
| 2015/0015895 A1 | 1/2015 | Bridges et al. |
| 2015/0035437 A1 | 2/2015 | Panopoulos et al. |
| 2015/0055117 A1 | 2/2015 | Pennecot et al. |
| 2015/0101234 A1 | 4/2015 | Priest et al. |
| 2015/0116695 A1 | 4/2015 | Bartolome et al. |
| 2015/0131080 A1 | 5/2015 | Retterath et al. |
| 2015/0144806 A1 | 5/2015 | Jin et al. |
| 2015/0185325 A1 | 7/2015 | Park et al. |
| 2015/0202939 A1 | 7/2015 | Stettner et al. |
| 2015/0219764 A1 | 8/2015 | Lipson |
| 2015/0219765 A1 | 8/2015 | Mead et al. |
| 2015/0226853 A1 | 8/2015 | Seo et al. |
| 2015/0260843 A1 | 9/2015 | Lewis |
| 2015/0293224 A1 | 10/2015 | Eldada et al. |
| 2015/0293228 A1 | 10/2015 | Retterath et al. |
| 2015/0303216 A1 | 10/2015 | Tamaru |
| 2015/0316368 A1 | 11/2015 | Moench et al. |
| 2015/0346325 A1 | 12/2015 | Giacotto et al. |
| 2016/0003946 A1 | 1/2016 | Gilliland et al. |
| 2016/0009410 A1 | 1/2016 | Derenick et al. |
| 2016/0014309 A1 | 1/2016 | Ellison et al. |
| 2016/0021713 A1 | 1/2016 | Reed |
| 2016/0041266 A1* | 2/2016 | Smits ...................... G01S 7/497 |
| | | 356/5.01 |
| 2016/0049058 A1 | 2/2016 | Allen et al. |
| 2016/0098620 A1 | 4/2016 | Geile |
| 2016/0117431 A1 | 4/2016 | Kim et al. |
| 2016/0154105 A1 | 6/2016 | Sigmund et al. |
| 2016/0161600 A1 | 6/2016 | Eldada et al. |
| 2016/0191173 A1 | 6/2016 | Malaney |
| 2016/0209499 A1 | 7/2016 | Suzuki |
| 2016/0210487 A1 | 7/2016 | Jiang |
| 2016/0245919 A1 | 8/2016 | Kalscheur et al. |
| 2016/0259038 A1 | 9/2016 | Retterath et al. |
| 2016/0279808 A1 | 9/2016 | Doughty et al. |
| 2016/0300484 A1 | 10/2016 | Torbett |
| 2016/0306032 A1 | 10/2016 | Schwarz et al. |
| 2016/0313445 A1 | 10/2016 | Bailey et al. |
| 2016/0327646 A1 | 11/2016 | Scheim et al. |
| 2016/0345820 A1 | 12/2016 | Frisken et al. |
| 2016/0363659 A1 | 12/2016 | Mindell et al. |
| 2016/0365846 A1 | 12/2016 | Wyland |
| 2017/0026633 A1 | 1/2017 | Riza |
| 2017/0146639 A1 | 5/2017 | Carothers |
| 2017/0146640 A1 | 5/2017 | Hall et al. |
| 2017/0153319 A1 | 6/2017 | Villeneuve et al. |
| 2017/0214861 A1 | 7/2017 | Rachlin et al. |
| 2017/0219695 A1 | 8/2017 | Hall et al. |
| 2017/0219713 A1 | 8/2017 | Gruver et al. |
| 2017/0220876 A1 | 8/2017 | Gao et al. |
| 2017/0242102 A1 | 8/2017 | Dussan et al. |
| 2017/0269198 A1 | 9/2017 | Hall et al. |
| 2017/0269209 A1 | 9/2017 | Hall et al. |
| 2017/0269215 A1 | 9/2017 | Hall et al. |
| 2017/0299721 A1 | 10/2017 | Eichenholz et al. |
| 2017/0307736 A1 | 10/2017 | Donovan |
| 2017/0329010 A1 | 11/2017 | Warke et al. |
| 2017/0350983 A1 | 12/2017 | Hall et al. |
| 2018/0019155 A1 | 1/2018 | Tsang et al. |
| 2018/0058197 A1 | 3/2018 | Barfoot et al. |
| 2018/0059219 A1 | 3/2018 | Irish et al. |
| 2018/0074382 A1 | 3/2018 | Lee et al. |
| 2018/0081041 A1 | 3/2018 | Niclass et al. |
| 2018/0100924 A1 | 4/2018 | Brinkmeyer |
| 2018/0106902 A1 | 4/2018 | Mase et al. |
| 2018/0131449 A1 | 5/2018 | Kare et al. |
| 2018/0168539 A1 | 6/2018 | Singh et al. |
| 2018/0267151 A1 | 9/2018 | Hall et al. |
| 2018/0275249 A1 | 9/2018 | Campbell et al. |
| 2018/0284227 A1 | 10/2018 | Hall et al. |
| 2018/0284274 A1 | 10/2018 | LaChapelle |
| 2018/0321360 A1 | 11/2018 | Hall et al. |
| 2018/0364098 A1 | 12/2018 | McDaniel et al. |
| 2019/0001442 A1 | 1/2019 | Unrath et al. |
| 2019/0011563 A1 | 1/2019 | Hall et al. |
| 2019/0178991 A1 | 6/2019 | Hall et al. |
| 2019/0293764 A1 | 9/2019 | Van Nieuwenhove et al. |
| 2019/0339365 A1 | 11/2019 | Hall et al. |
| 2019/0361092 A1 | 11/2019 | Hall et al. |

(56) References Cited

U.S. PATENT DOCUMENTS

| | | | |
|---|---|---|---|
| 2019/0369257 A1 | 12/2019 | Hall et al. |
| 2019/0369258 A1 | 12/2019 | Hall et al. |
| 2020/0025879 A1 | 1/2020 | Pacala et al. |
| 2020/0025896 A1 | 1/2020 | Gunnam |
| 2020/0064452 A1 | 2/2020 | Avlas et al. |
| 2020/0142070 A1 | 5/2020 | Hall et al. |
| 2020/0144971 A1 | 5/2020 | Pinto et al. |
| 2020/0166613 A1 | 5/2020 | Hall et al. |
| 2020/0191915 A1 | 6/2020 | Hall et al. |
| 2020/0249321 A1 | 8/2020 | Hall et al. |
| 2020/0319311 A1 | 10/2020 | Hall et al. |
| 2020/0319343 A1 | 10/2020 | Hall et al. |

FOREIGN PATENT DOCUMENTS

| | | | |
|---|---|---|---|
| CN | 1106534 | A | 8/1995 |
| CN | 1576123 | A | 2/2005 |
| CN | 2681085 | Y | 2/2005 |
| CN | 2773714 | Y | 4/2006 |
| CN | 103278808 | B | 12/2015 |
| CN | 107037444 | A | 8/2017 |
| CN | 206773192 | U | 12/2017 |
| CN | 108061884 | A | 5/2018 |
| CN | 207457499 | U | 6/2018 |
| CN | 207457508 | U | 6/2018 |
| CN | 109116367 | A | 1/2019 |
| CN | 106443699 | B | 2/2019 |
| CN | 106597471 | B | 5/2019 |
| CN | 208902906 | U | 5/2019 |
| DE | 930909 | C | 7/1955 |
| DE | 3134815 | A1 | 3/1983 |
| DE | 3216312 | A1 | 11/1983 |
| DE | 3216313 | A1 | 11/1983 |
| DE | 3701340 | A1 | 7/1988 |
| DE | 3741259 | A1 | 6/1989 |
| DE | 3808972 | A1 | 10/1989 |
| DE | 3821892 | C1 | 2/1990 |
| DE | 4040894 | C1 | 4/1992 |
| DE | 4115747 | A1 | 11/1992 |
| DE | 4124192 | A1 | 1/1993 |
| DE | 4127168 | A1 | 2/1993 |
| DE | 4137550 | A1 | 3/1993 |
| DE | 4215272 | A1 | 11/1993 |
| DE | 4243631 | A1 | 6/1994 |
| DE | 4340756 | A1 | 6/1994 |
| DE | 4411448 | A1 | 10/1995 |
| DE | 4412044 | A1 | 10/1995 |
| DE | 19512644 | A1 | 10/1996 |
| DE | 19512681 | A1 | 10/1996 |
| DE | 4345446 | C2 | 7/1998 |
| DE | 4345448 | C2 | 7/1998 |
| DE | 19727792 | A1 | 2/1999 |
| DE | 19741730 | A1 | 4/1999 |
| DE | 19741731 | A1 | 4/1999 |
| DE | 19752145 | A1 | 5/1999 |
| DE | 19717399 | A1 | 6/1999 |
| DE | 19757847 | A1 | 7/1999 |
| DE | 19757848 | A1 | 7/1999 |
| DE | 19757849 | A1 | 7/1999 |
| DE | 19757840 | C1 | 9/1999 |
| DE | 19815149 | A1 | 10/1999 |
| DE | 19828000 | A1 | 1/2000 |
| DE | 19902903 | C1 | 5/2000 |
| DE | 19911375 | A1 | 9/2000 |
| DE | 19919925 | A1 | 11/2000 |
| DE | 19927501 | A1 | 11/2000 |
| DE | 19936440 | A1 | 3/2001 |
| DE | 19953006 | A1 | 5/2001 |
| DE | 19953007 | A1 | 5/2001 |
| DE | 19953009 | A1 | 5/2001 |
| DE | 19953010 | A1 | 5/2001 |
| DE | 10025511 | C1 | 12/2001 |
| DE | 10110420 | A1 | 9/2002 |
| DE | 10114362 | A1 | 10/2002 |
| DE | 10127417 | A1 | 12/2002 |
| DE | 10128954 | A1 | 12/2002 |
| DE | 10141055 | A1 | 3/2003 |
| DE | 10143060 | A1 | 3/2003 |
| DE | 10146692 | A1 | 4/2003 |
| DE | 10148070 | A1 | 4/2003 |
| DE | 10151983 | A1 | 4/2003 |
| DE | 10162668 | A1 | 7/2003 |
| DE | 10217295 | A1 | 11/2003 |
| DE | 10222797 | A1 | 12/2003 |
| DE | 10229408 | A1 | 1/2004 |
| DE | 10244638 | A1 | 4/2004 |
| DE | 10244640 | A1 | 4/2004 |
| DE | 10244643 | A1 | 4/2004 |
| DE | 10258794 | A1 | 6/2004 |
| DE | 10303015 | A1 | 8/2004 |
| DE | 10331529 | A1 | 1/2005 |
| DE | 10341548 | A1 | 3/2005 |
| DE | 102004010197 | A1 | 9/2005 |
| DE | 102004014041 | A1 | 10/2005 |
| DE | 102005050824 | A1 | 5/2006 |
| DE | 102005003827 | A1 | 7/2006 |
| DE | 102005019233 | A1 | 11/2006 |
| DE | 102007013023 | A1 | 9/2008 |
| DE | 102011089636 | A1 | 6/2012 |
| DE | 202015009250 | U1 | 1/2017 |
| EP | 0185816 | A1 | 7/1986 |
| EP | 0361188 | A2 | 4/1990 |
| EP | 0396865 | A2 | 11/1990 |
| EP | 0412395 | A1 | 2/1991 |
| EP | 0412398 | A1 | 2/1991 |
| EP | 0412399 | A1 | 2/1991 |
| EP | 0412400 | A1 | 2/1991 |
| EP | 0468175 | A2 | 1/1992 |
| EP | 0486430 | A2 | 5/1992 |
| EP | 0653720 | A2 | 5/1995 |
| EP | 0656868 | A1 | 6/1995 |
| EP | 0897120 | A2 | 2/1999 |
| EP | 0913707 | A1 | 5/1999 |
| EP | 0937996 | A2 | 8/1999 |
| EP | 0967492 | A1 | 12/1999 |
| EP | 1046938 | A2 | 10/2000 |
| EP | 1055937 | A2 | 11/2000 |
| EP | 1148345 | A1 | 10/2001 |
| EP | 1160718 | A2 | 12/2001 |
| EP | 1174733 | A2 | 1/2002 |
| EP | 1267177 | A1 | 12/2002 |
| EP | 1267178 | A1 | 12/2002 |
| EP | 1286178 | A2 | 2/2003 |
| EP | 1286181 | A1 | 2/2003 |
| EP | 1288677 | A2 | 3/2003 |
| EP | 1291673 | A2 | 3/2003 |
| EP | 1291674 | A2 | 3/2003 |
| EP | 1298012 | A2 | 4/2003 |
| EP | 1298453 | A2 | 4/2003 |
| EP | 1298454 | A2 | 4/2003 |
| EP | 1300715 | A2 | 4/2003 |
| EP | 1302784 | A2 | 4/2003 |
| EP | 1304583 | A2 | 4/2003 |
| EP | 1306690 | A2 | 5/2003 |
| EP | 1308747 | A2 | 5/2003 |
| EP | 1355128 | A1 | 10/2003 |
| EP | 1403657 | A1 | 3/2004 |
| EP | 1408318 | A1 | 4/2004 |
| EP | 1418444 | A1 | 5/2004 |
| EP | 1460454 | A2 | 9/2004 |
| EP | 1475764 | A2 | 11/2004 |
| EP | 1515157 | A1 | 3/2005 |
| EP | 1531342 | A1 | 5/2005 |
| EP | 1531343 | A1 | 5/2005 |
| EP | 1548351 | A2 | 6/2005 |
| EP | 1557691 | A1 | 7/2005 |
| EP | 1557692 | A1 | 7/2005 |
| EP | 1557693 | A1 | 7/2005 |
| EP | 1557694 | A1 | 7/2005 |
| EP | 1700763 | A2 | 9/2006 |
| EP | 1914564 | A1 | 4/2008 |
| EP | 1927867 | A1 | 6/2008 |
| EP | 1939652 | A1 | 7/2008 |
| EP | 1947377 | A1 | 7/2008 |

(56) References Cited

FOREIGN PATENT DOCUMENTS

| | | |
|---|---|---|
| EP | 1983354 A1 | 10/2008 |
| EP | 2003471 A1 | 12/2008 |
| EP | 2177931 A2 | 4/2010 |
| EP | 2503360 A1 | 9/2012 |
| EP | 2963445 A2 | 1/2016 |
| GB | 2041687 A | 9/1980 |
| JP | H05240940 A | 9/1993 |
| JP | H03-006407 | 2/1994 |
| JP | H6-288725 A | 10/1994 |
| JP | H06-289136 A | 10/1994 |
| JP | H07-167609 A | 7/1995 |
| JP | H09-097925 A | 4/1997 |
| JP | 11264871 | 9/1999 |
| JP | 2001050723 A | 2/2001 |
| JP | 2001216592 A | 8/2001 |
| JP | 2001-256576 A | 9/2001 |
| JP | 2002-031528 A | 1/2002 |
| JP | 2003-336447 A | 11/2003 |
| JP | 2004-348575 A | 12/2004 |
| JP | 2005-070840 A | 3/2005 |
| JP | 2005-297863 A | 10/2005 |
| JP | 2006-177843 A | 7/2006 |
| JP | 2010-060309 A | 3/2010 |
| JP | 2011-069726 A | 4/2011 |
| JP | 2013-104771 A | 5/2013 |
| JP | 2014-190736 A | 10/2014 |
| JP | 2015-169491 A | 9/2015 |
| WO | WO-1999/003080 A1 | 1/1999 |
| WO | WO-2000/025089 A1 | 5/2000 |
| WO | WO-01/31608 A1 | 5/2001 |
| WO | WO-03/019234 A1 | 3/2003 |
| WO | WO-03/040755 A1 | 5/2003 |
| WO | WO-2004/019293 A2 | 3/2004 |
| WO | WO-2004/036245 A2 | 4/2004 |
| WO | WO-2008/008970 A2 | 1/2008 |
| WO | WO-2009/120706 A2 | 10/2009 |
| WO | WO-2012/153309 A2 | 11/2012 |
| WO | WO-2012/172526 A1 | 12/2012 |
| WO | WO-2013/191133 A1 | 12/2013 |
| WO | WO-2015/079300 A1 | 6/2015 |
| WO | WO-2015/104572 A1 | 7/2015 |
| WO | WO-2016/056545 A1 | 4/2016 |
| WO | WO-2016/162568 A1 | 10/2016 |
| WO | WO-2017/033419 A1 | 3/2017 |
| WO | WO-2017/089063 A1 | 6/2017 |
| WO | WO-2017/132703 A1 | 8/2017 |
| WO | WO-2017/164989 A1 | 9/2017 |
| WO | WO-2017/165316 A1 | 9/2017 |
| WO | WO-2017/193269 A1 | 11/2017 |
| WO | WO-2018/125823 A1 | 7/2018 |
| WO | WO-2018/196001 A1 | 11/2018 |

OTHER PUBLICATIONS

Acuity Laser, Principles Of Measurement Used By Laser Sensors, https://www.acuitylaser.com/measurement-principles (2018), 4 pages. (IPR Nos. '255 and '256 Exhibit 1075).

Acuity, Acuity Aluminum Billet Scalping Production Information webpage (Brennan Deposition Exhibit 14) (last visited Dec. 28, 2018), 2 pages. (IPR Nos. '255 and '256 Exhibit 2184).

Acuity, Acuity AR700 Laser Displacement Sensor Product Information webpage (Brennan Deposition Exhibit 13) (last visited Dec. 28, 2018), 9 pages. (IPR Nos. '255 and '256 Exhibit 2183).

Acuity, Acuity Drill Pipe Runout Product Information webpage (Brennan Deposition Exhibit 12) (last visited Dec. 28, 2018), 2 pages. (IPR Nos. '255 and '256 Exhibit 2182).

Acuity, Acuity Short Range Sensors Product Information webpage (Brennan Deposition Exhibit 11) (last visited Dec. 30, 2018), 3 pages. (IPR Nos. '255 and '256 Exhibit 2181).

Aiestaran et al. "A Fluorescent Linear Optical Fiber Position Sensor" Elsevier B.V. May 21, 2008 (4 pages).

Albota, "Three-dimensional imaging laser Radar with a photon-counting avalanche photodiode array and microchip laser," Applied optics, vol. 41, No. 36 (Dec. 20, 2002), 8 pages.

Alhashimi, et al., Statistical Modeling and Calibration of Triangulation Lidars, SCITEPRESS—Science and Technology Publications (2016), pp. 308-317. (IPR Nos. '255 and '256 Exhibit 1069).

Amann, Laser ranging: a critical review of usual techniques for distance measurement, 40(1) Society of Photo-Optical Instrumentation Engineers (Jan. 2001), pp. 10-19. (IPR Nos. '255 and '256 Exhibit 2148).

American National Standard for Safe Use of Lasers, ANSI Z136. 1-2014, Laser Institute of America (Dec. 10, 2013), pp. 27-34 and 216-219. (IPR Nos. '255 and '256 Exhibit 1142).

American National Standard for Safe Use of Lasers, Laser Institute of America (Jun. 28, 2000), 184 pages. (IPR Nos. '255 and '256 Exhibit 2005).

American National Standards Institute, "Procedures for the Development and Coordination of American National Standards" (Mar. 22, 1995), 50 pages. (IPR Nos. '255 and '256 Exhibit 1040).

American Petroleum Institute, "Specification for Line Pipe," API Specification 5L, 43rd Ed. (2004), 166 pages. (IPR Nos. '255 and '256 Exhibit 1139).

Aood Technology Limited, "Electrical Slip Rings vs. Rotating Electrical Connectors" (2013), 3 pages. (IPR Nos. '255 and '256 Exhibit 1032).

Aufrere, et al., Perception for collision avoidance and autonomous driving, The Robots Institute, Carnegie Mellon University (2003), 14 pages (IPR Nos. '255 and '256 Exhibit 2140).

Aull, et al., "Geiger-Mode Avalanche Photodiodes for Three Dimensional Imaging," Lincoln Laboratory Journal (2002), 16 pages. (IPR Nos. '255 and '256 Exhibit 1021), Lincoln Laboratory Journal, vol. 13, No. 2, 2002, pp. 335-350.

Automotive LiDAR, Market Presentation titled "Robotic Cars LiDAR Market in Million Dollars" (Apr. 2018), 86 pages. (IPR Nos. '255 and '256 Exhibit 2113).

Avalanche Photodiode: A User Guide (2011), 8 pages. (IPR Nos. '255 and '256 Exhibit 1019).

Beer, et al., Mechanics of Materials, McGraw Hill Companies, 4th Ed. (2006), pp. 750 and 752. (IPR Nos. '255 and '256 Exhibit 1140).

Berkovic et al., Optical Methods for Distance and Displacement Measurements, Advances in Optics and Photonics (Sep. 11, 2012), pp. 441-471. (IPR Nos. '255 and '256 Exhibit 2007).

Besl, Active, Optical Range Imaging Sensors Machine Visions and Applications (1988), Springer-Verlag New York Inc., pp. 1:127-152 (IPR Nos. '255 and '256 Exhibit 1015).

Blais, NRC-CNRC, Review of 20 Years of Range Sensor Development, National Research Council Canada (Jan. 2004), pp. 231-243 (IPR Nos. '255 and '256 Exhibit 2141).

Bordone, et al., "Development of a high-resolution laser radar for 3D imaging in artwork cataloging," Proceedings of SPIE, vol. 5131 (2003), 6 pages. (IPR Nos. '255 and '256 Exhibit 1016).

Bornstein, "Where am I? Sensors and Methods for Mobile Robot Positioning" (1996), pp. 95-112.

Brennan, Drawing of I-beam by Dr. Brennan (Brennan Deposition Exhibit 16), (Jan. 4, 2019), 1 page. (IPR Nos. '255 and '256 Exhibit 2186).

Brustein et al., How a Billion-Dollar Autonomous Vehicle Startup Lost Its Way, Bloomberg https://www.bloomberg.com/news/features/2018-08-13/how-a-billiondollar-autonomous-vehicle-startup-lost-its-way (Aug. 13, 2018), 7 pages. (IPR Nos. '255 and '256 Exhibit 2098).

Business Wire, Press Release Distribution webpage, https://services.businesswire.com/press-release-distribution (Dec. 21, 2018), 2 pages. (IPR Nos. '255 and '256 Exhibit 1143).

Businesswire, Velodyne Displays Solid State, Highest Performing LiDAR for ADAS, Businesswire https://www.businesswire.com/news/home/20180107005088/en/Velodyne-Displays-Solid-State-Highest-Performing-LiDAR (Jan. 7, 2018), 2 pages. (IPR Nos. '255 and '256 Exhibit 2097).

Businesswire, Velodyne LiDar Awarded "Industry Choice Company of the Year" at TU-Automotive Detroit Conference, Businesswire, https://www.businesswire.com/news/home/20180608005700/en/

(56) References Cited

OTHER PUBLICATIONS

Velodyne-LiDAR-Awarded-%E2%80%9CIndustry-Choice-Company-Year%E2%80%9D (Jun. 8, 2018), 1 page. (IPR Nos. '255 and '256 Exhibit 2096).
Cameron, An Introduction to LIDAR: The Key Self-Driving Car Sensor, Voyage https://news.voyage.auto/an-introduction-to-lidar-the-key-self-drivingcar-sensor-a7e405590cff (May 9, 2017), 14 pages. (IPR Nos. '255 and '256 Exhibit 2074).
Canadian Patent Office, Office Action, App. No. CA 3,012,003 (dated Aug. 28, 2019), 3 pages.
Canadian Patent Office, Office Action, App. No. CA 3,017,735 (dated Aug. 28, 2019), 3 pages.
Canadian Patent Office, Office Action, App. No. CA 3,017,811 (dated Aug. 28, 2019), 3 pages.
Canbus, https://web.archive.org/web/20040520021138/ http:/canbus.us:80/ (May 20, 2004), 3 pages. (IPR Nos. '255 and '256 Exhibit 1088).
Carson, N. "Defending GPS against the Spoofing Threat using Network Based Detection and 3, 15,20 Successive Interference Cancellation". Auburn University. Nov. 2015, 35 pages.
Chapman, "Introduction to Laser Safety" (Sep. 10, 2007), 19 pages.
Chellapilla, Lidar: The Smartest Sensor on a Self Driving Car, LinkedIn.com https://www.linkedin.com/pulse/lidar-smartest-sensor-self-driving-carkumar-chellapill (Jul. 31, 2017), 8 pages. (IPR Nos. '255 and '256 Exhibit 2075).
Cheung, Spinning laser maker is the real winner of the Urban Challenge, Tech Guru Daily, available at http://www.tgdaily.com/trendwatch-features/34750-spinning-laser-maker-is-the-real-winner (Nov. 7, 2007), 7 pages. (IPR Nos. '255 and '256 Exhibit 2091).
Code of Federal Regulations, Food and Drugs Rule—Performance Standards for Light-Emitting Products, 21 C.F.R. § 1040.10 (2005).
Copper Development Association Inc., Copper Tube Handbook—Industry Standard Guide for the Design and Installation of Copper Piping Systems, CDA Publication A4015-14.17: Copper Tube Handbook (2016), 96 pages. (IPR Nos. '255 and '256 Exhibit 2139).
Cravotta, "Operating alone," EDN (Dec. 5, 2005), 6 pages.
D'Allegro, Meet the Inventor Trying to Bring LiDAR to the Masses, The Drive http://www.thedrive.com/sheetmetal/15567/meet-the-inventor-trying-to bring-lidar-to-the-masses (Oct. 28, 2017), 5 pages. (IPR Nos. '255 and '256 Exhibit 2072).
Daido, Daido Special Steel Co. home page, https://web.archive.org/web/20051227070229/http:/daido.co.jp/ (Dec. 27, 2005), 1 page. (IPR Nos. '255 and '256 Exhibit 1087).
Daido, Daido steel drilling equipment page, https://web.archive.org/web/20050406120958/ http:/www.daido.co.jp:80/english/products/applipro/energy/dri.html (Apr. 6, 2005), 1 page. (IPR Nos. '255 and '256 Exhibit 1083).
Daido, Daido steel petroleum components, https://web.archive.org/web/20050406121643/ http:/www.daido.co.jp:80/english/products/applipro/energy/petro.htm (Apr. 6, 2005), 1 page. (IPR Nos. '255 and '256 Exhibit 1084).
Daido, Daido steel rebar page, https://web.archive.org/web/20051201010951/ http:/www.daido.co.jp:80/products/stainless/ik_shokai.html (Dec. 1, 2005), 2 pages. (IPR Nos. '255 and '256 Exhibit 1086).
DARPA, 2005 DARPA Challenge Info page https://web.archive.org/web/20051214033009/ http:/www.darpa.mil:80/grandchallenge/ (Nov. 17, 2005), 1 page. (IPR Nos. '255 and '256 Exhibit 1092).
DARPA, 2005 DARPA Team Papers https://web.archive.org/web/20051213010211/ http:/www.darpa.mil:80/grandchallenge/techpapers.html (Dec. 13, 2005), 2 pages. (IPR Nos. '255 and '256 Exhibit 1093).
DARPA, Grand Challenge '05—Frequently Asked Questions, DARPA.com, http://archive.darpa.mil/grandchallenge05/qa.html ) (2005), 3 pages. (IPR Nos. '255 and '256 Exhibit 2143).
DARPA, Grand Challenge Media—Frequently Asked Questions (Media),DARPA.com, http://archive.darpa.mil/grandchallenge04/media_faq.htm (2004), 3 pages. (IPR Nos. '255 and '256 Exhibit 2142).
DARPA, PDF found on Team DAD paper URL, https://web.archive.org/web/20051213015642/ http:/www.darpa.mil:80/grandchallenge/TechPapers/TeamDAD.pdf (Aug. 6, 2005), pp. 1-12. (IPR Nos. '255 and '256 Exhibit 1094).
DARPA, Urban Challenge, DARPA.com, http://archive.darpa.mil/grandchallenge/ ("DARPA Archive") (2007), 4 pages. (IPR Nos. '255 and '256 Exhibit 2144).
Dehong, et al, Design and Implementation of LiDAR Navigation System Based On Triangulation Measurement, 29th Chinese Control and Decision Conference (CCDC) (May 2017), 59 pages. (IPR Nos. '255 and '256 Exhibit 1136).
Doyle, Velodyne HDL-64E Laser Rangefinder (LiDAR) Pseudo-Disassembled, Hizook (Jan. 4, 2009), 7 pages. (IPR Nos. '255 and '256 Exhibit 2046).
Engineering Toolbox, The Engineering Toolbox Copper Tubes—ASTM B88 Datasheet (last accessed Jul. 10, 2018), 4 pages. (IPR Nos. '255 and '256 Exhibit 2137).
English, et al., The Complementary Nature of triangulation and ladar technologies, 5791 Proceedings of SPIE (May 19, 2005), pp. 29-41. (IPR Nos. '255 and '256 Exhibit 2162).
Esacademy, Betting on CAN, https://web.archive.org/web/20040609170940/ http:/www.esacademy.com:80/faq/docs/bettingcan/traditional.htm (Jun. 9, 2004), 1 page. (IPR Nos. '255 and '256 Exhibit 1089).
European Patent Office, Office Action, App. No. EP 07840406.8 (dated Mar. 15, 2011) 7 pages.
European Patent Office, Office Action, App. No. EP 11166432.2 (dated Jan. 29, 2019), 3 pages.
European Patent Office, Office Action, App. No. EP 11166432.2 (dated Oct. 14, 2016), 4 pages.
European Patent Office, Office Action, App. No. EP 11166432.2 (dated Oct. 5, 2015), 4 pages.
European Patent Office, Office Action, App. No. EP 11166432.2 (dated Oct. 7, 2019), 6 pages.
Ewald et al., Object Detection with Laser Scanners for Automotive Applications, IFAC Control in Transportation Systems (2000), pp. 369-372. (IPR Nos. '255 and '256 Exhibit 2191).
Excelitas Technologies, "Avalanche Photodiode. A User Guide", 2011 Excelitas Technologies Corp., pp. 1-8.
Fast Company, The World's 50 Most Innovative Companies 2017, https://www.fastcompany.com/most-innovative-companies/2017 (last visited Feb. 26, 2018), 5 pages. (IPR Nos. '255 and '256 Exhibit 2077).
Fischer, "Rapid Measurement and Mapping of Tracer Gas Concentrations in a Large Indoor Space" (May 2000), 27 pages.
Ford Media Center, Ford Tripling Autonomous Vehicle Development Fleet, Accelerating on-road Testing of Sensors and Software (Jan. 5, 2016), 4 pages. (IPR Nos. '255 and '256 Exhibit 2066).
Fox, "Active electro-optical systems," The infrared and electro-optical systems handbook, vol. 6 (1993), pp. 1-80.
Frost et al., Driving the Future of Autonomous Navigation—Whitepaper for Analysis of LiDAR technology for advanced safety, https://velodynelidar.com/docs/papers/FROST-ON-LiDAR.pdf (2016), 30 pages. (IPR Nos. '255 and '256 Exhibit 1130).
Fuerstenberg, et al, Multilayer Laserscanner for Robust Object Tracking and Classification in Urban Traffic Scenes, 9th World Congress on Intelligent Transport Systems (2002), 14 pages. (IPR Nos. '255 and '256 Exhibit 1079), pp. 1-10.
Fuerstenberg, et al., Pedestrian Recognition and Tracking of Vehicles using a vehicle based Multilayer Laserscanner, IEEE (2002), 12 pages. (IPR Nos. '255 and '256 Exhibit 2192).
Fuerstenberg, Pedestrian detection and classification by laserscanners, (2003), 8 pages.
Furstenberg, et al., New Sensor for 360 Vehicle Surveillance—Innovative Approach to Stop & Go, Lane Assistance and Pedestrian Recognition (May 2001), 5 pages. (IPR Nos. '255 and '256 Exhibit 2190).

(56) References Cited

OTHER PUBLICATIONS

Gargiulo, Velodyne Lidar Tops Winning Urban Challenge Vehicles, Business Wire (Nov. 6, 2007), 2 pages. (IPR Nos. '255 and '256 Exhibit 2082).
Garmin, How the LiDAR-Lite v3/v3HP works with reflective surfaces, GARMIN.com, https://support.garmin.com/en-US/?faq=IVeHYIKwChAY0qCVhQiJ67 (last visited Aug. 24, 2018), 2 pages. (IPR Nos. '255 and '256 Exhibit 2145).
Glennie et al., Temporal Stability of the Velodyne HDL-64E S2 Scanner for High Accuracy Scanning Applications, MDPI Remote Sensing (Mar. 14, 2011), 15 pages. (IPR Nos. '255 and '256 Exhibit 2057).
Glennie, Performance analysis of a kinematic terrestrial LiDAR scanning system, MAPPS/ASPRS 2006 fall conference (Nov. 6-10, 2006), 9 pages.
Glennie, Reign of Point Clouds: A Kinematic Terrestrial LiDAR Scanning System (2007), pp. 22-31.
Gustavson, "Diode-laser radar for low-cost weapon guidance," SPIE vol. 1633, Laser radar VII (1992), pp. 1-12.
Hall, et al., Team DAD Technical Paper, DARPA Grand Challenge 2005, XP-002543336, Aug. 26, 2005, pp. 1-12. (IPR Nos. '255 and '256 Exhibit 1081).
Hamamatsu, CCD area image sensor S7030/S7031 Series Back-thinned FFT-CCD Datasheet (2006), 8 pages. (IPR Nos. '255 and '256 Exhibit 2123).
Hamamatsu, CCD Image Sensors Webpage ("CCD Image Sensors") (Feb. 2, 2006), 1 page. (IPR Nos. '255 and '256 Exhibit 2124).
Hamamatsu, Image Sensor Selection guide (Dec. 2003), 20 pages. (IPR Nos. '255 and '256 Exhibit 2128).
Hamamatsu, Image Sensors Webpage (Mar. 17, 2006), 1 page. (IPR Nos. '255 and '256 Exhibit 2160).
Hamamatsu, One-dimensional PSD Plastic package, 1-D PSD with plastic package Datasheet ("1-D PSD Datasheet") (2004), 5 pages. (IPR Nos. '255 and '256 Exhibit 2118).
Hamamatsu, One-Dimensional PSD Webpage, One-dimensional (Mar. 17, 2006), 1 page. (IPR Nos. '255 and '256 Exhibit 2119).
Hamamatsu, Photodiode Technical Information, 18 pages. (IPR Nos. '255 and '256 Exhibit 2129).
Hamamatsu, Position Sensitive Detectors ("PSDs") Webpage, One-dimensional and Two-dimensional (Mar. 17, 2006), 1 page. (IPR Nos. '255 and '256 Exhibit 2117).
Hamamatsu, S4111-46Q Si Photodiode Array Webpage (Oct. 22, 2005), 1 page. (IPR Nos. '255 and '256 Exhibit 2135).
Hamamatsu, Si photodiode array—S4111/S4114 series 16, 35, 46 element Si photodiode array for UV to NIR Datasheet (Jul. 2004), 4 pages. (IPR Nos. '255 and '256 Exhibit 2134).
Hamamatsu, Silicon Photodiode Array Webpage (Feb. 2, 2006), 1 page. (IPR Nos. '255 and '256 Exhibit 2130).
Hamamatsu, Technical Information, SD-25—Characteristics and use of FFT-CCD area image sensor (Aug. 2003), 27 pages. (IPR Nos. '255 and '256 Exhibit 2126).
Hamamatsu, Technical Information, SD-28—Characteristics and use of Si APD (Avalanche Photodiode) (Aug. 2001), 12 pages. (IPR Nos. '255 and '256 Exhibit 2127).
Hamamatsu, Two-dimensional PSD S1300 Datasheet (Dec. 19, 2005), 1 page. (IPR Nos. '255 and '256 Exhibit 2121).
Hamamatsu, Two-dimensional PSDs S1200, S1300, S1880, S1881, S2044—Non-discrete position sensor utilizing photodiode surface resistance Datasheet (2003), 6 pages. (IPR Nos. '255 and '256 Exhibit 2120).
Hamamatsu, Two-dimensional PSDs Webpage (Mar. 17, 2006), 1 page. (IPR Nos. '255 and '256 Exhibit 2122).
Hamatsu, Opto-Semiconductor Handbook, Si APD, MMPC (Chapter 3), ("APD Handbook"), available at https://www.hamamatsu.com/us/en/hamamatsu/overview/bsd/solid_state_division/related_documents.html (2014), 25 pages. (IPR Nos. '255 and '256 Exhibit 2006).
Hancock, "Laser Intensity Based Obstacle Detecting and Tracking" (Jan. 1999), pp. 45-65.
Haran et al., Infrared Reflectivy of Pedestrian Mannequin for Autonomous Emergency Braking Testing, IEEE 19th International Conference on Intelligent Transportation Systems (ITSC) (2016), 6 pages. (IPR Nos. '255 and '256 Exhibit 2168).
Heenan, et al., Feature-Level Map Building and Object Recognition for Intersection Safety Applications, in Advanced Microsystems for Automotive Applications (Jurgen Valldorf and Wolfgang Gessner eds.) (2005), pp. 505-519. (IPR Nos. '255 and '256 Exhibit 2199).
Hergert et al., The WITS$ guide to selecting a photodetector, Hamamatsu.com, https://hub.hamamatsu.com/us/en/technical-note/WITS-guide-detectorselection/index.html (Jul. 2015), 16 pages. (IPR Nos. '255 and '256 Exhibit 2133).
IBEO, "IBEO about," https://web.archive.org/web/20040606111631/http:/www.ibeoas.de:80/html/about/about (2004).
IBEO, "IBEO data and prices," https://web.archive.org/web/20041209025137/ http://www.ibeoas.de:80/html/prod/prod_dataprices.html (2004), 2 pages.
IBEO, "IBEO history," https://web.archive.org/web/20040807161657/, http:/www.ibeoas.de:80/html/about/ab_history.html (2004), 1 page.
IBEO, "IBEO LD Multilayer data sheet," https://web.archive.org/web/20031003201743/ http://www.ibeoas.de:80/html/prod/prod_Id_multi.html (2003), 1 page.
IBEO, "IBEO Motiv sensor," https://web.archive.org/web/20040113062910/, http://www.ibeoas.de:80/html/rd/rd_rs_motiv.htm (1997-2000), 1 page.
IBEO, "IBEO multilayer tech" (2004), 1 page.
IBEO, "IBEO multitarget capability," https://web.archive.org/web/20040323030746/, http/:www.ibeoas.de:80/html/knho/knho-senstech-mlc.html (2004), 1 page.
IBEO, "IBEO products," https://web.archive.org/web/20040606115118/http/:www.ibeoas.de:80/html/prod/prod.html (2004), 1 page.
IBEO, "IBEO products," https://web.archive.org/web/20041011011528/http://www.ibeoas.de:80/html/prod/prod.html (2004), 1 page.
IBEO, "IBEO publications," https://web.archive.org/web/20031208175052/ http://www.ibeoas.de:80/html/public/public.html (2003), 2 pages.
IBEO, "IBEO roadmap," https://web.archive.org/web/20041209032449/http:/www.ibeoas.de:80/html/prod/prod_roadmap.html (2004), 1 page.
IBEO, "IBEO Time of Flight" (2004), 1 page.
IBEO, "IBEO," https://web.archive.org/web/20040202131331/http://www.ibeo-as.de:8 (2004), 1 page.
IBEO, IBEO about page, https://web.archive.org/web/20040606111631/http:/www.ibeoas.de:80/html/about/about (Jun. 6, 2004), 1 page. (IPR Nos. '255 and '256 Exhibit 1103).
IBEO, IBEO Alasca, https://web.archive.org/web/20031001091407/http:/www.ibeoas.de:80/html/prod/prod_alasca.html (Oct. 1, 2003), 1 page. (IPR Nos. '255 and '256 Exhibit 1099).
IBEO, IBEO Automobile Sensor GmbH—Scanner Technology webpage (Brennan Deposition Exhibit 1) (Mar. 23, 2004), 1 page. (IPR Nos. '255 and '256 Exhibit 2171).
IBEO, IBEO Automobile Sensor GmbH—The ALASCA project webpage (Brennan Deposition Exhibit 2) (Oct. 6, 2003), 1 page. (IPR Nos. '255 and '256 Exhibit 2172).
IBEO, IBEO Available products, https://web.archive.org/web/20041011011528/ http://www.ibeoas.de:80/html/prod/prod.html (Oct. 11, 2004), 1 page. (IPR Nos. '255 and '256 Exhibit 1108).
IBEO, IBEO data sheet re available products, https://web.archive.org/web/20041209025137/ http://www.ibeoas.de:80/html/prod/prod_dataprices.html (Dec. 9, 2004), 2 pages. (IPR Nos. '255 and '256 Exhibit 1107).
IBEO, IBEO history, https://web.archive.org/web/20040807161657/http:/www.ibeoas.de:80/html/about/ab_history.html (Aug. 7, 2004), 1 page. (IPR Nos. '255 and '256 Exhibit 1104).
IBEO, IBEO home page, https://web.archive.org/web/20040202131331/http://www.ibeo-as.de:8 (Feb. 2, 2004), 1 page. (IPR Nos. '255 and '256 Exhibit 1102).
IBEO, IBEO LD Multilayer data sheet, https://web.archive.org/web/20031003201743/ http://www.ibeoas.de:80/html/prod/prod_Id_multi.html (Oct. 3, 2003), 1 page. (IPR Nos. '255 and '256 Exhibit 1111).
IBEO, IBEO Motiv sensor, https://web.archive.org/web/20040113062910/ http://www.ibeoas.de:80/html/rd/rd_rs_motiv.htm (Jan. 13, 2004), 1 page. (IPR Nos. '255 and '256 Exhibit 1110).

(56) References Cited

OTHER PUBLICATIONS

IBEO, IBEO multilayer tech, (Jan. 8, 2004), 1 page. (IPR Nos. '255 and '256 Exhibit 1097).
IBEO, IBEO multilayer technology page with moving graphic, Archive.org (Jan. 8, 2004), 1 page. (IPR Nos. '255 and '256 Exhibit 1096).
IBEO, IBEO multitarget capability, https://web.archive.org/web/20040323030746/ http:/www.ibeoas.de:80/html/knho/knho_senstech_mlc.html (Mar. 23, 2004), 1 page. (IPR Nos. '255 and '256 Exhibit 1101).
IBEO, IBEO products page, https://web.archive.org/web/20040606115118/ http:/www.ibeoas.de:80/html/prod/prod.html (Jun. 6, 2004), 1 page. (IPR Nos. '255 and '256 Exhibit 1100).
IBEO, IBEO publications page, https://web.archive.org/web/20031208175052/ http://www.ibeoas.de:80/html/public/public.html (Dec. 8, 2003), 2 pages. (IPR Nos. '255 and '256 Exhibit 1109).
IBEO, IBEO Roadmap, https://web.archive.org/web/20041209032449/ http:/www.ibeoas.de:80/html/prod/prod_roadmap.html (Dec. 9, 2004), 1 page. (IPR Nos. '255 and '256 Exhibit 1105).
IBEO, IBEO time of flight with moving graphic, (Jan. 8, 2004), 1 page. (IPR Nos. '255 and '256 Exhibit 1095).
IBEO, IBEO Time of Flight, (Jan. 8, 2004), 1 page. (IPR Nos. '255 and '256 Exhibit 1098).
Informed Infrastructure, Velodyne LiDAR Division Announces Agreement with Caterpillar for Laser Imaging Technology, Informed Infrastructure http://informedinfrastructure.com/25630/velodynes-lidar-divisionannounces-agreement-with-caterpillar-for-laser-imaging-technology-2/ (Aug. 8, 2012), 3 pages. (IPR Nos. '255 and '256 Exhibit 2079).
Inter Parties Review Decision Denying Petitioner's Request for Rehearing (May 21, 2020), 26 pages. (IPR No. 2018-00255).
Inter Parties Review Decision: Institution of Inter Partes Review (May 25, 2018), 11 pages. (IPR No. 2018-00255).
Inter Parties Review Decision: Petitioner's Motion to Submit Supplemental Information Pursuant to 37 C.F.R. § 42.123(b) (Aug. 8, 2018), 4 pages. (IPR No. 2018-00255).
Inter Parties Review Declaration of Dr. James F. Brennan III (Nov. 29, 2017), 172 pages. (IPR Nos. '255 and '256 Exhibit 1002).
Inter Parties Review Final Written Decision (May 23, 2019), 40 pages. (IPR No. 2018- 00255).
Inter Parties Review Patent Owner's Contingent Motion to Amend (Public Version—Redacted) (Sep. 28, 2018), 56 pages. (IPR No. 2018-00255).
Inter Parties Review Patent Owner's Preliminary Response (Public Version—Redacted) (Mar. 7, 2018), 72 pages. (IPR No. 2018-00255).
Inter Parties Review Patent Owner's Reply in Support of Its Contingent Motion to Amend (Jan. 16, 2019), 33 pages. (IPR No. 2018-00255).
Inter Parties Review Patent Owner's Response (Public Version—Redacted) (Sep. 28, 2018), 92 pages. (IPR No. 2018-00255).
Inter Parties Review Patent Owner's Surreply (Jan. 16, 2019), 50 pages. (IPR No. 2018- 00255).
Inter Parties Review Patent Owner's Updated Exhibit List (Feb. 11, 2019), 21 pages. (IPR No. 2018-00255).
Inter Parties Review Petition for Inter Partes Review of U.S. Pat. No. 7,969,558 (Claims 1-4, 8, and 9) (IPR No. 2018-00255, *Quanergy Systems, Inc.* v. *Velodyne Lidar, Inc.*) (Nov. 29, 2017), 67 pages. (IPR No. 2018-00255).
Inter Parties Review Petitioner Quanergy's Opposition to Patent Owner's Contingent Motion to Amend (Dec. 21, 2018), 35 pages. (IPR No. 2018-00255).
Inter Parties Review Petitioner Quanergy's Sur-Surreply (Jan. 30, 2019), 9 pages. (IPR No. 2018-00255).
Inter Parties Review Petitioner Quanergy's Surreply to Patent Owner's Contingent Motion to Amend (Jan. 30, 2019), 17 pages. (IPR No. 2018-00255).
Inter Parties Review Petitioner's Motion to Submit Supplemental Information Pursuant to 37 C.F.R. § 42.123(b) (Aug. 6, 2018), 16 pages. (IPR No. 2018-00255).
Inter Parties Review Petitioner's Reply to Patent Owner's Response (Dec. 21, 2018), 38 pages. (IPR No. 2018-00255).
Inter Parties Review Petitioner's Request for Rehearing (Jun. 24, 2019), 20 pages. (IPR No. 2018-00255).
Inter Parties Review Petitioner's Unopposed Motion to Submit Replacement Petition and Supplemental Declaration (Nov. 5, 2018), 9 pages. (IPR No. 2018-00255).
Inter Parties Review Petitioner's Updated Exhibit List (Jan. 30, 2019), 13 pages. (IPR No. 2018-00255).
Inter Parties Review Record of Oral Hearing (Feb. 27, 2019), 126 pages. (IPR Nos. 2018-00255 and 2018-00256).
Inter Parties Review Replacement Petition for Inter Partes Review of U.S. Pat. No. 7,969,558 (Claims 1-4, 8, and 9), 71 pages. (IPR No. 2018-00255).
Inter Parties Review, Chris Butler Affidavit and Exhibit (Dec. 18, 2018), 33 pages. (IPR Nos. '255 and '256 Exhibit 1066).
Inter Parties Review, Chris Butler Affidavit and Exhibit (Dec. 20, 2018), 52 pages. (IPR Nos. '255 and '256 Exhibit 1067).
Inter Parties Review, Decision Denying Petitioner's Request for Rehearing (May 21, 2020), 26 pages. (IPR No. 2018-00256).
Inter Parties Review, Decision: Institution of Inter Partes Review (May 25, 2018), 12 pages. (IPR No. 2018-00256).
Inter Parties Review, Decision: Petitioner's Motion to Submit Supplemental Information Pursuant to 37 C.F.R. § 42.123(b) (Aug. 8, 2018), 4 pages. (IPR No. 2018-00256).
Inter Parties Review, Declaration of Dr. Sylvia Hall-Ellis (Nov. 29, 2017), 93 pages. (IPR Nos. '255 and '256 Exhibit 1041).
Inter Parties Review, Declaration of J. Gary Eden, Ph.D. in Support of Patent Owner's Preliminary Responses (Public Version—Redacted) (Mar. 7, 2018), 120 pages. (IPR Nos. '255 and '256 Exhibit 2003).
Inter Parties Review, Declaration of J. Gary Eden, Ph.D. in Support of Patent Owner's Reply in Support of Its Motion to Amend (Jan. 16, 2019), 71 pages. (IPR Nos. '255 and '256 Exhibit 2202).
Inter Parties Review, Declaration of J. Gary Eden, Ph.D. in Support of Patent Owner's Responses and Motions to Amend (Public Version—Redacted) (Sep. 27, 2018), 202 pages. (IPR Nos. '255 and '256 Exhibit 2115).
Inter Parties Review, Declaration of James F. Brennan, III in Support of Petitioner's Replies and Oppositions to Motions to Amend (Dec. 21, 2018), 93 pages. (IPR Nos. '255 and '256 Exhibit 1063).
Inter Parties Review, Declaration of Sylvia Hall-Ellis (Dec. 21, 2018), 146 pages. (IPR Nos. '255 and '256 Exhibit 1065).
Inter Parties Review, Defendant Velodyne's Answer and Counterclaim, *Quanergy Systems, Inc.*, v. *Velodyne Lidar, Inc.*, No. 5:16-cv-05251-EJD (N.D. Cal.) ECF No. 36 (Dec. 5, 2016), 56 pages. (IPR Nos. '255 and '256 Exhibit 2080).
Inter Parties Review, Deposition of James F. Brennan, III, *Quanergy Systems, Inc.* v. *Velodyne Lidar, Inc.*, Nos. IPR2018-00255 and IPR2018-00256 (Aug. 23, 2018), 241 pages. (IPR Nos. '255 and '256 Exhibit 2156).
Inter Parties Review, Deposition of James F. Brennan, III, *Quanergy Systems, Inc.* v. *Velodyne Lidar, Inc.*, Nos. IPR2018-00255 and IPR2018-00256 (Jan. 4, 2019), 267 pages. (IPR Nos. '255 and '256 Exhibit 2194).
Inter Parties Review, Deposition Transcript of J. Gary Eden, Ph.D (taken Nov. 27, 2018), 285 pages. (IPR Nos. '255 and '256 Exhibit 1064).
Inter Parties Review, Deposition Transcript of J. Gary Eden, Ph.D (taken on Jan. 22, 2019), 368 pages. (IPR Nos. '255 and '256 Exhibit 1150).
Inter Parties Review, Eden Deposition Exhibit 1—Unmanned Vehicles Come of Age: The DARPA Grand Challenge (2006), pp. 26-29. (IPR Nos. '255 and '256 Exhibit 1151).
Inter Parties Review, Eden Deposition Exhibit 10—Are processor algorithms key to safe self-driving cars?—EDN Asia (https: //www.ednasia.com/ news /article/areprocessor-algorithms-key-to-safe-self-driving-cars) (Jul. 7, 2016), 7 pages. (IPR Nos. '255 and '256 Exhibit 1160).
Inter Parties Review, Eden Deposition Exhibit 11—Steve Taranovich's profile (https://www.edn.com/user/steve.taranovich) (Jan. 22, 2019), 4 pages. (IPR Nos. '255 and '256 Exhibit 1161).

(56) References Cited

OTHER PUBLICATIONS

Inter Parties Review, Eden Deposition Exhibit 12—Instrumentation and Control (http://www.Instrumentation.co.za /article.aspx?pklarticleid=1664) (Feb. 2002), 4 pages. (IPR Nos. '255 and '256 Exhibit 1162).
Inter Parties Review, Eden Deposition Exhibit 13—Ibeo on board: ibeo Lux 4L / ibeo LUX 8L / ibeo LUX HD Data Sheet (Jul. 2017), 2 pages. (IPR Nos. '255 and '256 Exhibit 1163).
Inter Parties Review, Eden Deposition Exhibit 2—Driver Reaction Time in Crash Avoidance Research: validation of a Driving Simulator Study on a Test Track; Article in Human Factors and Ergonomics Society Annual Meeting Proceedings, Jul. 2000, 5 pages. (IPR Nos. '255 and '256 Exhibit 1152).
Inter Parties Review, Eden Deposition Exhibit 3—Axis of Rotation diagram (Jan. 22, 2019), 1 page. (IPR Nos. '255 and '256 Exhibit 1153).
Inter Parties Review, Eden Deposition Exhibit 4—Parallel Line and Plane—from Wolfram MathWorld (http://mathworld.wolfram.com/ParallelLineandPlane.html) (Jan. 22, 2019), 1 page. (IPR Nos. '255 and '256 Exhibit 1154).
Inter Parties Review, Eden Deposition Exhibit 5—Quasi-3D Scanning with Laserscanners: Introduction from 2D to 3D (2001), 7 pages. (IPR Nos. '255 and '256 Exhibit 1155).
Inter Parties Review, Eden Deposition Exhibit 6—L-Gage LT3 Long-Range Time-of-Flight Laser Distance-Gauging Sensors (2002), 12 pages. (IPR Nos. '255 and '256 Exhibit 1156).
Inter Parties Review, Eden Deposition Exhibit 7—About Ibeo: Our Mission (https://www.ibeoas.com/aboutibeo) (Jan. 21, 2019), 10 pages. (IPR Nos. '255 and '256 Exhibit 1157).
Inter Parties Review, Eden Deposition Exhibit 8—Automotive Industry; Explore Our Key Industries (https://velodynelidar.com/industry.html) (2019), 6 pages. (IPR Nos. '255 and '256 Exhibit 1158).
Inter Parties Review, Eden Deposition Exhibit 9—Leddar Tech, Solid-State LiDARs: Enabling the Automotive Industry Towards Autonomous Driving (2018), 6 pages. (IPR Nos. '255 and '256 Exhibit 1159).
Inter Parties Review, Excerpt from Beautiful Data, Edited by Toby Segaran and Jeff Hammerbacher (Jul. 2009), pp. 150-153. (IPR Nos. '255 and '256 Exhibit 2014).
Inter Parties Review, Excerpt from James T. Luxon and David E. Parker, Industrial Lasers and Their Applications, Prentice-Hall (1985), pp. 56, 68-70, 124-125, 145, 150-151, and 154-159. (IPR Nos. '255 and '256 Exhibit 2009).
Inter Parties Review, Excerpt from Peter W. Milonni and Joseph Eberly, Lasers (1988), pp. 585-589. (IPR Nos. '255 and '256 Exhibit 2011).
Inter Parties Review, Excerpt from Raymond T. Measures, Laser Remote Sensing, Fundamentals and Applications (1992), pp. 205 and 213-214. (IPR Nos. '255 and '256 Exhibit 2010).
Inter Parties Review, Excerpt from Stephan Lugomer, Laser Technology, Laser Driven Processes, Prentice-Hall (1990), pp. 302-311. (IPR Nos. '255 and '256 Exhibit 2008).
Inter Parties Review, Excerpt from William V. Smith, Laser Applications (1970), pp. 23-27. (IPR Nos. '255 and '256 Exhibit 2012).
Inter Parties Review, Excerpts of Deposition of Craig L. Glennie, Ph.D., *Quanergy Systems, Inc.*, v. *Velodyne Lidar, Inc.*, No. 5:16-cv-05251-EJD (N.D. Cal.) (Jun. 27, 2017), 6 pages. (IPR Nos. '255 and '256 Exhibit 2016).
Inter Parties Review, Final Written Decision (May 23, 2019), 41 pages. (IPR No. 2018-00256).
Inter Parties Review, Images of Generator Rotors (Brennan Deposition Exhibit 8) (2018), 2 pages. (IPR Nos. '255 and '256 Exhibit 2178).
Inter Parties Review, Listing of Labelled Substitute Claims (2018), 17 pages. (IPR Nos. '255 and '256 Exhibit 1076).
Inter Parties Review, Patent Owner's Contingent Motion to Amend (Public Version—Redacted) (Sep. 28, 2018), 57 pages. (IPR No. 2018-00256).
Inter Parties Review, Patent Owner's Preliminary Response (Public Version—Redacted) (Mar. 7, 2018), 73 pages. (IPR No. 2018-00256).
Inter Parties Review, Patent Owner's Reply in Support of Its Contingent Motion to Amend (Jan. 16, 2019), 33 pages. (IPR No. 2018-00256).
Inter Parties Review, Patent Owner's Response (Public Version—Redacted) (Sep. 28, 2018), 92 pages. (IPR No. 2018-00256).
Inter Parties Review, Patent Owner's Surreply (Jan. 16, 2019), 50 pages. (IPR No. 2018-00256).
Inter Parties Review, Patent Owner's Updated Exhibit List (Feb. 11, 2019), 20 pages. (IPR No. 2018-00256).
Inter Parties Review, Petition for Inter Partes Review of U.S. Pat. No. 7,969,558 (Claims 16-19 and 23-25) (IPR No. 2018-00256, *Quanergy Systems, Inc.* v. *Velodyne Lidar, Inc.*) (Nov. 29, 2017), 73 pages. (IPR No. 2018-00256).
Inter Parties Review, Petitioner Quanergy's Opposition to Patent Owner's Contingent Motion to Amend (Dec. 21, 2018), 35 pages. (IPR No. 2018-00256).
Inter Parties Review, Petitioner Quanergy's Sur-Surreply (Jan. 30, 2019), 9 pages. (IPR No. 2018-00256).
Inter Parties Review, Petitioner Quanergy's Surreply to Patent Owner's Contingent Motion to Amend (Jan. 30, 2019), 17 pages. (IPR No. 2018-00256).
Inter Parties Review, Petitioner's Motion to Submit Supplemental Information Pursuant to 37 C.F.R. § 42.123(b) (Aug. 6, 2018), 16 pages. (IPR No. 2018-00256).
Inter Parties Review, Petitioner's Reply to Patent Owner's Response (Dec. 21, 2018), 37 pages. (IPR No. 2018-00256).
Inter Parties Review, Petitioner's Request for Rehearing (Jun. 24, 2019), 20 pages. (IPR No. 2018-00256).
Inter Parties Review, Petitioner's Unopposed Motion to Submit Replacement Petition and Supplemental Declaration (Nov. 5, 2018), 9 pages. (IPR No. 2018-00256).
Inter Parties Review, Petitioner's Updated Exhibit List (Jan. 30, 2019), 15 pages. (IPR No. 2018-00256).
Inter Parties Review, PTAB Conference Call, *Quanergy Systems, Inc.* v. *Velodyne Lidar, Inc.*, Nos. IPR2018-00255 and 2018-00256 (Jan. 11, 2019), 27 pages. (IPR Nos. '255 and '256 Exhibit 2204).
Inter Parties Review, Quanergy Invalidity Contentions Claim Chart, U.S. Pat. No. 7,969,558 (Mizuno), *Quanergy Systems, Inc.* v. *Velodyne LiDAR, Inc.*, Case No. 5:16-cv-5251-EJD (Mar. 27, 2017), 17 pages. (IPR Nos. '255 and '256 Exhibit 1127).
Inter Parties Review, Quanergy Invalidity Contentions Claim Chart, U.S. Pat. No. 7,969,558 (PILAR), *Quanergy Systems, Inc.* v. *Velodyne LiDAR, Inc.*, Case No. 5:16-cv-5251-EJD (Mar. 27, 2017), 13 pages. (IPR Nos. '255 and '256 Exhibit 1128).
Inter Parties Review, Quanergy M8 Lidar Sensor Datasheet, 2 pages. (IPR Nos. '255 and '256 Exhibit 2071).
Inter Parties Review, Quanergy Systems Inc.'s Invalidity Contentions and Production of Documents Pursuant to Patent Local Rules 3-3 and 3-4, *Quanergy Systems, Inc.* v. *Velodyne LiDAR, Inc.*, Case No. 5:16-cv-5251-EJD (Mar. 27, 2017), 24 pages. (IPR Nos. '255 and '256 Exhibit 1126).
Inter Parties Review, Quanergy's Objected-to Demonstrative Slides of Patent Owner (2019), 16 pages. (IPR Nos. '255 and '256 Exhibit 1164).
Inter Parties Review, Redlined Supplemental Declaration of Dr. James F. Brennan III (2018), 171 pages. (IPR Nos. '255 and '256 Exhibit 1062).
Inter Parties Review, Replacement Petition for Inter Partes Review of U.S. Pat. No. 7,969,558 (Claims 16-19 and 23-25) (2018) 76 pages. (IPR No. 2018-00256).
Inter Parties Review, Transcript of Sep. 13, 2018 Conference Call, *Quanergy Systems, Inc.* v. *Velodyne Lidar, Inc.*, Nos. IPR2018-00255 and IPR2018-00256 (Sep. 13, 2018), 21 pages. (IPR Nos. '255 and '256 Exhibit 2116).
International Electrotechnical Commission, "Safety of laser products—part 1: equipment classification and requirements," International Standard IEC 60825-1, edition 1.2 (Aug. 2001), 122 pages.
International Electrotechnical Commission, "Safety of laser products—part 1: equipment classification and requirements," International Standard IEC 60825-1, edition 2.0 (2007), 104 pages.

(56) References Cited

OTHER PUBLICATIONS

Internet Archive Web Page: Laser Components (2004), 1 page. (IPR Nos. '255 and '256 Exhibit 1023).

Internet Archive Web Page: Laser Components: High Powered Pulsed Laser Diodes 905D3J08-Series (2004), 6 pages. (IPR Nos. '255 and '256 Exhibit 1024).

Internet Archive Webpage: Mercotac 3-Conductor Rotary Electrical Connectors (Mar. 2006), 1 page. (IPR Nos. '255 and '256 Exhibit 1031).

IPO Education Foundation, Inventor of the Year Award, https://www.ipoef.org/inventor-of-the-year/ (2018), 5 pages. (IPR Nos. '255 and '256 Exhibit 2207).

irdajp.org, IrDA Infrared Data Association, http://www.irdajp.org/irdajp.info (2018), 3 pages. (IPR Nos. '255 and '256 Exhibit 1134).

Janocha, Actuators: Basics and Applications, Springer (2004), pp. 85-153. (IPR Nos. '255 and '256 Exhibit 1080).

Japanese Patent Office, Petitioner's Translation of Mizuno Japanese Patent Publication No. H3-6407 (1991), 15 pages. (IPR Nos. '255 and '256 Exhibit 1058).

Jelalian, "Laser Radar Systems" (1992), 1 page.

Juberts, et al., "Status report on next generation LADAR for driving unmanned ground vehicles" Mobile Robots XVII, edited by Douglas W. Gage, Proceedings of SPIE, vol. 5609, 2004, pp. 1-12.

Kaempchen, Feature-Level Fusion of Laser Scanner and Video Data for Advanced Drive Assistance Systems (Ph.D. Dissertation, Ulm University) (2007), 248 pages. (IPR Nos. '255 and '256 Exhibit 2198).

Kaufmann, Choosing Your Detector, OE Magazine (Mar. 2005), 3 pages. (IPR Nos. '255 and '256 Exhibit 2150).

Kaufmann, Light Levels and Noise—Guide Detector Choices, Photonics Spectra 149 (Jul. 2000), 4 pages. (IPR Nos. '255 and '256 Exhibit 2151).

Kawata, "Development of ultra-small lightweight optical range sensor system", 2005 IEEE/RSJ International Conference on Intelligent Robots and Systems, Edmonton, AB, Canada, Aug. 2-6, 2005, pp. 58-63 (IPR Nos. '255 and '256 Exhibit 1033).

Kilpela, Excerpt of Pulsed Time-of-Flight Laser Range Finder Techniques for Fast, High Precision Measurement Applications, at Fig. 24 (Academic dissertation, University of Oulu (Brennan Deposition Exhibit 15) (2004), 1 page. (IPR Nos. '255 and '256 Exhibit 2185).

Kilpela, Pulsed Time-of-Flight Laser Range Finder Techniques for Fast, High Precision Measurement Applications (Academic dissertation, University of Oulu) (2004), 98 pages. (IPR Nos. '255 and '256 Exhibit 2152).

Kilpelä, "Precise pulsed time-of-flight laser range finder for industrial distance measurements," Review of Scientific Instruments (Apr. 2001), 13 pages. (IPR Nos. '255 and '256 Exhibit 1005).

Kluge, Laserscanner for Automotive Applications (May 2001), 5 pages. (IPR Nos. '255 and '256 Exhibit 2196).

Kohanbash, "LiDAR fundamentals—robots for roboticists" (May 5, 2014), 6 pages.

Lages, Laserscanner for Obstacle Detection in Advanced Microsystems for Automotive Applications Yearbook (S. Kruger et al. eds.) (2002), pp. 136-140. (IPR Nos. '255 and '256 Exhibit 2200).

Lamon, "The SmarTer for ELROB 2006—a vehicle for fully autonomous navigation and mapping in outdoor environments" (2005), 14 pages.

Langheim, et al., Sensing of Car Environment at Low Speed Driving, Carsense (2002), 14 pages. (IPR Nos. '255 and '256 Exhibit 2193).

Laser Components Produkte, Laser Components IG, Inc., 2004, 1 page.

Laser Components, "High Power Pulsed Laser Diodes 905D3J08-Series", Laser Components IG, Inc., 2004, 6 pages.

Laser Components, https:/web.archive.org/web/20041205172904/http:www.lasercomponents.com (2004), 1 page. (IPR Nos. '255 and '256 Exhibit 1023).

Liu, et al., "Coupling Study of a Rotary Capacitive Power Transfer System" Industrial Technology, 2009. ICIT 2009. IEEE International Conference, IEEE, Piscataway, NJ, USA, Feb. 10, 2009, pp. 1-6.

Maatta et al., A High-Precision Time-to-Digital Converter for Pulsed Time-of-Flight Laser Radar Applications, 47 IEEE No. 2, 521 (Apr. 1998), pp. 521-536. (IPR Nos. '255 and '256 Exhibit 2161).

Macadam, Understanding and Modeling the Human Driver, 40 Vehicle System Dynamics, Nos. 1-3 (2003), pp. 101-134. (IPR Nos. '255 and '256 Exhibit 2205).

Makynen, Position-Sensitive Devices and Sensor System for Optical Tracking and Displacement Sensing Applications (Academic Dissertation, University of Oulu (2000), 121 pages. (IPR Nos. '255 and '256 Exhibit 2153).

Manandhar, "Auto-Extraction of Urban Features from Vehicle-Borne Laser Data", Centre for Spatial Information Science, The University of Tokyo, Japan; Symposium on Geospatial Theory, Processing Applications, Ottawa (2002) 6 pages. (IPR Nos. '255 and '256 Exhibit 1017).

Marino, "A compact 3D imaging laser RADAR system using Geiger-mode APD arrays: system and measurements," Proceedings of SPIE—The international society for optical engineering (Aug. 2003), 16 pages.

Marino, "Jigsaw: A Foliage-Penetrating 3D Imaging Laser Radar System" (2005), pp. 23-36.

McManamon, "Optical Phased Array Technology," Proceedings of the IEEE, vol. 84, No. 2 (Feb. 1996), pp. 268-298.

Melle, et al., "How to select avalanche photodiodes," Laser Focus World (Oct. 1, 1995), 9 pages. (IPR Nos. '255 and '256 Exhibit 1020).

Mercotac Model 305, Electrical Slip Rings, https://web.archive.org/web/200602100652519/www.mercotac.com/html/305.htm (Feb. 2006), 3 pages.

Mercotac, 3-Conductor Rotary Electrical Connectors https://web.archive.org/web/20060317120209/http://www.mercotac.com:80/html/threeconductor.html (Mar. 2006), 1 page.

Merriam, How to Use Lidar with the raspberry PI, Hackaday, https://hackaday.com/2016/01/22/how-to-use-lidar-with-the-raspberry-pi/ (Jan. 22, 2016), 13 pages. (IPR Nos. '255 and '256 Exhibit 1072).

Morsy et al., "Multispectral LiDAR Data for Land Cover Classification of Urban Areas," Sensors 17(5), 958 (2017), 21 pages.

MTI Instruments Inc., An Introduction to Laser Triangulation Sensors, https://www.azosensors.com/article.aspx?ArticleID=523 (Aug. 28, 2014), 9 pages. (IPR Nos. '255 and '256 Exhibit 2154).

Nagappan, "Adaptive Cruise Control: Laser Diodes as an Alternative to Millimeter Wave Radars" (Sep. 2005), pp. 1-5.

National Highway Traffic Safety Administration (NHTSA), DOT, Final Rule Federal Motor Vehicle Safety Standards; Tire Pressure Monitoring Systems Controls and Displays (2005), 222 pages. (IPR Nos. '255 and '256 Exhibit 1141).

Office of the Federal Register National Archives and Records Administration, "Code of Federal Regulations, 21, Parts 800 to 1299, Revised as of Apr. 1, 2005, Food and Drugs", Apr. 1, 2005, pp. 1-23.

Ogurtsov, et al., "High Accuracy ranging with Yb3+-doped fiber-ring frequency-shifted feedback laser with phase-modulated seed," Optics Communications (2006), pp. 266-273. (IPR Nos. '255 and '256 Exhibit 1042).

Ohnsman, How A 34-Year-Old Audio Equipment Company is Leading the Self-Driving Car Revolution, Forbes (Aug. 8, 2017), 7 pages. (IPR Nos. '255 and '256 Exhibit 2040).

Ohr, "War raises stakes of next DARPA bot race," EDN (Aug. 15, 2005), 3 pages.

Omron, Technical Explanation for Displacement Sensors and Measurement Sensors, CSM_Displacemente_LineWidth_TG_E_2_1 (2018), 8 pages. (IPR Nos. '255 and '256 Exhibit 2149).

Oshkosh, "Team Terramax: DARPA Grand Challenge 2005" (Oct. 2005), pp. 1-14.

Ou-Yang, et al., "High-dynamic-range laser range finders based on a novel multimodulated frequency method," Optical Engineering (Dec. 2006), 6 pages. (IPR Nos. '255 and '256 Exhibit 1043).

(56) References Cited

OTHER PUBLICATIONS

Overton, First Sensor expands supply agreement for APDs used in Velodyne lidar systems, Laser Focus World (Feb. 15, 2017), 2 pages. (IPR Nos. '255 and '256 Exhibit 2039).
Ozguner, "Team TerraMax and the DARPA Grand Challenge: a General Overview," IEEE Intelligent Vehicles Symposium (2004), 6 pages.
Panasonic, Measurement Sensors: Specular vs Diffuse, Panasonic Blog, https://na.industrial.panasonic.com/blog/measurement-sensorsspecular-vs-diffuse (Dec. 7, 2011), 2 pages. (IPR Nos. '255 and '256 Exhibit 2155).
PCT International Search Report and Written Opinion, App. No. PCT/US2007/073490, (2008), 10 pages.
PCT International Search Report and Written Opinion, App. No. PCT/US2010/037129, dated Jul. 27, 2010, 6 pages.
PCT International Search Report and Written Opinion, App. No. PCT/US2017/015869, dated Apr. 10, 2017, 12 pages.
PCT International Search Report and Written Opinion, App. No. PCT/US2017/015874, dated May 23, 2017, 12 pages.
PCT International Search Report and Written Opinion, App. No. PCT/US2017/015877, dated Apr. 13, 2017, 13 pages.
PCT International Search Report and Written Opinion, App. No. PCT/US2017/023259, dated May 31, 2017, 10 pages.
PCT International Search Report and Written Opinion, App. No. PCT/US2017/023261, dated May 26, 2017, 11 pages.
PCT International Search Report and Written Opinion, App. No. PCT/US2017/023262, dated Jun. 5, 2017, 9 pages.
PCT International Search Report and Written Opinion, App. No. PCT/US2017/035427, dated Aug. 29, 2017, 10 pages.
PCT International Search Report and Written Opinion, App. No. PCT/US2017/036865, dated Sep. 26, 2017, 10 pages.
PCT International Search Report and Written Opinion, App. No. PCT/US2017/047543, dated Nov. 27, 2017, 11 pages.
PCT International Search Report and Written Opinion, App. No. PCT/US2018/023283, dated Jun. 1, 2018, 9 pages.
PCT International Search Report and Written Opinion, App. No. PCT/US2018/025395, dated Jun. 25, 2018, 14 pages.
PCT International Search Report and Written Opinion, App. No. PCT/US2018/031682, dated Sep. 17, 2018, 12 pages.
PCT International Search Report and Written Opinion, App. No. PCT/US2018/050934, dated Nov. 20, 2018, 10 pages.
PCT International Search Report and Written Opinion, App. No. PCT/US2018/051497, dated Nov. 28, 2018, 11 pages.
PCT International Search Report and Written Opinion, App. No. PCT/US2018/059062, dated Jan. 16, 2019, 6 pages.
PCT International Search Report and Written Opinion, App. No. PCT/US2018/059452, dated Jan. 16, 2019, 12 pages.
PCT International Search Report and Written Opinion, App. No. PCT/US2019/016259, dated Apr. 26, 2019, 6 pages.
PCT International Search Report and Written Opinion, App. No. PCT/US2019/046412, dated Jun. 24, 2020, 10 pages.
PCT International Search Report and Written Opinion, App. No. PCT/US2019/046419, dated Oct. 29, 2019, 14 pages.
PCT International Search Report and Written Opinion, App. No. PCT/US2019/046422, dated Dec. 3, 2019, 9 pages.
PCT International Search Report and Written Opinion, App. No. PCT/US2019/046573, dated Nov. 15, 2019, 9 pages.
PCT International Search Report and Written Opinion, App. No. PCT/US2019/051729, dated Nov. 20, 2019, 7 pages.
PCT Search Report and Written Opinion (Corrected), App. No. PCT/US2020/026925, dated May 12, 2020, 5 pages.
PCT Search Report and Written Opinion, App. No. PCT/US2020/012633, dated Jun. 2, 2020, 13 pages.
PCT Search Report and Written Opinion, App. No. PCT/US2020/012635, dated Jun. 4, 2020, 10 pages.
Piatek et al., LiDAR: A photonics guide to autonomous vehicle market, Hamamatsu.com, https://hub.hamamatsu.com/us/en/application-note/LiDAR-competingtechnologies-automotive/index.html (Nov. 18, 2017), 6 pages. (IPR Nos. '255 and '256 Exhibit 2136).
Piatek, Measuring distance with light, Hamamatsu.com, https://hub.hamamatsu.com/us/en/application-note/measuringdistance-with-light/index.html (Apr. 2, 2015), 18 pages. (IPR Nos. '255 and '256 Exhibit 2132).
Piatek, Presentation entitled 'LiDAR and Other Techniques—Measuring Distance with Light for Automotive Industry', authored by Slawomir Piatek, Technical Consultant, Hamamatsu Corp. (Dec. 6, 2017), 66 pages. (IPR Nos. '255 and '256 Exhibit 2131).
Popper, Guiding Light, The Billion-Dollar Widget Steering the Driverless Car Industry, The Verge (Oct. 18, 2017), 17 pages. (IPR Nos. '255 and '256 Exhibit 2076).
Qing, "Method of 3D visualization using laser radar on board of mobile robot," Journal of Jilin University (Information Science Ed.), vol. 22 (Jul. 2004), 4 pages.
*Quanergy Systems, Inc.* v. *Velodyne LiDAR, Inc.* (N.D. Cal.), Case No. 5:16-cv-05251, "Plaintiff Quanergy Systems, Inc.'s Amended Invalidity Contentions Pursuant to Patent Local Rule 3-3,'" May 23, 2017, 238 pages.
*Quanergy Systems, Inc.* v. *Velodyne LiDAR, Inc.* (N.D. Cal.), Case No. 5:16-cv-05251, "Plaintiff Quanergy Systems, Inc.'s Invalidity Contentions and Production of Documents Pursuant to Patent Local Rules 3-3 and 3-4," Mar. 27, 2017, 24 pages.
*Quanergy Systems, Inc.* v. *Velodyne LiDAR, Inc.* (N.D. Cal.), Case No. 5:16-cv-05251, Amended Complaint, Nov. 18, 2016, 6 pages.
*Quanergy Systems, Inc.* v. *Velodyne LiDAR, Inc.* (N.D. Cal.), Case No. 5:16-cv-05251, Answer to Counterclaim, (Jan. 16, 2017) 9 pages.
*Quanergy Systems, Inc.* v. *Velodyne LiDAR, Inc.* (N.D. Cal.), Case No. 5:16-cv-05251, Defendant Velodyne's Answer and Counterclaim, Dec. 5, 2016, 20 pages.
*Quanergy Systems, Inc.* v. *Velodyne LiDAR, Inc.* (N.D. Cal.), Complaint, Case No. 5:16-cv-05251 (Sep. 13, 2016), 21 pages.
Ramsey et al., Use Scenarios to Plan for Autonomous Vehicle Adoption, Gartner (Jun. 26, 2017), 17 pages. (IPR Nos. '255 and '256 Exhibit 2064).
Reutebuch, "LiDAR: an Emerging Tool for Multiple Resource Inventory," Journal of Forestry (Sep. 2005) 7 pages.
Reymann et al., Improving LiDAR Point Cloud Classification using Intensities and Multiple Echoes, IEE/RSJ International Conference on Intelligent Robots and Systems (Sep. 2015), 8 pages. (IPR Nos. '255 and '256 Exhibit 2167).
Richmond et al., Polarimetric Imaging Laser Radar (PILAR) Program. In Advanced Sensory Payloads for UAV, Meeting Proceedings RTO-MP-SET-092, Paper 19. Neuilly-sur-Seine, France: RTO (May 1, 2005), 35 pages. (IPR Nos. '255 and '256 Exhibit 1129).
Riegl LMS-Q120, http://web.archive.org/web/20050113054822/http://www.riegl.com/industrial_scanners_/Ims_q120_/q120_all_.htm (2005), 4 pages.
Riegl, "Riegl LMS-Z210" (2003), 8 pages.
Robots for Roboticists, LiDAR Fundamentals, http://robotsforroboticists.com/lidar-fundamentals/ (May 5, 2014), 6 pages. (IPR Nos. '255 and '256 Exhibit 1068).
ROS-Drivers—Error in packet rate for the VLP-32C #142, GitHub Forum (Jan. 29, 2018), 1 page. (IPR Nos. '255 and '256 Exhibit 2041).
Saleh, "Fundamentals of Photonics" vol. 2, Wiley-Interscience Publication, 1991, pp. 342-383, 494-541, and 592-695. (IPR Nos. '255 and '256 Exhibit 1008).
Search Report and Opinion, EP App. No. 07840406.8, dated Sep. 8, 2009, 6 pages.
Search Report and Opinion, EP App. No. 11166432.2, dated Jul. 28, 2011, 7 pages.
Search Report and Opinion, EP App. No. 17745112.7, dated Aug. 27, 2019, 8 pages.
Search Report and Opinion, EP App. No. 17770748.6, dated Oct. 22, 2019, 10 pages.
Search Report and Opinion, EP App. No. 17770926.8, dated Oct. 29, 2019, 11 pages.
Search Report and Opinion, EP App. No. 17770928.4, dated Oct. 29, 2019, 10 pages.
Search Report and Opinion, EP App. No. 17807474.6, dated Dec. 9, 2019, 9 pages.

(56) References Cited

OTHER PUBLICATIONS

Sensick, "DME 2000 / DME 3000: Precise non-contact distance determination," Sensick Catalogue (2006), pp. 450-457. (IPR Nos. '255 and '256 Exhibit 1073).
Sick DME 2000 Operating Instructions (Excerpt) (Brennan Deposition Exhibit 9) (May 2002), 42 pages. (IPR Nos. '255 and '256 Exhibit 2179).
Sick Laser Triangulation Sensors Product Information (Brennan Deposition Exhibit 6) (Jun. 25, 2018), 76 pages. (IPR Nos. '255 and '256 Exhibit 2176).
Sick LMS 200/ LMS 211/ LMS 220 / LMS 221/ LMS 291 Laser Measurement Systems—Technical Description (Brennan Deposition Exhibit 4) (Jun. 2003), 40 pages. (IPR Nos. '255 and '256 Exhibit 2174).
Sick LMS200/211/221/291 Laser Measurement Systems—Technical Description (Brennan Deposition Exhibit 3) (2006), 48 pages. (IPR Nos. '255 and '256 Exhibit 2173).
Sick Sensick Measuring Distance with Light—Distance Sensors Product Overview (Brennan Deposition Exhibit 10) (2004), 12 pages. (IPR Nos. '255 and '256 Exhibit 2180).
Sick, Sick ToF sensors at close range, https://web.archive.org/web/20040607070720/ http:/www.sick.de:80/de/products/categories/industrial/distancesensors/dme2000/en.html (Jun. 7, 2004), 2 pages. (IPR Nos. '255 and '256 Exhibit 1082).
Singh, "Cyclone: A Laser Scanner for Mobile Robot Navigation" (Sep. 1991), pp. 1-18.
Skolnik, "Introduction to radar systems," Second edition, McGraw-Hill book company (1980), pp. 1-3.
Skolnik, "Radar Handbook" Second Edition, McGraw-Hill Publishing Company, 1990, pp. 1-1191.
Song et al., Assessing the Possibility of Land-Cover Classification Using LiDAR Intensity Data, Commission III, PCV02 (2002), 4 pages. (IPR Nos. '255 and '256 Exhibit 2169).
SPIES, "Extended Eyes—Sense and Avoid," Presented at the 2006 International Aerospace Exhibition, Berlin (May 2006), 22 pages.
Stone, "Performance analysis of next-generation LADAR for manufacturing, construction, and mobility" (May 2004), 198 pages.
Strang, Drawing of cross-section of I-beam by Jonathan Strang (Brennan Deposition Exhibit 5), (2018) 1 page. (IPR Nos. '255 and '256 Exhibit 2175).
strata-gee.com, Velodyne President Calls Strata-gee to Set the Record Straight, https://www.strata-gee.com/velodyne-president-calls-strata-gee-setrecord-straight/ (Jun. 26, 2014), 6 pages. (IPR Nos. '255 and '256 Exhibit 1137).
Strawa et al., The Measurement of Aerosol Optical Properties Using Continuous Wave Cavity Ring-Down Techniques, 20 Journal of Atmospheric and Oceanic Technology 454 (Apr. 2003), pp. 454-465. (IPR Nos. '255 and '256 Exhibit 2090).
Tarakanov, et al., "Picosecond pulse generation by internal gain switching in laser diodes," Journal of Applied Physics 95:223 (Mar. 2004), pp. 2223-2229. (IPR Nos. '255 and '256 Exhibit 1044).
Taranovich, Are processor algorithms key to safe self-driving cars? EDN ASIA, https://www.ednasia.com/news/article/are-processor-algorithms-key-tosafe-self-driving-cars (Jul. 7, 2016), 11 pages. (IPR Nos. '255 and '256 Exhibit 2206).
Taylor, An Introduction to Error Analysis—The Study of Uncertainties in Physical Measurements, Oxford University Press (1982), pp. 81-137. (IPR Nos. '255 and '256 Exhibit 1138).
The American Heritage Dictionary of the English Language, Houghton Mifflin Company, 3d ed. (1996), pp. 1497, 1570, 1697, 1762, and 1804. (IPR Nos. '255 and '256 Exhibit 1018).
The American Society of Mechanical Engineers, Welded and Seamless Wrought Steel Pipe, ASME B36.10M-2004 (Oct. 25, 2004), 26 pages. (IPR Nos. '255 and '256 Exhibit 2138).
The Laser Institute of America, "American National Standard of Safe Use of Lasers" ANSI Z136.1-2000, Revision of ANSI Z136.1-1993, Second Printing 2003, 32 pages.
Thin Lens Equation, http://hyperphysics.phyastr.gsu.edu/hbase/geoopt/lenseq.html (last visited Dec. 30, 2018) (Brennan Deposition Exhibit 7), 4 pages. (IPR Nos. '255 and '256 Exhibit 2177).

Thomas, "A procedure for multiple-pulse maximum permissible exposure determination under the Z136.1-2000 American national standard for safe use of lasers," Journal of Laser Applications, Aug. 2001, vol. 13, No. 4, pp. 134-140.
Thrun, "Probabilistic Terrain Analysis for High-Speed Desert Driving" (Oct. 2005), 7 pages.
Trepagnier, "Team gray technical paper," DARPA grand challenge 2005 (Aug. 28, 2005), 14 pages.
Turk, et al., VITS—A Vision System for Autonomous Land Vehicle Navigation, 10 IEEE No. 3 (May 1988), pp. 342-361. (IPR Nos. '255 and '256 Exhibit 2147).
U.S. District Court, Claim Construction Order, *Quanergy Systems, Inc.* v. *Velodyne LiDAR, Inc.*, Case No. 5:16-cv-5251-EJD (Oct. 4, 2017), 33 pages. (IPR Nos. '255 and '256 Exhibit 1027).
U.S. International Trade Commission, Investigation No. 337-TA-1173, "Respondent Hesai Photonics Technology Co., Ltd.'s Notice of Prior Art," Nov. 13, 2019, 35 pages.
U.S. International Trade Commission, Investigation No. 337-TA-1173, "Respondent Robosense's Notice of Prior Art," Nov. 13, 2019, 34 pages.
U.S. Patent Office, Information Disclosure Statement, U.S. Appl. No. 10/391,383 (U.S. Pat. No. 7130672, Pewzner) (filed Aug. 3, 2005), 8 pages.
U.S. Patent Office, Information Disclosure Statement, U.S. Appl. No. 10/508,232 (U.S. Pat. No. 7,313,424, Mayevsky) (filed Apr. 21, 2006), 17 pages.
Ullrich, et al., "High-performance 3D-imaging laser sensor," Proceedings of SPIE vol. 3707 (Jun. 1999), pp. 658-664. (IPR Nos. '255 and '256 Exhibit 1014).
Ultra Puck, VLP-32C Data Sheet (2018), 2 pages. (IPR Nos. '255 and '256 Exhibit 2093).
Urmson, "High speed navigation of unrehearsed terrain: red team technology for grand challenge 2004" (Jun. 1, 2004), 47 pages.
USGS, EROS CalVal Center of Excellence (ECCOE), https://calval.cr.usgs.gov/wordpress/wpcontent/uploads/JACIE_files/JACIE06/Files/312Habib.pdf (Dec. 21, 2018), 3 pages. (IPR Nos. '255 and '256 Exhibit 1071).
Uwinnipeg, Centripetal Acceleration, Uwinnipeg.ca, http://theory.uwinnipeg.ca/physics/circ/node6.html (1997), 2 pages. (IPR Nos. '255 and '256 Exhibit 2157).
Velodyne Acoustics, Inc., Motor Specification, Merlin Project, Rev. E1 Initial Engineering Release (Apr. 29, 2009), 1 page. (IPR Nos. '255 and '256 Exhibit 2020).
Velodyne Acoustics, Inc., Motor Winding Specs., P2.0 , E2 Changed Material (Mar. 10, 2010), 1 page. (IPR Nos. '255 and '256 Exhibit 2022).
Velodyne Acoustics, Inc., Outline Drawing HDL-64E S3 Envelope Drawing, Rev. A (Apr. 21, 2015), 1 page. (IPR Nos. '255 and '256 Exhibit 2094).
Velodyne LiDAR Products, PowerPoint (Jan. 18, 2017), 9 pages. (IPR Nos. '255 and '256 Exhibit 2031).
Velodyne LiDAR, CAD Drawing of MotorStat-38in, HDL-64E (2018), 1 page. (IPR Nos. '255 and '256 Exhibit 2063).
Velodyne LiDAR, CAD Drawing of MotorStat3in, HDL-64E(2018), 1 page. (IPR Nos. '255 and '256 Exhibit 2021).
Velodyne LiDAR, CAD Drawing of Rotor, HDL-64E (2018), 1 page. (IPR Nos. '255 and '256 Exhibit 2026).
Velodyne LiDAR, CAD Drawing of RotorAI, HDL-64E (2018), 1 page. (IPR Nos. '255 and '256 Exhibit 2027).
Velodyne LiDAR, Envelope Hi Res VLP-16 Drawings, Rev. A (Jun. 30, 2016), 4 pages. (IPR Nos. '255 and '256 Exhibit 2061).
Velodyne LiDAR, Excerpts of VLP-32C User Manual, 63-9325 Rev. B (2018), 26 pages. (IPR Nos. '255 and '256 Exhibit 2034).
Velodyne LiDAR, First Sensor Annual Report (2016), pp. 1-143. (IPR Nos. '255 and '256 Exhibit 2038).
Velodyne LiDAR, HDL-32E Data Sheet (2017), 2 pages. (IPR Nos. '255 and '256 Exhibit 2042).
Velodyne LiDAR, HDL-32E Envelope Drawing (2018), 1 page. (IPR Nos. '255 and '256 Exhibit 2043).
Velodyne LiDAR, HDL-32E Supported Sensors, Poly Synch Docs 2.3.2, http://docs.polysync.io/sensors/velodyne-hdl-32e/ (2018), 7 pages. (IPR Nos. '255 and '256 Exhibit 2055).

(56) References Cited

OTHER PUBLICATIONS

Velodyne LiDAR, HDL-32E User's Manual and Programing Guide (Aug. 2016), 29 pages. (IPR Nos. '255 and '256 Exhibit 2044).
Velodyne LiDAR, HDL-64E Data Sheet (2018), 2 pages. (IPR Nos. '255 and '256 Exhibit 2069).
Velodyne LiDAR, HDL-64E S2 and S2.1 User's Manual and Programming Guide (Nov. 2012), 43 pages. (IPR Nos. '255 and '256 Exhibit 2050).
Velodyne LiDAR, HDL-64E S2 Datasheet (Mar. 2010), 2 pages. (IPR Nos. '255 and '256 Exhibit 2047).
Velodyne LiDAR, HDL-64E S3 Data Sheet (2016), 2 pages. (IPR Nos. '255 and '256 Exhibit 2048).
Velodyne LiDAR, HDL-64E S3 User's Manual and Programming Guide (May 2013), 54 pages. (IPR Nos. '255 and '256 Exhibit 2051).
Velodyne LiDAR, HDL-64E User's Manual (Mar. 2008), 21 pages. (IPR Nos. '255 and '256 Exhibit 2052).
*Velodyne Lidar, Inc.* v. *Hesai Photonics Technology Co., Ltd.* (N.D. Cal.), Complaint, Case No. 5:19-cv-04742 (Aug. 13, 2019), 13 pages.
*Velodyne Lidar, Inc.* v. *Sunteng Innovation Technology Co., Ltd.* ("Robosense") (N.D. Cal.), Complaint, Case No. 5:19-cv-04746 (Aug. 13, 2019), 13 pages.
Velodyne LiDAR, Inc., Production Worksheet Detector, Item #24-AD5009 in Production, AD500-9 NIR Photodiode (Jan. 18, 2018), 1 page. (IPR Nos. '255 and '256 Exhibit 2024).
Velodyne LiDAR, Inc., Production Worksheet, Item #30-AD230CER2 in Production, APD, 230UM, Ceramic Submount (Jan. 17, 2018), 1 pages. (IPR Nos. '255 and '256 Exhibit 2023).
Velodyne LiDAR, It Began With a Race . . . 16 Years of Velodyne LiDAR, Velodyne LiDAR Blog, available at http://velodynelidar.com/blog/it-began-with-a-race/ (2018), 8 pages. (IPR Nos. '255 and '256 Exhibit 2070).
Velodyne LiDAR, Product Guide (2018), 1 page. (IPR Nos. '255 and '256 Exhibit 2058).
Velodyne LiDAR, Puck, Real-time 3D LiDAR Sensor, VLP-16 Data Sheet (2017), 2 pages. (IPR Nos. '255 and '256 Exhibit 2060).
Velodyne LiDAR, Ultra Puck™ VLP-32 Data Sheet (2014), 2 pages. (IPR Nos. '255 and '256 Exhibit 2032).
Velodyne LiDAR, Velodyne Donates LiDAR and Robotic Artifacts to Smithsonian, Point of Engineering, Point of Beginning (May 23, 2011), 2 pages. (IPR Nos. '255 and '256 Exhibit 2078).
Velodyne LiDAR, VLP-16 User's Manual and Programming Guide (Mar. 2016), 49 pages. (IPR Nos. '255 and '256 Exhibit 2062).
Velodyne LiDAR, VLP-32C User Manual, 63-9325 Rev. B. (Feb. 2, 2018), 136 pages. (IPR Nos. '255 and '256 Exhibit 2114).
Velodyne LiDAR, Webserver User Guide VLP-16 & HDL-32E (63-6266 Rev A) (Nov. 2015), 32 pages. (IPR Nos. '255 and '256 Exhibit 2013).
Velodyne LiDAR, White Paper, Velodyne's HDL-64E: A High Definition Lidar Sensor for 3-D Applications (Oct. 2007), 7 pages. (IPR Nos. '255 and '256 Exhibit 2059).
Velodyne, Velodyne—High Definition Lidar—Overview https://web.archive.org/web/20071107104255/ http://www.velodyne.com:80/lidar/products/overview.aspx (Nov. 7, 2007), 1 page. (IPR Nos. '255 and '256 Exhibit 1091).
Velodyne, Velodyne HDL Applications, https://web.archive.org/web/20080716041931/ http://www.velodyne.com:80/lidar/technology/applications.aspx (Jul. 16, 2008), 1 page. (IPR Nos. '255 and '256 Exhibit 1106).
Velodyne, Velodyne HDL-64E user manual, https://web.archive.org/web/20081117092628/ http://www.velodyne.com/lidar/products/manual/HDL-64E%20Manual.pdf (Nov. 17, 2008), 23 pages. (IPR Nos. '255 and '256 Exhibit 1090).
Velodynelidar, Data to Improve the Cost, Convenience and Safety of Motor Vehicles, https://velodynelidar.com/industry.html (2018), 6 pages. (IPR Nos. '255 and '256 Exhibit 1125).
Weber, Where to? A History of Autonomous Vehicles, Computer History Museum, https://support.garmin.com/en-US/?faq=IVeHYIKwChAY0qCVhQiJ67 (May 8, 2014), 23 pages. (IPR Nos. '255 and '256 Exhibit 2146).
Westinghouse, "AN/TPS-43 E Tactical Radar System" (1999), pp. 1-14.
Widmann, "Development of Collision Avoidance Systems at Delphi Automotive Systems" (1998), pp. 353-358.
Wikipedia, "Laser" (Nov. 10, 2017), 25 pages. (IPR Nos. '255 and '256 Exhibit 1022).
Willhoeft et al., "QUASI-3D Scanning with Laserscanners," Ibeo Automobile Sensor, 8th World Congress on Intelligent Transport Systems—Quasi-3D Scanning (2001), Ibeo Automobile Sensor, 8th World Congress on Intelligent Transport Systems—Quasi-3D Scanning (2001), 12 pages. (IPR Nos. '255 and '256 Exhibit 1077).
Williams, Bias Voltage and Current Sense Circuits for Avalanche Photodiodes—Feeding and Reading the APD, Linear Technology AN92-1 (Nov. 2012), 32 pages. (IPR Nos. '255 and '256 Exhibit 2125).
Williams, Driverless cars yield to reality: It's a long road ahead, PC World (Jul. 8, 2013), 6 pages. (IPR Nos. '255 and '256 Exhibit 2073).
Wulf et al., "Fast 3D Scanning Methods for Laser Measurement Systems, CSCS-14, 14th Int'l Conference on Control Systems and Computer Science" (Jul. 2003), pp. 312-317. (IPR Nos. '255 and '256 Exhibit 1078).
Wulf, "2D Mapping of Cluttered Indoor Environments by Means of 3D Perception," Proceedings of the 2004 IEEE International Conference on Robotics & Automation (Apr. 2004), pp. 4204-4209.
Yang, et al., "Performance of a large-area avalanche photodiode at low temperature for scintillation detection," Nuclear Instruments and Methods in Physics Research (2003), pp. 388-393 (IPR Nos. '255 and '256 Exhibit 1034).
Yu et al., A New 3D Map Reconstruction Based Mobile Robot Navigation, IEEE (2006), 4 pages. (IPR Nos. '255 and '256 Exhibit 2189).
Zappa, et al., SPADA: Single-Photon Avalanche Diode Arrays, IEEE Photonics Technology Letters, vol. 17, No. 3 (Mar. 2005), 9 pages. (IPR Nos. '255 and '256 Exhibit 1135).
Zhao, "A vehicle-borne urban 3-D acquisition system using single-row laser range scanners," IEEE transactions on systems, man, and cybernetics, vol. 33, No. 4 (Aug. 2003), pp. 658-666.
Zhao, "Reconstructing Textured CAD Model of Urban Environment Using Vehicle-Borne Laser Range Scanners and Line Cameras," Lecture Notes in Computer Science, vol. 2095 (2001), pp. 284-297.
Zheng, "The Technique of Land 3D Laser Scanning and Imaging Surveying," Railway Aerial Survey, vol. 2 (2003), 3 pages.
U.S. Appl. No. 16/931,218, filed Jul. 16, 2020, Hall et al.
U.S. Appl. No. 16/134,068, filed Sep. 18, 2018, Hall et al.
U.S. Appl. No. 16/890,951, filed Jun. 2, 2020, Hall et al.
U.S. Appl. No. 17/255,948, filed Dec. 23, 2020, Xiang et al.
*Quanergy Systems, Inc.* v. *Velodyne Lidar, Inc.* (Fed. Cir.), Docket No. 20-2070, filed Jul. 27, 2020, U.S. Pat. No. 7,969,558.
*Quanergy Systems, Inc.* v. *Velodyne Lidar, Inc.* (Fed. Cir.), Docket No. 20-2072, filed Jul. 27, 2020, U.S. Pat. No. 7,969,558.
Canadian Patent Office, Office Action, App. No. CA 3,012,003 (dated Sep. 18, 2020), 4 pages.
Canadian Patent Office, Office Action, App. No. CA 3,024,510 (dated Oct. 16, 2020), 6 pages.
European Patent Office, Communication Pursuant to Rules 70(2) and 70a(2) EPC, App. No. 18771534.7 (dated Jan. 14, 2021), 1 page.
European Patent Office, Examination Report, Appl. No. 17745112.7 (dated Jul. 1, 2020), 6 pages.
European Patent Office, Office Action, App. No. 17770748.6 (dated Sep. 14, 2020), 10 pages.
European Patent Office, Office Action, App. No. 17770926.8 (dated Sep. 9, 2020), 5 pages.
European Patent Office, Office Action, App. No. 18886541.4 (dated Jun. 3, 2020), 3 pages.
Extended Search Report, EP App. No. 18774795.1, dated Nov. 11, 2020, 9 pages.

(56) References Cited

OTHER PUBLICATIONS

Extended Search Report, EP App. No. 18798447.1, dated Dec. 10, 2020, 7 pages.
Glennie, C., et al., "A Comparison of Laser Scanners for Mobile Mapping Applications," Abstract and slides for a presentation given in 2011, 22 pages.
Glennie, C., et al., "Static Calibration and Analysis of the Velodyne HDL-64E S2 for High Accuracy Mobile Scanning," Remote Sensing 2010, 2: pp. 1610-1624.
International Search Report of PCT/CN2019/093266 dated Sep. 30, 2019, 3 pages.
Japanese Patent Office, Notice of Reasons for Rejections, App. No. 2018-549918 (dated Jan. 26, 2021), 4 pages.
Japanese Patent Office, Office Action, App. No. 2019-500215 (dated Dec. 8, 2020), 5 pages.
Merriam-Webster, Aperture definition, https://web.archive.org/web/20170817144540/https://www.merriam-webster.com/dictionary/aperture (Aug. 17, 2017), 4 pages.
Milenkovic, "Introduction to LiDAR," NEWFOR2014 Summer School (Jul. 2014), 77 pages (IPR. Nos. '255 and '256, Exhibit 2166).
Neff, "The Laser That's Changing the World," Prometheus Books (2018), pp. 193-204 and 270-271.
Russian Patent Office, Office Action, App. No. 2020121407 (dated Jul. 23, 2020), 5 pages.
Satterfield, B., et al., "Advancing Robotics: The Urban Challenge Effect," Journal of Aerospace Computing, Information, and Communication, vol. 5, Dec. 2008, pp. 530-542.
Sick, "Distance Sensors," https://web.archive.org/web/20041213053807/http:/www.lpc-uk.com:80/sick/sickdist.htm (Dec. 13, 2004), 3 pages.
U.S. International Trade Commission, Investigation No. 337-TA-1173, Appendix B to Respondent's Response to the Complaint and Notice of Investigation, Oct. 21, 2019, pp. 1-4.
U.S. International Trade Commission, Investigation No. 337-TA-1173, "Complainant Velodyne and Respondent Hesai's Joint Notice," Jul. 9, 2020, 3 pages.
U.S. International Trade Commission, Investigation No. 337-TA-1173, "Complainant Velodyne Lidar Inc.'s Motion for Summary Determination," Public Version, Mar. 6, 2020, 168 pages.
U.S. International Trade Commission, Investigation No. 337-TA-1173, "Complainant Velodyne Lidar Inc.'s Opposition to Respondent Hesai's Motion for Summary Determination of Invalidity of U.S. Pat. No. 7,969,558," Public Version, Mar. 18, 2020, 184 pages.
U.S. International Trade Commission, Investigation No. 337-TA-1173, "Complainant Velodyne Lidar Inc.'s Opposition to Respondent Hesai's Motion to Amend," Public Version, Feb. 28, 2020, 108 pages.
U.S. International Trade Commission, Investigation No. 337-TA-1173, "Complainant Velodyne Lidar, Inc.'s Disclosure of Domestic Industry Products," Nov. 8, 2019, 3 pages.
U.S. International Trade Commission, Investigation No. 337-TA-1173, "Complainant Velodyne Lidar, Inc.'s Motion in Limine No. 3 to Exclude Evidence and Testimony that Krumes Discloses any Limitations of Claims 2 and 9 of the '558 Patent," Sep. 2, 2020, 26 pages.
U.S. International Trade Commission, Investigation No. 337-TA-1173, "Complainant Velodyne's Motion in Limine No. 1 to Limit the Testimony of Robosense's Expert, Jason Janet, PhD.," Public Version, Sep. 2, 2020, 34 pages.
U.S. International Trade Commission, Investigation No. 337-TA-1173, "Complainant Velodyne's Motion in Limine No. 2 to Exclude any Testimony from Dr. Janet Regarding an Alleged Motivation to Combine or Reasonable Expectation of Success," Public Version, Sep. 2, 2020, 22 pages.
U.S. International Trade Commission, Investigation No. 337-TA-1173, "Complainant Velodyne's Supplemental Motion for Summary Determination Regarding Inventorship," Public Version, Sep. 10, 2020, 26 pages.

U.S. International Trade Commission, Investigation No. 337-TA-1173, "Complaint of Velodyne Lidar, Inc. Under Section 337 of the Tariff Act of 1930, as Amended," Aug. 15, 2019, 45 pages.
U.S. International Trade Commission, Investigation No. 337-TA-1173, "Hesai's Motion for Leave to Amend Its Response to the Complaint and Notice of Investigation," Public Version, Feb. 18, 2020, 82 pages.
U.S. International Trade Commission, Investigation No. 337-TA-1173, "Hesai's Unopposed Motion for Leave to File a Reply in Support of Its Motion to Amend Its Response to the Complaint and Notice of Investigation," Public Version, Mar. 6, 2020, 30 pages.
U.S. International Trade Commission, Investigation No. 337-TA-1173, "Initial Determination Granting Joint Motion for Termination of the Investigation as to Respondent Hesai Based on a Settlement and Request for Limited Service of Settlement Agreement under CFR §210.21(b)," Public Version, Jul. 13, 2020, 4 pages.
U.S. International Trade Commission, Investigation No. 337-TA-1173, "Joint Chart of Substantive Legal Issues Being Litigated," Sep. 17, 2020, 5 pages.
U.S. International Trade Commission, Investigation No. 337-TA-1173, "Joint Chart of Substantive Legal Issues Being Litigated," Sep. 8, 2020, 6 pages.
U.S. International Trade Commission, Investigation No. 337-TA-1173, "Joint Motion for and Memorandum in Support of Termination of the Investigation as to Respondent Hesai Based on a Settlement and Request for Limited Service of Settlement Agreement under 19 CFR §210.21(b)," Public Version, Jul. 8, 2020, 77 pages.
U.S. International Trade Commission, Investigation No. 337-TA-1173, "Order No. 26: Granting Hesai's Motion for Leave to Amend Its Response to the Complaint and Notice of Investigation," May 7, 2020, 6 pages.
U.S. International Trade Commission, Investigation No. 337-TA-1173, "Order No. 27: Denying without Prejudice Velodyne's Motion for Summary Determination," Public Version, May 12, 2020, 11 pages.
U.S. International Trade Commission, Investigation No. 337-TA-1173, "Respondent Hesai's Motion for Summary Determination of Invalidity of U.S. Pat. No. 7,969,558," Public Version, Mar. 6, 2020, 109 pages.
U.S. International Trade Commission, Investigation No. 337-TA-1173, "Respondent Robosense's Opposition to Complainant Velodyne's Motion in Limine No. 3 to Exclude Evidence and Testimony That Krumes Discloses Any Limitations of Claims 2 and 9 of the '558 Patent," Sep. 9, 2020, 10 pages.
U.S. International Trade Commission, Investigation No. 337-TA-1173, "Respondent Robosense's Response in Opposition to Complainant Velodyne Lidar, Inc.'s Motion in Limine No. 1," Sep. 9, 2020, 11 pages.
U.S. International Trade Commission, Investigation No. 337-TA-1173, "Respondent RoboSense's Response in Opposition to Complainant Velodyne Lidar, Inc.'s Renewed Motion for Summary Determination Regarding Inventorship," Public Version, Sep. 8, 2020, 12 pages.
U.S. International Trade Commission, Investigation No. 337-TA-1173, "Respondent Robosense's Response in Opposition to Complainant"s Motion in Limine No. 2," Sep. 9, 2020, 13 pages.
U.S. International Trade Commission, Investigation No. 337-TA-1173, "Respondent Suteng Innovation Technology Co., Ltd.'s Response to the Complaint and Notice of Investigation," Public Version, Oct. 21, 2019, 31 pages.
U.S. International Trade Commission, Investigation No. 337-TA-1173, "Respondents' Memorandum in Opposition to Complainant Velodyne Lidar Inc.'s Motion for Summary Determination," Public Version, Mar. 18, 2020, 190 pages.
U.S. International Trade Commission, Investigation No. 337-TA-1173, "Respondents' Response to the Complaint and Notice of Investigation," Public Version, Oct. 21, 2019, 36 pages.
Velodyne Lidar, Excerpts of Business Records (2007-2012), 2 pages. (IPR Nos. '255 and '256 Exhibit 2084).
Wikipedia, "Cassegrain reflector," Dec. 12, 2014, 5 pages (downloaded from Internet Archive, Sep. 29, 2020).

(56) References Cited

OTHER PUBLICATIONS

Written Opinion for PCT/CN2019/093266 dated Sep. 23, 2019, 4 pages.
Canadian Patent Office, Office Action, App. No. CA 3,012,003 (dated Jul. 16, 2021), 4 pages.
Canadian Patent Office, Office Action, App. No. CA 3,024,510 (dated Jun. 23, 2021), 5 pages.
European Patent Office, Communication, Application No. 18886541.4 dated Jul. 16, 2021.
European Patent Office, Examination Report, Appl. No. 17745112.7 (dated Aug. 30, 2021), 5 pages.
European Patent Office, Examination Report, Appl. No. 17807474.6 (dated Nov. 24, 2021), 6 pages.
Extended Search Report, EP App. No. 18886541.4, dated Jun. 29, 2021, 9 pages.
Japanese Patent Office, JP Application No. 2018-563105, Notice of Reasons for Rejection dated Apr. 6, 2021, 6 pages.
Japanese Patent Office, Office Action, App. No. 2018-540039 (dated Aug. 17, 2021), 3 pages.
Japanese Patent Office, Office Action, App. No. 2018-563105 (dated Apr. 6, 2021), 6 pages.
Japanese Patent Office, Office Action, App. No. 2019-540039 (dated Dec. 8, 2020), 5 pages.
Supplementary European Search Report EP App. No. 17807474, dated Dec. 9, 2019, 9 pages.
Japanese Patent Office, JP Application No. 2018-563105, Notice of Reasons for Rejection dated Feb. 1, 2022, 9 pages.
U.S. Final Office Action dated Jun. 2, 2023, from U.S. Appl. No. 16/546,206.
U.S. Appl. No. 16/546,206, "Notice of Allowance", dated Aug. 23, 2023, 6 pages.

\* cited by examiner

MULTIPLE PIXEL SCANNING LIDAR

CROSS REFERENCE TO RELATED APPLICATIONS

The present application for patent is a continuation of U.S. patent application Ser. No. 15/610,975, entitled "Multiple Pixel Scanning LIDAR," filed Jun. 1, 2017, which claims priority under 35 U.S.C. § 119 from U.S. provisional patent application Ser. No. 62/344,259, entitled "Multiple Pixel Scanning LIDAR," filed Jun. 1, 2016, the disclosures of which are incorporated herein by reference in their entireties.

TECHNICAL FIELD

The described embodiments relate to LIDAR based three-dimensional (3-D) point cloud measuring systems.

BACKGROUND INFORMATION

LIDAR systems employ pulses of light to measure distance to an object based on the time of flight (TOF) of each pulse of light. A pulse of light emitted from a light source of a LIDAR system interacts with a distal object. A portion of the light reflects from the object and returns to a detector of the LIDAR system. Based on the time elapsed between emission of the pulse of light and detection of the returned pulse of light, a distance is estimated. In some examples, pulses of light are generated by a laser emitter. The light pulses are focused through a lens or lens assembly. The time it takes for a pulse of laser light to return to a detector mounted near the emitter is measured. A distance is derived from the time measurement with high accuracy.

Some LIDAR systems employ a single laser emitter/detector combination combined with a rotating mirror to effectively scan across a plane. Distance measurements performed by such a system are effectively two-dimensional (2-D) (i.e., planar), and the captured distance points are rendered as a 2-D (i.e. single plane) point cloud. In some examples, rotating mirrors are rotated at very fast speeds (e.g., thousands of revolutions per minute).

In many operational scenarios, a 3-D point cloud is required. A number of schemes have been employed to interrogate the surrounding environment in three dimensions. In some examples, a 2-D instrument is actuated up and down and/or back and forth, often on a gimbal. This is commonly known within the art as "winking" or "nodding" the sensor. Thus, a single beam LIDAR unit can be employed to capture an entire 3-D array of distance points, albeit one point at a time. In a related example, a prism is employed to "divide" the laser pulse into multiple layers, each having a slightly different vertical angle. This simulates the nodding effect described above, but without actuation of the sensor itself.

In all the above examples, the light path of a single laser emitter/detector combination is somehow altered to achieve a broader field of view than a single sensor. The number of pixels such devices can generate per unit time is inherently limited due limitations on the pulse repetition rate of a single laser. Any alteration of the beam path, whether it is by mirror, prism, or actuation of the device that achieves a larger coverage area comes at a cost of decreased point cloud density.

As noted above, 3-D point cloud systems exist in several configurations. However, in many applications it is necessary to see over a broad field of view. For example, in an autonomous vehicle application, the vertical field of view should extend down as close as possible to see the ground in front of the vehicle. In addition, the vertical field of view should extend above the horizon, in the event the car enters a dip in the road. In addition, it is necessary to have a minimum of delay between the actions happening in the real world and the imaging of those actions. In some examples, it is desirable to provide a complete image update at least five times per second. To address these requirements, a 3-D LIDAR system has been developed that includes an array of multiple laser emitters and detectors. This system is described in U.S. Pat. No. 7,969,558 issued on Jun. 28, 2011, the subject matter of which is incorporated herein by reference in its entirety.

In many applications, a sequence of pulses is emitted. The direction of each pulse is sequentially varied in rapid succession. In these examples, a distance measurement associated with each individual pulse can be considered a pixel, and a collection of pixels emitted and captured in rapid succession (i.e., "point cloud") can be rendered as an image or analyzed for other reasons (e.g., detecting obstacles). In some examples, viewing software is employed to render the resulting point clouds as images that appear 3-D to a user. Different schemes can be used to depict the distance measurements as 3-D images that appear as if they were captured by a live action camera.

Improvements in the opto-mechanical design of LIDAR systems are desired, while maintaining high levels of imaging resolution and range.

SUMMARY

Methods and systems for performing 3-D LIDAR measurements with multiple illumination beams scanned over a 3-D environment are described herein.

In one aspect, illumination light is directed toward a particular location in the surrounding environment by one or more beam shaping optical elements and a beam scanning device. In a further aspect, the return measurement light is directed and focused onto a photodetector by the beam scanning device and the one or more beam shaping optical elements. The beam scanning device is employed in the optical path between the beam shaping optics and the environment under measurement. The beam scanning device effectively expands the field of view and increases the sampling density within the field of view of the 3-D LIDAR system.

In some embodiments, a 3-D LIDAR system includes an array of light sources aligned in a plane. Each light source is associated with a different LIDAR measurement channel. The 3-D LIDAR system also includes a beam scanning device including a scanning mirror rotated in an oscillatory manner about an axis of rotation by an actuator in accordance with command signals generated by a master controller. Each beam reflects from the surface of the scanning mirror in a different direction. In this manner, the objects in the environment are interrogated by different beams of illumination light at different locations. The scanning mirror causes the illumination beams to sweep over a range of the 3-D environment under measurement.

In some other embodiments, the array of light sources is 2-D, and the 2-D field of measurement beams is swept over a range of the 3-D environment under measurement.

In another aspect, the light source and detector of each LIDAR measurement channel are moved in two dimensions relative to beam shaping optics employed to collimate light emitted from the light source. The 2-D motion is aligned with the optical plane of the beam shaping optic and effectively expands the field of view and increases the sampling density within the field of view of the 3-D LIDAR system.

The foregoing is a summary and thus contains, by necessity, simplifications, generalizations and omissions of detail; consequently, those skilled in the art will appreciate that the summary is illustrative only and is not limiting in any way. Other aspects, inventive features, and advantages of the devices and/or processes described herein will become apparent in the non-limiting detailed description set forth herein.

DETAILED DESCRIPTION

Reference will now be made in detail to background examples and some embodiments of the invention, examples of which are illustrated in the accompanying drawings.

Figure 1:
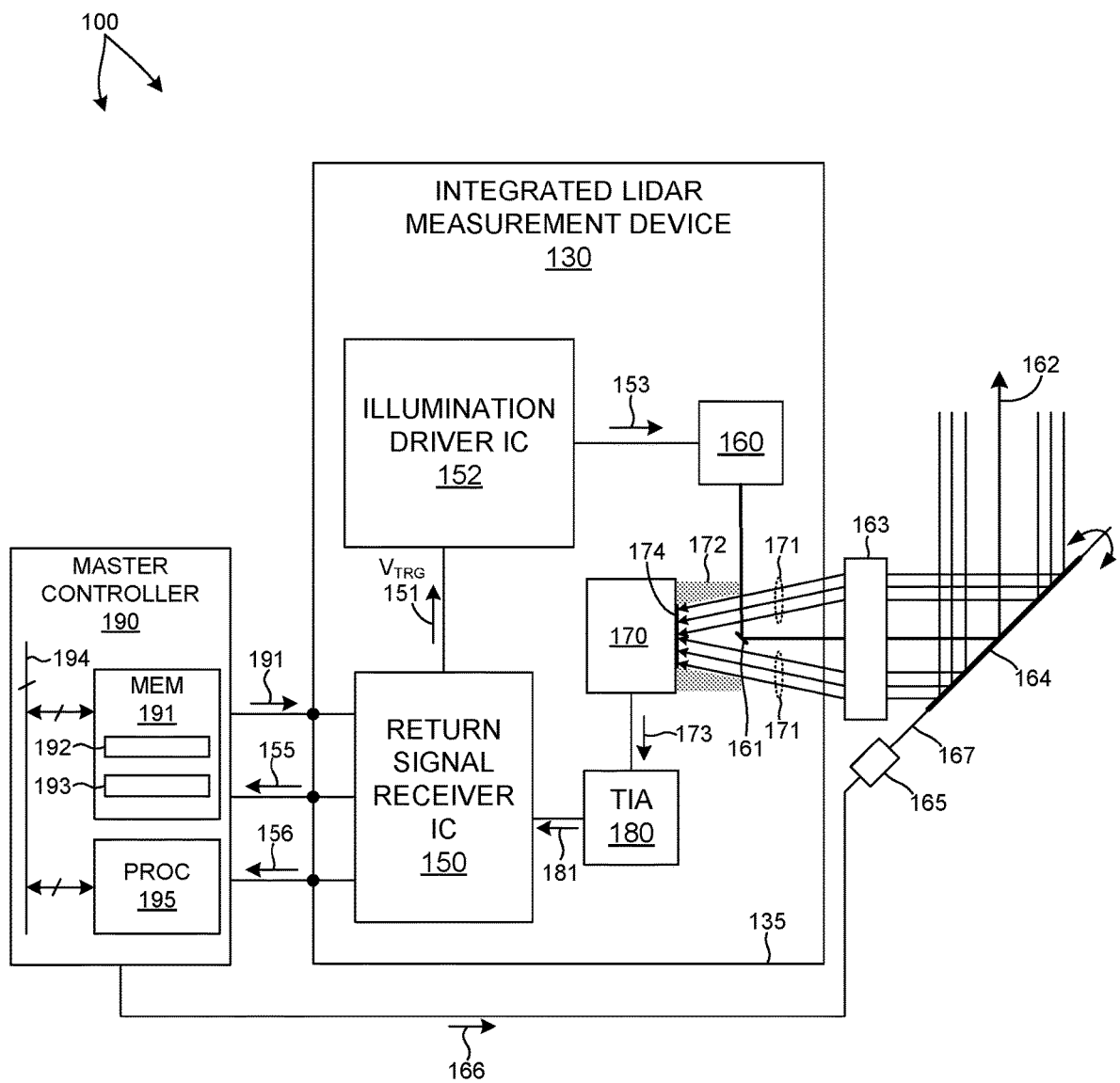
FIG. 1 is a simplified diagram illustrative of one embodiment of a 3-D LIDAR system 100 in at least one novel aspect.

FIG. 1 depicts an LIDAR measurement system 100 in one embodiment. LIDAR measurement system 100 includes a master controller 190 and one or more integrated LIDAR measurement devices 130. An integrated LIDAR measurement device 130 includes a return signal receiver integrated circuit (IC), an illumination driver integrated circuit (IC) 152, an illumination source 160, a photodetector 170, and a trans-impedance amplifier (TIA) 180. Each of these elements is mounted to a common substrate 135 (e.g., printed circuit board) that provides mechanical support and electrical connectivity among the elements.

Illumination source 160 emits a measurement pulse of illumination light 162 in response to a pulse of electrical current 153. In some embodiments, the illumination source 160 is laser based (e.g., laser diode). In some embodiments, the illumination source is based on one or more light emitting diodes. In general, any suitable pulsed illumination source may be contemplated. Illumination light 162 exits LIDAR measurement device 100 and reflects from an object in the surrounding 3-D environment under measurement. A portion of the reflected light is collected as return measurement light 171 associated with the measurement pulse 162. As depicted in FIG. 1, illumination light 162 emitted from integrated LIDAR measurement device 130 and corresponding return measurement light 171 directed toward integrated LIDAR measurement device share a common optical path.

In one aspect, the illumination light 162 is focused and projected toward a particular location in the surrounding environment by one or more beam shaping optical elements 163 and a beam scanning device 164 of LIDAR measurement system 100. In a further aspect, the return measurement light 171 is directed and focused onto photodetector 170 by beam scanning device 164 and the one or more beam shaping optical elements 163 of LIDAR measurement system 100. The beam scanning device is employed in the optical path between the beam shaping optics and the environment under measurement. The beam scanning device effectively expands the field of view and increases the sampling density within the field of view of the 3-D LIDAR system.

In the embodiment depicted in FIG. 1, beam scanning device 164 is a moveable mirror element that is rotated about an axis of rotation 167 by rotary actuator 165. Command signals 166 generated by master controller 190 are communicated from master controller 190 to rotary actuator 165. In response, rotary actuator 165 scans moveable mirror element 164 in accordance with a desired motion profile.

Integrated LIDAR measurement device 130 includes a photodetector 170 having an active sensor area 174. As depicted in FIG. 1, illumination source 160 is located outside the field of view of the active area 174 of the photodetector. As depicted in FIG. 1, an overmold lens 172 is mounted over the photodetector 170. The overmold lens 172 includes a conical cavity that corresponds with the ray acceptance cone of return light 171. Illumination light 162 from illumination source 160 is injected into the detector reception cone by a fiber waveguide. An optical coupler optically couples illumination source 160 with the fiber waveguide. At the end of the fiber waveguide, a mirror element 161 is oriented at a 45 degree angle with respect to the waveguide to inject the illumination light 162 into the cone of return light 171. In one embodiment, the end faces of fiber waveguide are cut at a 45 degree angle and the end faces are coated with a highly reflective dielectric coating to provide a mirror surface. In some embodiments, the waveguide includes a rectangular shaped glass core and a polymer cladding of lower index of refraction. In some embodiments, the entire optical assembly is encapsulated with a material having an index of refraction that closely matches the index of refraction of the polymer cladding. In this manner, the waveguide injects the illumination light 162 into the acceptance cone of return light 171 with minimal occlusion.

The placement of the waveguide within the acceptance cone of the return light 171 projected onto the active sensing area 174 of detector 170 is selected to ensure that the illumination spot and the detector field of view have maximum overlap in the far field.

As depicted in FIG. 1, return light 171 reflected from the surrounding environment is detected by photodetector 170. In some embodiments, photodetector 170 is an avalanche photodiode. Photodetector 170 generates an output signal 173 that is amplified by an analog trans-impedance amplifier (TIA) 180. However, in general, the amplification of output signal 173 may include multiple, amplifier stages. In this sense, an analog trans-impedance amplifier is provided by way of non-limiting example, as many other analog signal amplification schemes may be contemplated within the scope of this patent document. Although TIA 180 is depicted in FIG. 1 as a discrete device separate from the receiver IC 150, in general, TIA 180 may be integrated with receiver IC 150. In some embodiments, it is preferable to integrate TIA 180 with receiver IC 150 to save space and reduce signal contamination.

The amplified signal 181 is communicated to return signal receiver IC 150. Receiver IC 150 includes timing circuitry and a time-to-digital converter that estimates the time of flight of the measurement pulse from illumination source 160, to a reflective object in the 3-D environment, and back to the photodetector 170. A signal 155 indicative of the estimated time of flight is communicated to master controller 190 for further processing and communication to a user of the LIDAR measurement system 100. In addition, return signal receiver IC 150 is configured to digitize segments of the return signal 181 that include peak values (i.e., return pulses), and communicate signals 156 indicative of the digitized segments to master controller 190. In some embodiments, master controller 190 processes these signal segments to identify properties of the detected object. In some embodiments, master controller 190 communicates signals 156 to a user of the LIDAR measurement system 100 for further processing.

Master controller 190 is configured to generate a pulse command signal 191 that is communicated to receiver IC 150 of integrated LIDAR measurement device 130. Pulse command signal 191 is a digital signal generated by master controller 190. Thus, the timing of pulse command signal 191 is determined by a clock associated with master controller 190. In some embodiments, the pulse command signal 191 is directly used to trigger pulse generation by illumination driver IC 152 and data acquisition by receiver IC 150. However, illumination driver IC 152 and receiver IC 150 do not share the same clock as master controller 190. For this reason, precise estimation of time of flight becomes much more computationally tedious when the pulse command signal 191 is directly used to trigger pulse generation and data acquisition.

In general, a LIDAR measurement system includes a number of different integrated LIDAR measurement devices 130 each emitting a pulsed beam of illumination light from the LIDAR device into the surrounding environment and measuring return light reflected from objects in the surrounding environment.

In these embodiments, master controller 190 communicates a pulse command signal 191 to each different integrated LIDAR measurement device. In this manner, master controller 190 coordinates the timing of LIDAR measurements performed by any number of integrated LIDAR measurement devices. In a further aspect, beam shaping optical elements 163 and beam scanning device 164 are in the optical path of the illumination pulses and return measurement pulses associated with each of the integrated LIDAR measurement devices. In this manner, beam scanning device 164 directs each illumination pulse and return measurement pulse of LIDAR measurement system 100.

In the depicted embodiment, receiver IC 150 receives pulse command signal 191 and generates a pulse trigger signal, $V_{TRG}$ 151, in response to the pulse command signal 191. Pulse trigger signal 151 is communicated to illumination driver IC 152 and directly triggers illumination driver IC 152 to electrically couple illumination source 160 to power supply 133 and generate a pulse of illumination light 162. In addition, pulse trigger signal 151 directly triggers data acquisition of return signal 181 and associated time of flight calculation. In this manner, pulse trigger signal 151 generated based on the internal clock of receiver IC 150 is employed to trigger both pulse generation and return pulse data acquisition. This ensures precise synchronization of pulse generation and return pulse acquisition which enables precise time of flight calculations by time-to-digital conversion.

Figure 2:
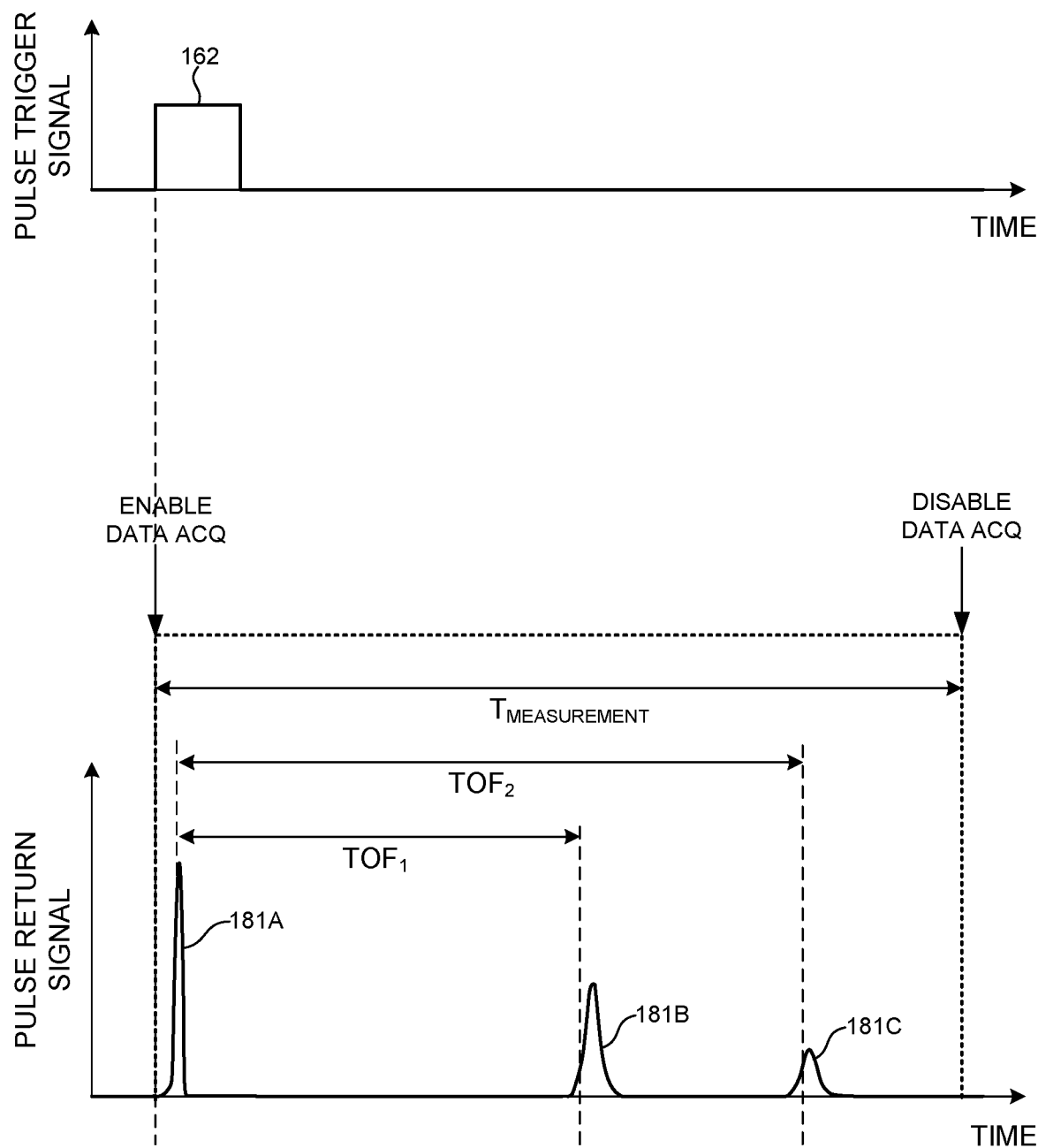
FIG. 2 depicts an illustration of the timing of emission of a pulsed measurement beam and capture of the returning measurement pulse.

FIG. 2 depicts an illustration of the timing associated with the emission of a measurement pulse from an integrated LIDAR measurement device 130 and capture of the returning measurement pulse. As depicted in FIG. 2, a measurement is initiated by the rising edge of pulse trigger signal 162 generated by receiver IC 150. As depicted in FIGS. 1 and 2, an amplified, return signal 181 is received by receiver IC 150. As described hereinbefore, a measurement window (i.e., a period of time over which collected return signal data is associated with a particular measurement pulse) is initiated by enabling data acquisition at the rising edge of pulse trigger signal 162. Receiver IC 150 controls the duration of the measurement window, $T_{measurement}$, to correspond with the window of time when a return signal is expected in response to the emission of a measurement pulse sequence. In some examples, the measurement window is enabled at the rising edge of pulse trigger signal 162 and is disabled at a time corresponding to the time of flight of light over a distance that is approximately twice the range of the LIDAR system. In this manner, the measurement window is open to collect return light from objects adjacent to the LIDAR system (i.e., negligible time of flight) to objects that are located at the maximum range of the LIDAR system. In this manner, all other light that cannot possibly contribute to useful return signal is rejected.

As depicted in FIG. 2, return signal 181 includes three return measurement pulses that correspond with the emitted measurement pulse. In general, signal detection is performed on all detected measurement pulses. Further signal analysis may be performed to identify the closest valid signal 181B (i.e., first valid instance of the return measurement pulse), the strongest signal, and the furthest valid signal 181C (i.e., last valid instance of the return measurement pulse in the measurement window). Any of these instances may be reported as potentially valid distance measurements by the LIDAR system.

Internal system delays associated with emission of light from the LIDAR system (e.g., signal communication delays and latency associated with the switching elements, energy storage elements, and pulsed light emitting device) and delays associated with collecting light and generating signals indicative of the collected light (e.g., amplifier latency, analog-digital conversion delay, etc.) contribute to errors in the estimation of the time of flight of a measurement pulse of light. Thus, measurement of time of flight based on the elapsed time between the rising edge of the pulse trigger signal 162 and each valid return pulse (i.e., 181B and 181C) introduces undesirable measurement error. In some embodiments, a calibrated, pre-determined delay time is employed to compensate for the electronic delays to arrive at a corrected estimate of the actual optical time of flight. However, the accuracy of a static correction to dynamically changing electronic delays is limited. Although, frequent re-calibrations may be employed, this comes at a cost of computational complexity and may interfere with system up-time.

In another aspect, receiver IC 150 measures time of flight based on the time elapsed between the detection of a detected pulse 181A due to internal cross-talk between the illumination source 160 and photodetector 170 and a valid return pulse (e.g., 181B and 181C). In this manner, systematic delays are eliminated from the estimation of time of flight. Pulse 181A is generated by internal cross-talk with effectively no distance of light propagation. Thus, the delay in time from the rising edge of the pulse trigger signal and the instance of detection of pulse 181A captures all of the systematic delays associated with illumination and signal detection. By measuring the time of flight of valid return pulses (e.g., return pulses 181B and 181C) with reference to detected pulse 181A, all of the systematic delays associated with illumination and signal detection due to internal cross-talk are eliminated. As depicted in FIG. 2, receiver IC 150 estimates the time of flight, $TOF_1$, associated with return pulse 181B and the time of flight, $TOF_2$, associated with return pulse 181C with reference to return pulse 181A.

In some embodiments, the signal analysis is performed by receiver IC 150, entirely. In these embodiments, signals 155 communicated from integrated LIDAR measurement device 130 include an indication of the time of flight determined by receiver IC 150. In some embodiments, signals 156 include digitized segments of return signal 181 generated by receiver IC 150. These raw measurement signal segments are processed further by one or more processors located on board the 3-D LIDAR system, or external to the 3-D LIDAR system to arrive at another estimate of distance, an estimate of one of more physical properties of the detected object, or a combination thereof.

Figure 3:
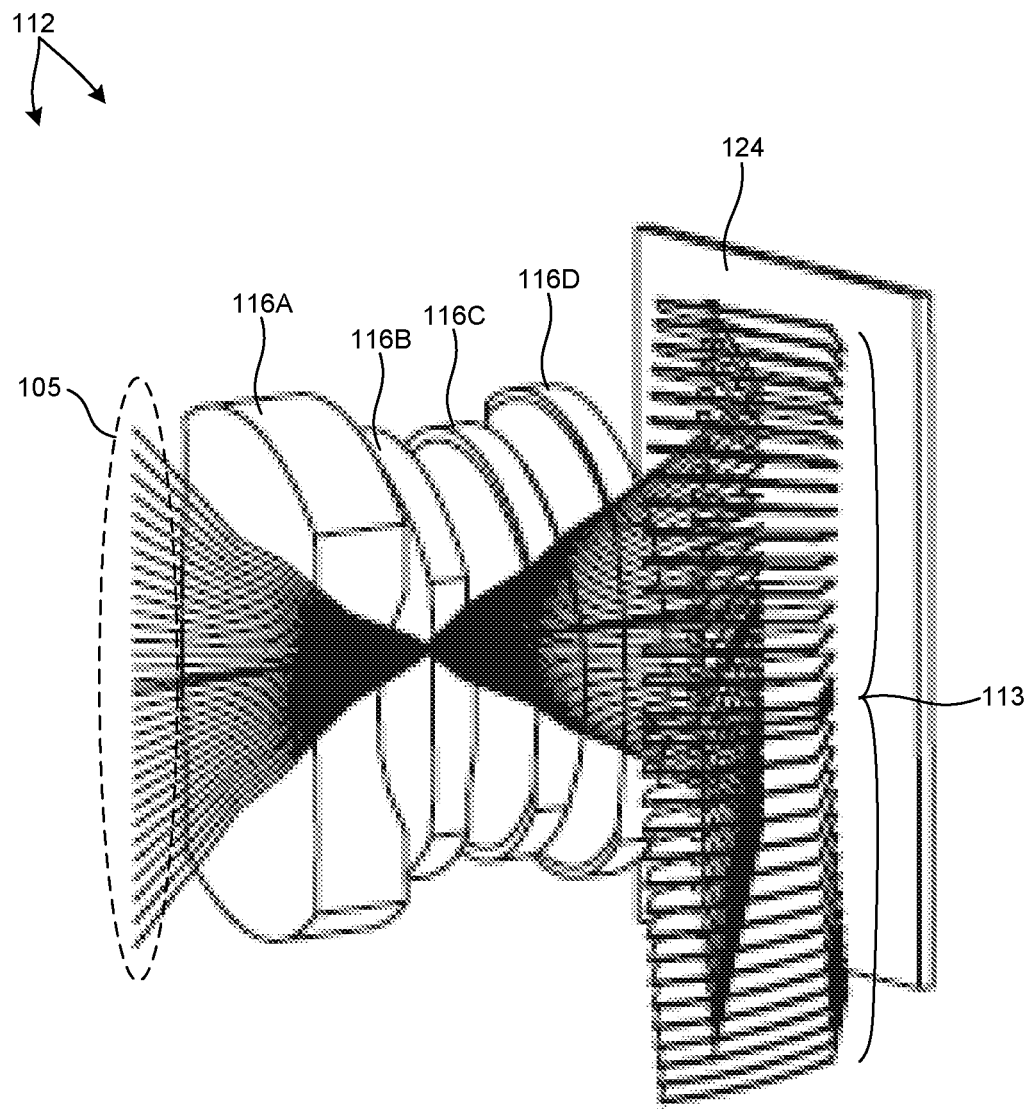
FIG. 3 depicts a view of light emission/collection engine 112 of 3-D LIDAR system 100.

FIG. 3 depicts a light emission/collection engine 112 in one embodiment. Light emission/collection engine 112 includes an array of integrated LIDAR measurement devices 113. Each integrated LIDAR measurement device includes a light emitting element, a light detecting element, and associated control and signal conditioning electronics integrated onto a common substrate (e.g., electrical board).

Light emitted from each integrated LIDAR measurement device passes through beam shaping optical elements 116 that collimate the emitted light to generate a beam of illumination light projected from the 3-D LIDAR system into the environment. In this manner, an array of beams of light 105, each emitted from a different LIDAR measurement device are emitted from 3-D LIDAR system 100 as depicted in FIG. 3. In general, any number of LIDAR measurement devices can be arranged to simultaneously emit any number of light beams from 3-D LIDAR system 100. Light reflected from an object in the environment due to its illumination by a particular LIDAR measurement device is collected by beam shaping optical elements 116. The collected light passes through beam shaping optical elements 116 where it is focused onto the detecting element of the same, particular LIDAR measurement device. In this manner, collected light associated with the illumination of different portions of the environment by illumination generated by different LIDAR measurement devices is separately focused onto the detector of each corresponding LIDAR measurement device.

Figure 4:
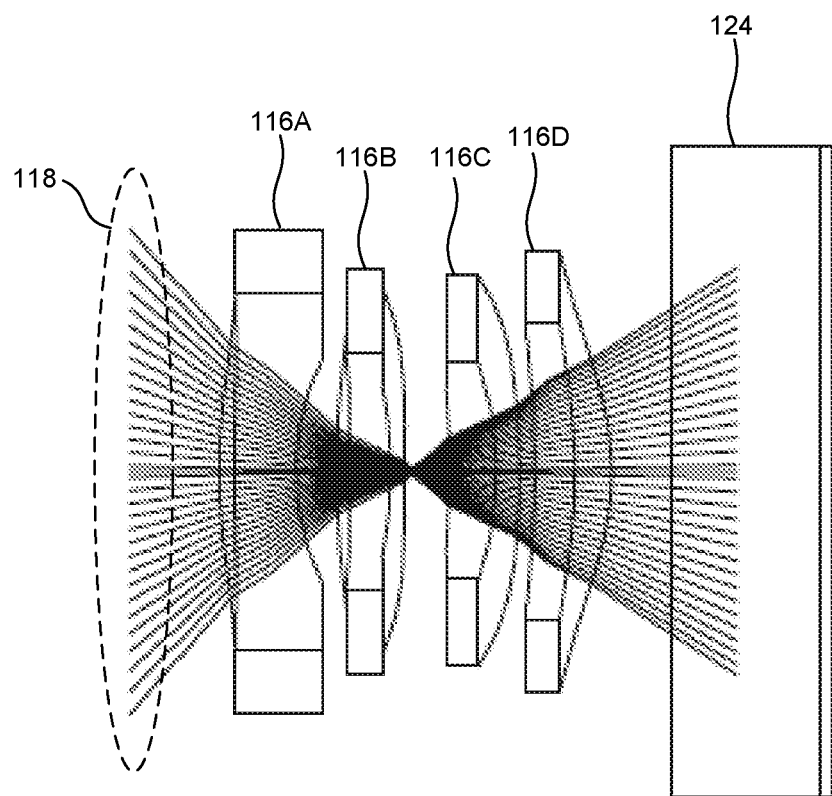
FIG. 4 depicts a view of collection optics 116 of 3-D LIDAR system 100 in greater detail.

FIG. 4 depicts a view of beam shaping optical elements 116 in greater detail. As depicted in FIG. 4, beam shaping optical elements 116 include four lens elements 116A-D arranged to focus collected light 118 onto each detector of the array of integrated LIDAR measurement devices 113. In the embodiment depicted in FIG. 4, light passing through optics 116 is reflected from mirror 124 and is directed onto each detector of the array of integrated LIDAR measurement devices. In some embodiments, one or more of the beam shaping optical elements 116 is constructed from one or more materials that absorb light outside of a predetermined wavelength range. The predetermined wavelength range includes the wavelengths of light emitted by the array of integrated LIDAR measurement devices 113. In one example, one or more of the lens elements are constructed from a plastic material that includes a colorant additive to absorb light having wavelengths less than infrared light generated by each of the array of integrated LIDAR measurement devices 113. In one example, the colorant is Epolight 7276A available from Aako BV (The Netherlands). In general, any number of different colorants can be added to any of the plastic lens elements of optics 116 to filter out undesired spectra.

Figure 5:
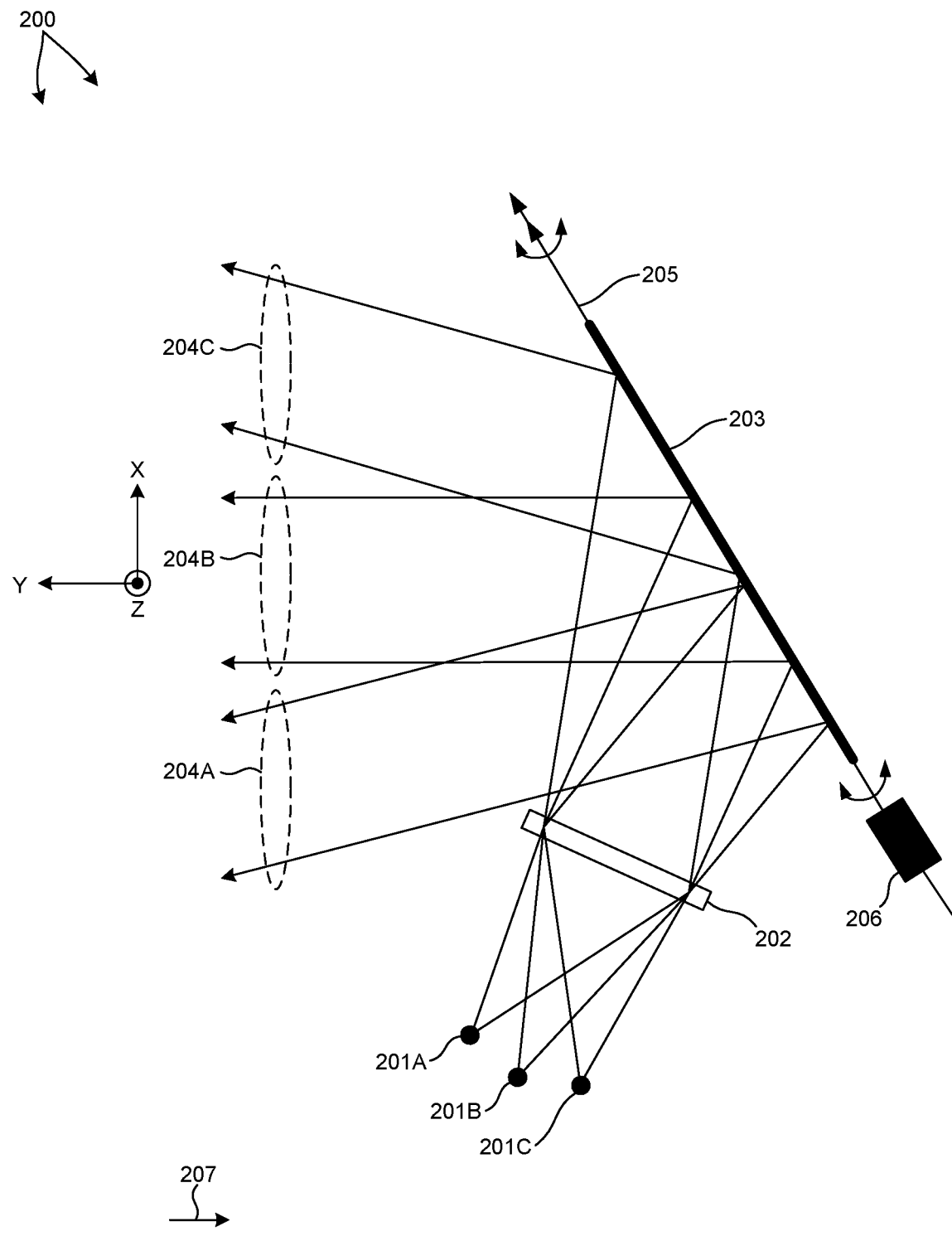
FIG. 5 depicts an embodiment 200 of a 3-D LIDAR system employing a beam scanning device.

FIG. 5 depicts an embodiment 200 of a 3-D LIDAR system employing a beam scanning device. Embodiment 200 includes a one-dimensional array of light sources 201A-C (i.e., an array of light sources aligned in a single plane such as the xy plane depicted in FIG. 5). Each light source is associated with a different LIDAR measurement channel. Light emitted from each light source 201A-C is divergent. These divergent beams pass through beam shaping optics 202 (e.g., collimating optics) where the emitted light is approximately collimated. The term "approximately" collimated is employed to note that in practice, perfect collimation of light beams is rarely achieved. Thus, typically, the resulting beams remain slightly divergent or convergent after passing through beam shaping optics 202. After passing through beam shaping optics 202, each beam reflects from the surface of scanning mirror 203. Scanning mirror 203 is rotated in an oscillatory manner about axis 205 by actuator 206 in accordance with command signals 207 received from a controller (e.g., master controller 190). As depicted in FIG. 5, the reflected beams 204A-C are associated with light sources 201A-C, respectively. Scanning mirror 203 is oriented such that reflected beams 204A-C do not intersect with collimating optics 202, light sources 201A-C, or any other elements of the illumination and detection systems of the 3-D LIDAR system. Furthermore, reflected beams 204A-C maintain their separate trajectories in the x-direction. In this manner, the objects in the environment are interrogated by different beams of illumination light at different locations in the x-direction. In some embodiments, the reflected beams fan out over a range of angles that is less than 40 degrees measured in the x-y plane.

Scanning mirror 203 causes beams 204A-C to sweep in the z-direction (in and out of the drawing depicted in FIG. 5). In some embodiments, the reflected beams scan over a range of angles that is less than 120 degrees measured in the y-z plane.

Figure 6:
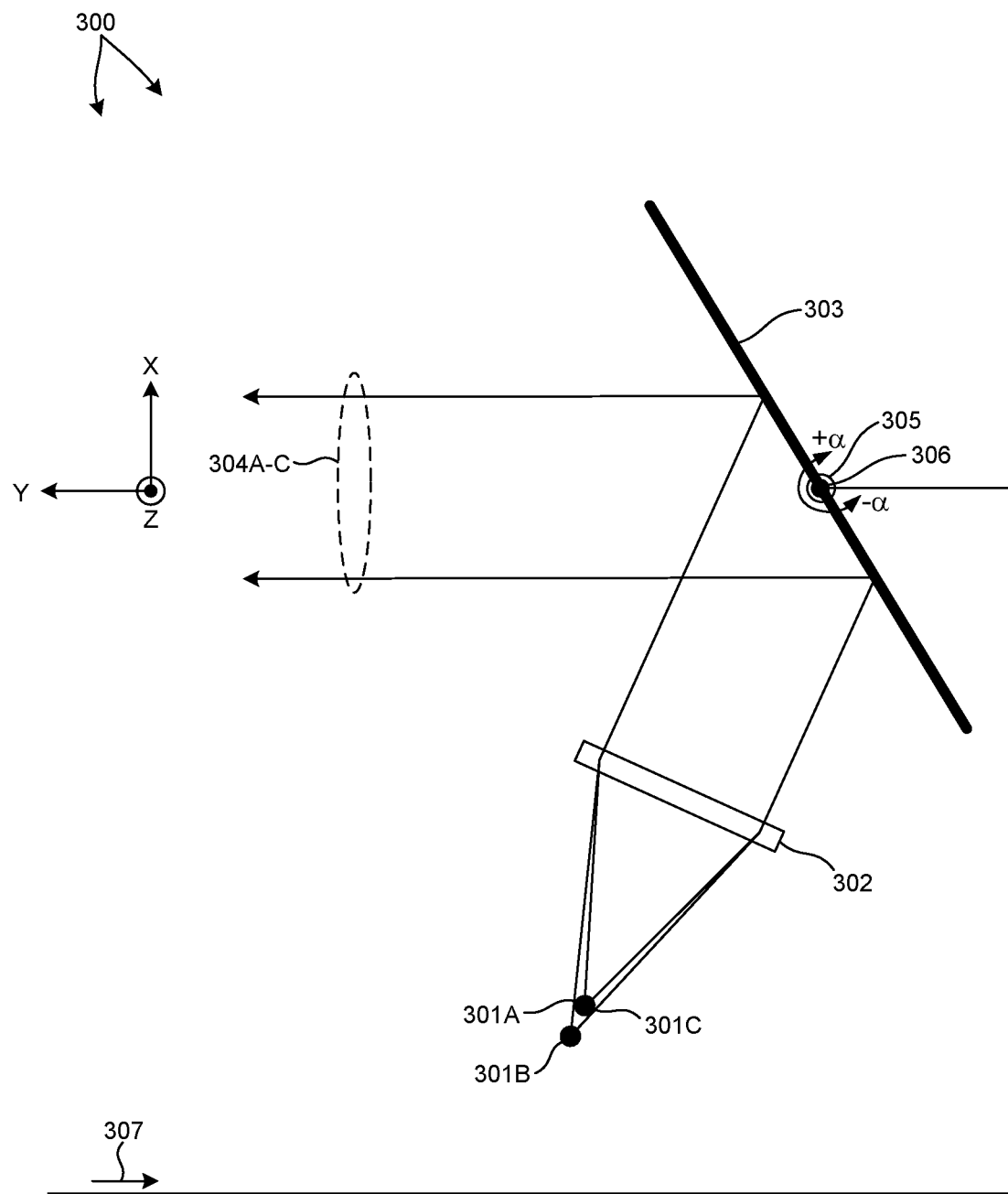
FIG. 6 depicts an embodiment 300 of a 3-D LIDAR system employing a beam scanning device.

FIG. 6 depicts another embodiment 300 of a 3-D LIDAR system employing a beam scanning device. Embodiment 300 includes a one-dimensional array of light sources 301A-C, each associated with a different LIDAR measurement channel. Light sources 301A-C are located in a one-dimensional array (i.e., located on a plane parallel to the z-direction; in and out of the drawing depicted in FIG. 6). Light emitted from each light source 301A-C is divergent. These divergent beams pass through beam shaping optics 302 where they are approximately collimated. After passing through beam shaping optics 302, each beam reflects from the surface of scanning mirror 303. The reflected beams 304A-C fan out in the y-z plane (i.e., in and out of the drawing depicted in FIG. 6). Scanning mirror 303 rotates in an oscillatory manner (e.g., within a range of angles between $+\alpha$ and $-\alpha$) about an axis 305 aligned with the surface of scanning mirror 303 and oriented in the z-direction as depicted in FIG. 6. Scanning mirror 203 is rotated in an oscillatory manner about axis 305 by actuator 306 in accordance with command signals 307 received from a controller (e.g., master controller 190). As depicted in FIG. 6, the reflected beams 304A-C are associated with light source 301A-C. Scanning mirror 303 is oriented such that reflected beams 304A-C do not intersect with collimating optics 302, light sources 301A-C, or any other elements of the illumination and detection systems of the 3-D LIDAR system. Furthermore, reflected beams 304A-C maintain their separate trajectories in the z-direction. In this manner, the objects in the environment are interrogated by different beams of illumination light at different locations in the z-direction. In some embodiments, the reflected beams fan out over a range of angles that is less than 40 degrees measured in the y-z plane.

Scanning mirror 303 causes beams 304A-C to sweep in the x-direction. In some embodiments, the reflected beams scan over a range of angles that is less than 120 degrees measured in the x-y plane.

In the embodiment depicted in FIG. 5, each light source of the array of light sources 201A-C is located in a plane. Similarly, in the embodiment depicted in FIG. 6, each light source of the array of light sources 301A-C is located in a plane. This is often referred to as a one-dimensional array of light sources. In the embodiment depicted in FIG. 5, axis 205 of scanning mirror 203 lies in the plane (e.g., the x-y plane) including light sources 201A-C. Similarly, in the embodiment depicted in FIG. 6, axis 305 of scanning mirror 303 lies in the plane including light sources 301A-C. However, in general, the array of light sources may be 2-D.

Figure 7:
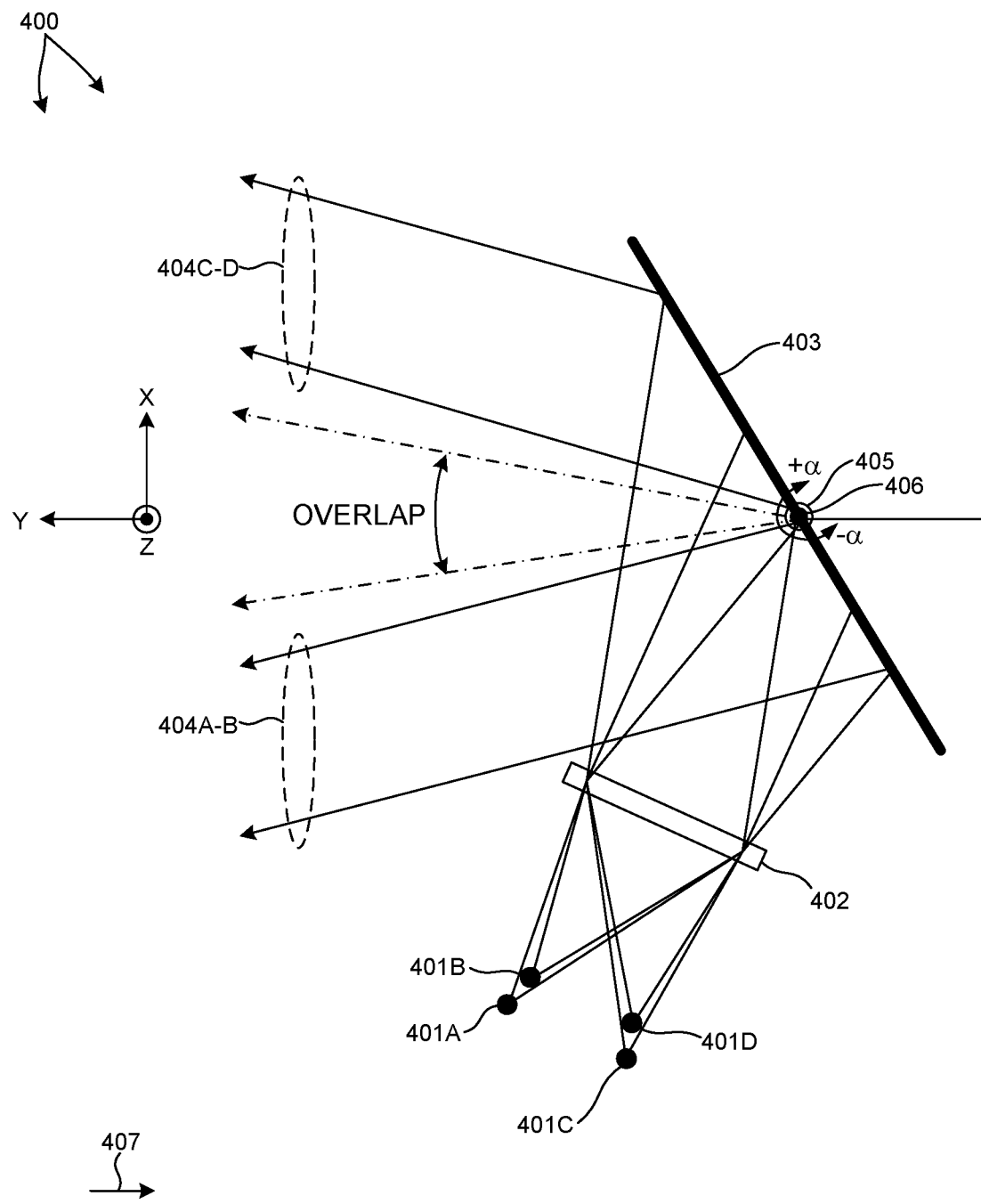
FIG. 7 depicts an embodiment 400 of a 3-D LIDAR system employing a beam scanning device.

FIG. 7 depicts another embodiment 400 of a 3-D LIDAR system. Embodiment 400 includes a 2-D array of light sources 401A-D, each associated with a different LIDAR measurement channel. Light sources 401A-B are located in a plane (i.e., located on a plane parallel to the z-direction and light sources 401C-D are located in another plane parallel to the z-direction. In addition, light sources 401A and 401C are located in a plane parallel to the xy plane and light sources 401B and 401D are located in another plane parallel to the xy plane. Light emitted from each light source 401A-D is divergent. These divergent beams pass through beam shaping optics 402 where they are approximately collimated. After passing through beam shaping optics 402, each beam reflects from the surface of scanning mirror 403. The reflected beams 404A-B and reflected beams 404C-D fan out in the y-z plane (i.e., in and out of the drawing depicted in FIG. 7). Scanning mirror 403 rotates in an oscillatory manner (e.g., within a range of angles between $+\alpha$ and $-\alpha$) about an axis 405 aligned with the surface of scanning mirror 403 and oriented in the z-direction as depicted in FIG. 7. Scanning mirror 403 is rotated in an oscillatory manner about axis 405 by actuator 406 in accordance with command signals 407 received from a controller (e.g., master controller 190). As depicted in FIG. 7, the reflected beams 404A-D are associated with light source 401A-D. Scanning mirror 403 is oriented such that reflected beams 404A-D do not intersect with collimating optics 402, light sources 401A-C, or any other elements of the illumination and detection systems of the 3-D LIDAR system. Furthermore, reflected beams 404A-D maintain their separate trajectories in the z-direction and the x-direction. In this manner, the objects in the environment are interrogated by different beams of illumination light at different locations in the z-direction. In some embodiments, the reflected beams fan out over a range of angles that is less than 40 degrees measured in the y-z plane.

Scanning mirror 403 causes beams 404A-D to sweep in the x-direction. In some embodiments, the reflected beams scan over a range of angles that is less than 120 degrees measured in the x-y plane. In a further aspect, the range of scanning angles is configured such that a portion of the environment interrogated by reflected beams 404A and 404B is also interrogated by reflected beams 404C and 404D, respectively. This is depicted by the angular "overlap" range depicted in FIG. 7. In this manner, the spatial sampling resolution in this portion of the environment is effectively increased because this portion of the environment is being sampled by two different beams at different times.

In another further aspect, the scanning angle approximately tracks a sinusoidal function. As such, the dwell time near the middle of the scan is significantly less than the dwell time near the end of the scan. In this manner, the spatial sampling resolution of the 3-D LIDAR system is higher at the ends of the scan.

In the embodiment 400 depicted in FIG. 7, four light sources are arranged in a 2×2 array. However, in general, any number of light sources may be arranged in any suitable manner. In one example, the 2×2 array is tilted with respect to the scanning mirror such that the measurement beams are interlaced in the overlap region.

In another aspect, the light source and detector of each LIDAR measurement channel is moved in two dimensions relative to the beam shaping optics employed to collimate light emitted from the light source. The 2-D motion is aligned with the optical plane of the beam shaping optic and effectively expands the field of view and increases the sampling density within the field of view of the 3-D LIDAR system.

Figure 8:
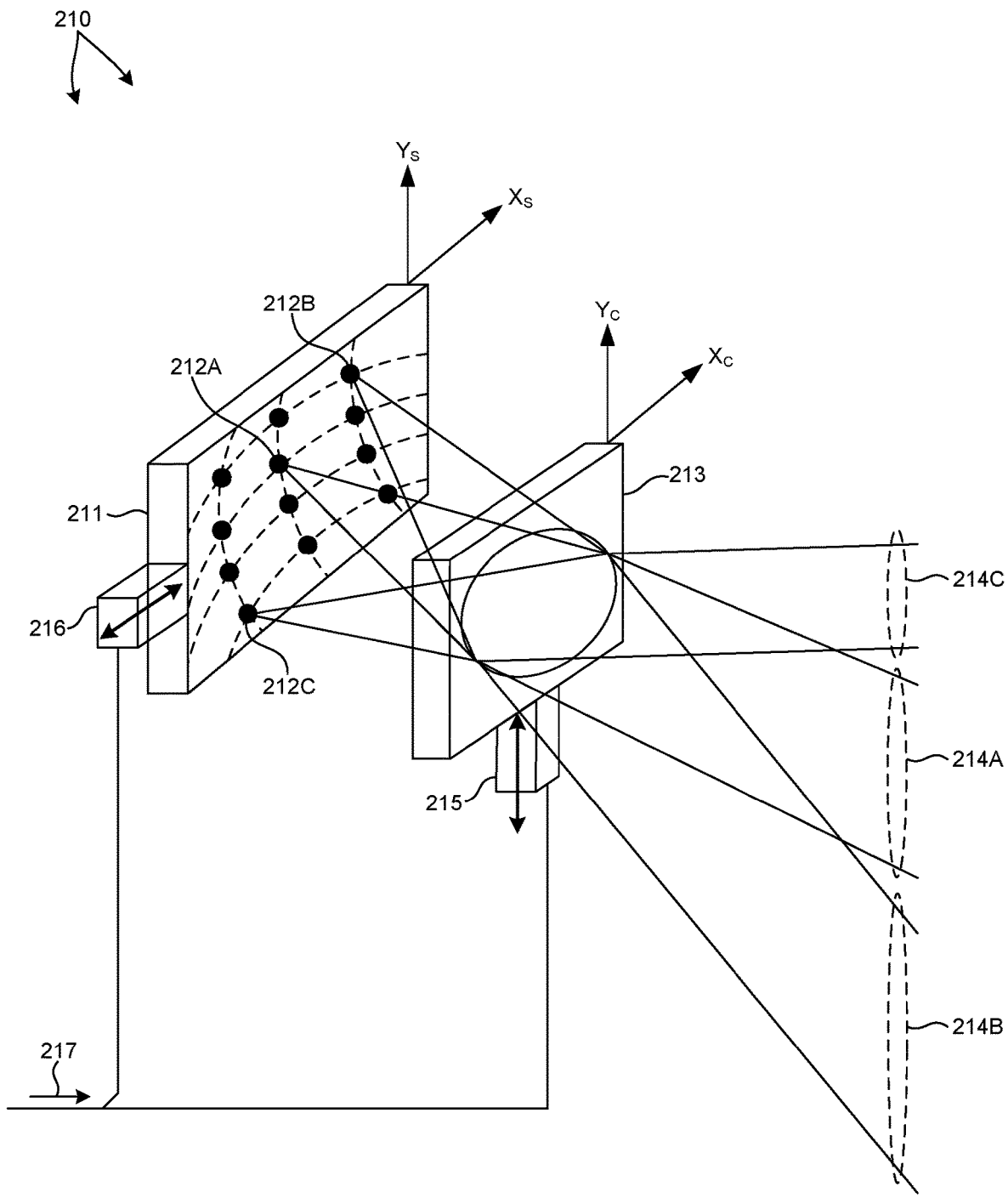
FIG. 8 depicts an embodiment 210 of a 3-D LIDAR system employing a 2-D array of light sources 211.

FIG. 8 depicts an embodiment 210 of a 3-D LIDAR system employing a 2-D array of light sources 211, including light sources 212A-C. Light sources 212A-C are each associated with a different LIDAR measurement channel. Light emitted from each light source 212A-C is divergent. These divergent beams pass through beam shaping optics 213 where they are approximately collimated. Collimated beams 214A-C, are each associated with light sources 212A-C, respectively. The collimated beams 214A-C pass on the 3-D environment to be measured. The term "approximately" collimated is employed to note that in practice, perfect collimation of light beams is rarely achieved. Thus, typically, the resulting beams remain slightly divergent or convergent after passing through beam shaping optics 213.

In the depicted embodiment, the 2-D array of light sources 211 is moved in one direction (e.g., the $X_S$ direction) by actuator 216, and the beam shaping optics 213 are moved in an orthogonal direction (e.g., the $Y_C$ direction) by actuator 215. The relative motion in orthogonal directions between the 2-D array of light sources 211 and the beam shaping optics 213 effectively scans the collimated beams 214A-C over the 3-D environment to be measured. This effectively expands the field of view and increases the sampling density within the field of view of the 3-D LIDAR system. The 2-D array of light sources 211 is translated in an oscillatory manner parallel to the $X_S$ by actuator 216 and the beam shaping optic 213 is translated in an oscillatory manner parallel to the $Y_C$ axis in accordance with command signals 217 received from a controller (e.g., master controller 190).

In the embodiment depicted in FIG. 8, the $X_C$-$Y_C$ plane is parallel to the $X_S$-$Y_S$ plane. As depicted in FIG. 8, the source and detector of each LIDAR measurement channel is moved in two dimensions relative to the beam shaping optics employed to collimate light emitted from the light source. The motion of both the 2-D array of light sources 211 and the beam shaping optics 213 is aligned with the optical plane of the collimating optic (i.e., $X_C$-$Y_C$ plane). In general, the same effect may be achieved by moving the array of light sources 211 in both the $X_S$ and $Y_S$ directions, while keeping collimating optics 213 stationary. Similarly, the same effect may be achieved by moving the beam shaping optics 213 in both the $X_C$ and $Y_C$ directions, while keeping the array of light sources 211 stationary.

In general, the rotations of scanning mirrors 203, 303, 403, and the displacements of the array of light sources 211, beam shaping optics 213, may be realized by any suitable drive system. In one example, flexure mechanisms harmonically driven by electrostatic actuators may be employed to exploit resonant behavior. In another example, an eccentric, rotary mechanism may be employed to transform a rotary motion generated by an rotational actuator into a 2-D planar motion. In general, the motion may be generated by any suitable actuator system (e.g., an electromagnetic actuator, a piezo actuator, etc.). In general, the motion may be sinusoidal, pseudorandom, or track any other suitable function.

Figure 9:
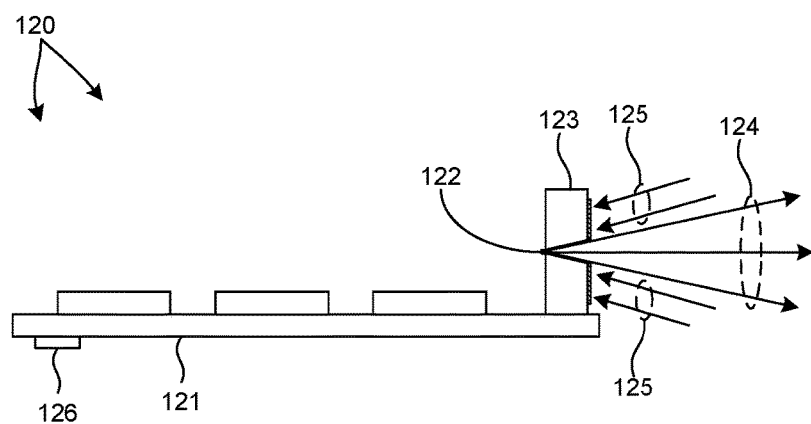
FIG. 9 depicts an integrated LIDAR measurement device 120 in one embodiment.

FIG. 9 depicts an integrated LIDAR measurement device 120 in another embodiment. Integrated LIDAR measurement device 120 includes a pulsed light emitting device 122, a light detecting element 123, associated control and signal conditioning electronics integrated onto a common substrate 121 (e.g., electrical board), and connector 126. Pulsed emitting device 122 generates pulses of illumination light 124 and detector 123 detects collected light 125. Integrated LIDAR measurement device 120 generates digital signals indicative of the distance between the 3-D LIDAR system and an object in the surrounding environment based on a time of flight of light emitted from the integrated LIDAR measurement device 120 and detected by the integrated LIDAR measurement device 120. Integrated LIDAR measurement device 120 is electrically coupled to the 3-D LIDAR system via connector 126. Integrated LIDAR measurement device 120 receives control signals from the 3-D LIDAR system and communicates measurement results to the 3-D LIDAR system over connector 126.

Figure 10:
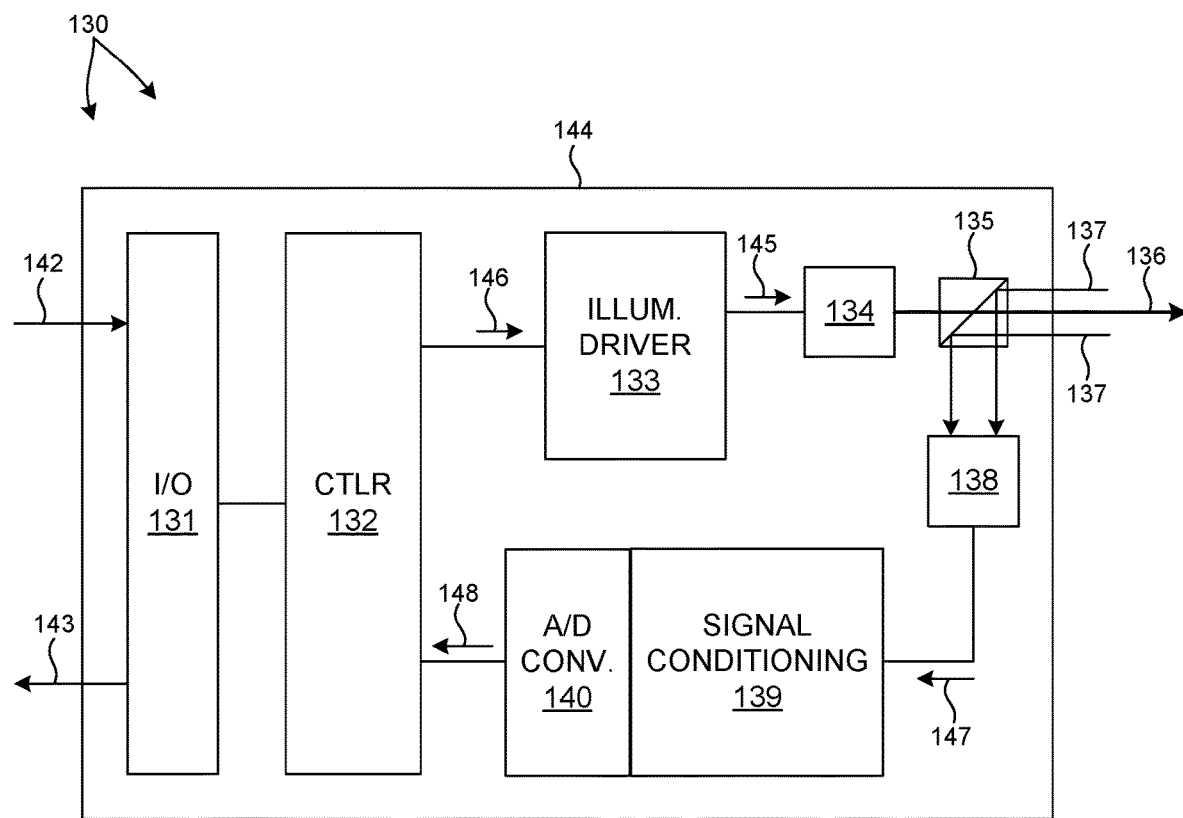
FIG. 10 depicts a schematic view of an integrated LIDAR measurement device 130.

FIG. 10 depicts a schematic view of an integrated LIDAR measurement device 130 in another embodiment. Integrated LIDAR measurement device 130 includes a pulsed light emitting device 134, a light detecting element 138, a beam splitter 135 (e.g., polarizing beam splitter, regular beam splitter, etc.), an illumination driver 133, signal conditioning electronics 139, analog to digital (A/D) conversion electronics 140, controller 132, and digital input/output (I/O) electronics 131 integrated onto a common substrate 144.

As depicted in FIG. 10, a measurement begins with a pulse firing signal 146 generated by controller 132. In some examples, a pulse index signal is determined by controller 132 that is shifted from the pulse firing signal 146 by a time delay, $T_D$. The time delay includes the known delays associated with emitting light from the LIDAR system (e.g., signal communication delays and latency associated with the switching elements, energy storage elements, and pulsed light emitting device) and known delays associated with collecting light and generating signals indicative of the collected light (e.g., amplifier latency, analog-digital conversion delay, etc.).

Illumination driver 133 generates a pulse electrical current signal 145 in response to pulse firing signal 146. Pulsed light emitting device 134 generates pulsed light emission 136 in response to pulsed electrical current signal 145. The illumination light 136 is focused and projected onto a particular location in the surrounding environment by one or more optical elements of the LIDAR system (not shown).

In some embodiments, the pulsed light emitting device is laser based (e.g., laser diode). In some embodiments, the pulsed illumination sources are based on one or more light emitting diodes. In general, any suitable pulsed illumination source may be contemplated.

As depicted in FIG. 10, return light 137 reflected from the surrounding environment is detected by light detector 138. In some embodiments, light detector 138 is an avalanche photodiode. Light detector 138 generates an output signal 147 that is amplified by signal conditioning electronics 139. In some embodiments, signal conditioning electronics 139 includes an analog trans-impedance amplifier. However, in general, the amplification of output signal 147 may include multiple, amplifier stages. In this sense, an analog trans-impedance amplifier is provided by way of non-limiting example, as many other analog signal amplification schemes may be contemplated within the scope of this patent document.

The amplified signal is communicated to A/D converter 140. The digital signals are communicated to controller 132. Controller 132 generates an enable/disable signal employed to control the timing of data acquisition by ADC 140 in concert with pulse firing signal 146.

As depicted in FIG. 10, the illumination light 136 emitted from integrated LIDAR measurement device 130 and the return light 137 directed toward integrated LIDAR measurement device share a common path. In the embodiment depicted in FIG. 10, the return light 137 is separated from the illumination light 136 by a polarizing beam splitter (PBS) 135. PBS 135 could also be a non-polarizing beam splitter, but this generally would result in an additional loss of light. In this embodiment, the light emitted from pulsed light emitting device 134 is polarized such that the illumination light passes through PBS 135. However, return light 137 generally includes a mix of polarizations. Thus, PBS 135 directs a portion of the return light toward detector 138 and a portion of the return light toward pulsed light emitting device 134. In some embodiments, it is desirable to include a quarter waveplate after PBS 135. This is advantageous in situations when the polarization of the return light is not significantly changed by its interaction with the environment. Without the quarter waveplate, the majority of the return light would pass through PBS 135 and be directed toward the pulsed light emitting device 134, which is undesirable. However, with the quarter waveplate, the majority of the return light will pass through PBS 135 and be directed toward detector 138.

In general, a multiple pixel 3-D LIDAR system includes a plurality of LIDAR measurement channels. In some embodiments, a multiple pixel 3-D LIDAR system includes a plurality of integrated LIDAR measurement devices each emitting a pulsed beam of illumination light from the LIDAR device into the surrounding environment and measuring return light reflected from objects in the surrounding environment.

In some embodiments, digital I/O 131, timing logic 132, A/D conversion electronics 140, and signal conditioning electronics 139 are integrated onto a single, silicon-based microelectronic chip. In another embodiment these same elements are integrated into a single gallium-nitride or silicon based circuit that also includes the illumination driver. In some embodiments, the A/D conversion electronics and controller 132 are combined as a time-to-digital converter.

In some embodiments, the time of flight signal analysis is performed by controller 132, entirely. In these embodiments, signals 143 communicated from integrated LIDAR measurement device 130 include an indication of the distances determined by controller 132. In some embodiments, signals 143 include the digital signals 148 generated by A/D converter 140. These raw measurement signals are processed further by one or more processors located on board the 3-D LIDAR system, or external to the 3-D LIDAR system to arrive at a measurement of distance. In some embodiments, controller 132 performs preliminary signal processing steps on signals 148 and signals 143 include processed data that is further processed by one or more processors located on board the 3-D LIDAR system, or external to the 3-D LIDAR system to arrive at a measurement of distance.

In some embodiments a 3-D LIDAR system includes multiple integrated LIDAR measurement devices. In some embodiments, a delay time is set between the firing of each integrated LIDAR measurement device. Signal 142 includes an indication of the delay time associated with the firing of integrated LIDAR measurement device 130. In some examples, the delay time is greater than the time of flight of the measurement pulse sequence to and from an object located at the maximum range of the LIDAR device. In this manner, there is no cross-talk among any of the integrated LIDAR measurement devices. In some other examples, a measurement pulse is emitted from one integrated LIDAR measurement device before a measurement pulse emitted from another integrated LIDAR measurement device has had time to return to the LIDAR device. In these embodiments, care is taken to ensure that there is sufficient spatial separation between the areas of the surrounding environment interrogated by each beam to avoid cross-talk.

Figure 11:
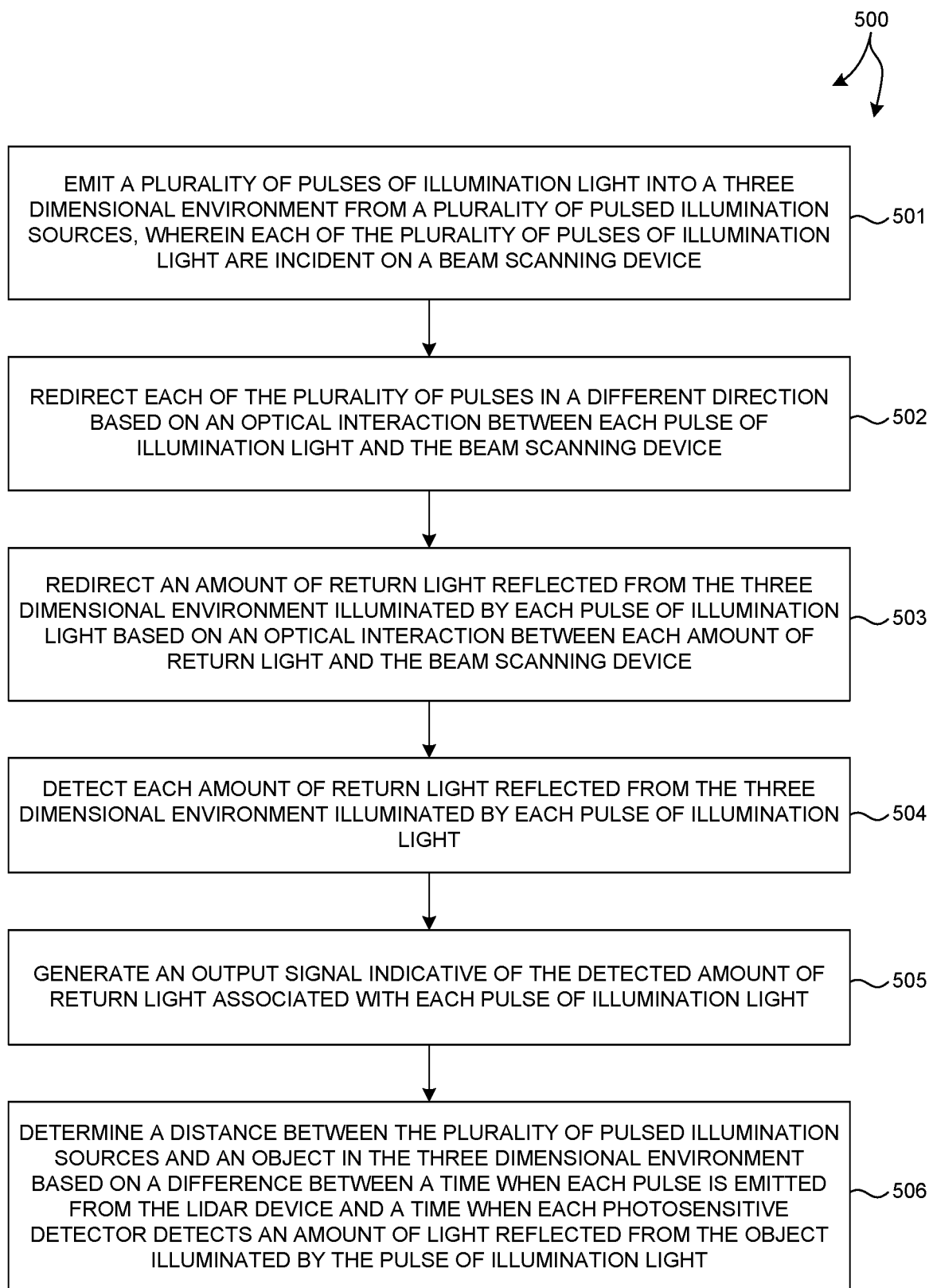
FIG. 11 depicts a flowchart illustrative of a method 500 of performing multiple LIDAR measurements based on scanning measurement beams in at least one novel aspect.

FIG. 11 illustrates a flowchart of a method 500 suitable for implementation by a LIDAR system as described herein. In some embodiments, LIDAR system 100 is operable in accordance with method 500 illustrated in FIG. 11. However, in general, the execution of method 500 is not limited to the embodiments of LIDAR system 100 described with reference to FIG. 1. These illustrations and corresponding explanation are provided by way of example as many other embodiments and operational examples may be contemplated.

In block 501, a plurality of pulses of illumination light are emitted into a 3-D environment from a plurality of pulsed illumination sources. Each of the plurality of pulses of illumination light are incident on a beam scanning device.

In block 502, each of the plurality of pulses is redirected in a different direction based on an optical interaction between each pulse of illumination light and the beam scanning device.

In block 503, an amount of return light reflected from the 3-D environment illuminated by each pulse of illumination light is redirected based on an optical interaction between each amount of return light and the beam scanning device.

In block 504, each amount of return light reflected from the 3-D environment illuminated by each pulse of illumination light is detected (e.g., by a photosensitive detector).

In block 505, an output signal indicative of the detected amount of return light associated with each pulse of illumination light is generated.

In block 506, a distance between the plurality of pulsed illumination sources and an object in the 3-D environment is determined based on a difference between a time when each pulse is emitted from the LIDAR device and a time when each photosensitive detector detects an amount of light reflected from the object illuminated by the pulse of illumination light.

Master controller 190 or any external computing system may include, but is not limited to, a personal computer system, mainframe computer system, workstation, image computer, parallel processor, or any other device known in the art. In general, the term "computing system" may be broadly defined to encompass any device having one or more processors, which execute instructions from a memory medium.

Program instructions 192 implementing methods such as those described herein may be transmitted over a transmission medium such as a wire, cable, or wireless transmission link. For example, as illustrated in FIG. 1, program instructions 192 stored in memory 191 are transmitted to processor 195 over bus 194. Program instructions 192 are stored in a computer readable medium (e.g., memory 191). Exemplary computer-readable media include read-only memory, a random access memory, a magnetic or optical disk, or a magnetic tape.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A light detection and ranging (LIDAR) device comprising:
   a plurality of illumination sources arranged in a two-dimensional array, each of the plurality of illumination sources configured to emit a respective beam of illumination light from the LIDAR device into a three-dimensional (3-D) environment;
   a plurality of photosensitive detectors, each of the plurality of photosensitive detectors configured to detect an amount of return light reflected from the 3-D environment when illuminated by the beams of illumination light; and a beam scanning device disposed in an optical path of the plurality of illumination sources and configured to redirect the beams of illumination light with respect to the plurality of illumination sources such that the beams of illumination light simultaneously illuminate different portions of the 3-D environment, wherein the plurality of illumination sources is disposed on a plane parallel to an axis of rotation of the beam scanning device.

2. The LIDAR device of claim 1, wherein the plurality of illumination sources and the plurality of photosensitive detectors are stationary and wherein the beam scanning device includes an optical element that is actuated relative to the plurality of illumination sources and the plurality of photosensitive detectors.

3. The LIDAR device of claim 1, further comprising:
a beam shaping optical element disposed in the optical path between the plurality of illumination sources and the beam scanning device.

4. The LIDAR device of claim 1, wherein a first portion of the 3-D environment scanned by the respective beam of illumination light from a first illumination source of the plurality of illumination sources partially spatially overlaps a second portion of the 3-D environment scanned by the respective beam of illumination light from a second illumination source of the plurality of illumination sources.

5. The LIDAR device of claim 1, wherein the beam scanning device includes a mirror element and an actuator configured to rotate the mirror element about the axis of rotation.

6. The LIDAR device of claim 5, wherein the mirror element is rotated about the axis of rotation with an oscillatory angular velocity.

7. The LIDAR device of claim 1, further comprising a second plurality of illumination sources disposed in an another plane parallel to the axis of rotation.

8. The LIDAR device of claim 1, wherein the beam scanning device includes a beam shaping optical element.

9. The LIDAR device of claim 8, wherein the beam scanning device further includes a first actuator configured to translate the beam shaping optical element in a first direction parallel to an optical plane of the beam shaping optical element.

10. The LIDAR device of claim 9, further comprising:
a second actuator configured to translate the plurality of illumination sources in a second direction parallel to the optical plane of the beam shaping optical element, wherein the first and second directions are different directions.

11. The LIDAR device of claim 10, wherein the first direction is perpendicular to the second direction.

12. The LIDAR device of claim 1, wherein the beam scanning device is configured to redirect light from one or more of the plurality of illumination sources in response to a command signal generated by a computing system.

13. The LIDAR device of claim 1, further comprising:
a computing system configured to determine a distance between the LIDAR device and an object in the 3-D environment based on the amount of return light detected by one or more of the plurality of photosensitive detectors.

14. The LIDAR device of claim 13, wherein the computing system is configured to determine the distance between the LIDAR device and an object in the 3-D environment by measuring a difference between a first time when illumination light is emitted from one or more of the plurality of illumination sources and second time when return light is detected by one or more of the plurality of photosensitive detectors.

15. The LIDAR device of claim 1, further comprising:
a non-transient computer-readable medium including instructions, which when executed by a computing system, cause the computing system to determine a distance between the LIDAR device and an object in the 3-D environment based on the amount of return light detected by one or more of the plurality of photosensitive detectors.

16. The LIDAR device of claim 1, further comprising an overmold lens with a conical cavity surrounding an active area of the plurality of photosensitive detectors.

17. The LIDAR device of claim 1, wherein the beam scanning device and the plurality of illumination sources are configured to move relative to one another along mutually orthogonal directions.

18. The LIDAR device of claim 1, wherein the plurality of illumination sources comprises at least one illumination source that is not in a co-linear configuration with at least two other illumination sources in the plurality of illumination sources.

19. A method comprising:
emitting respective beams of illumination light from a plurality of illumination sources arranged in a two-dimensional array into a three-dimensional (3-D) environment;
redirecting the beams of illumination light from the plurality of illumination sources using a beam scanning device disposed in an optical path of the plurality of illumination sources such that the beams of illumination light simultaneously illuminate different portions of the 3-D environment, wherein the plurality of illumination sources is disposed on plane parallel to an axis of rotation of the beam scanning device;
detecting an amount of return light reflected from the 3-D environment illuminated by the beams of illumination light; and
generating an output indicative of the detected amount of return light.

20. The method of claim 19, further comprising:
processing the output to determine a distance between the plurality of illumination sources and an object in the 3-D environment.

21. The method of claim 20, wherein processing the output to determine the distance between the plurality of illumination sources and the object in the 3-D environment includes:
measuring a difference between a first time when a particular beam of illumination light is emitted and a second time when return light reflected from a particular portion of the 3-D environment illuminated by the particular beam of illumination light is detected.

22. The method of claim 19, further comprising:
redirecting the return light using the beam scanning device before detecting the amount of return light.

23. The method of claim 19, wherein redirecting the beams of illumination light includes: causing an actuator to move an optical element relative to the plurality of illumination sources.

24. The method of claim 23, wherein the optical element is a mirror and wherein causing the actuator to move the mirror includes causing the actuator to rotate the mirror about the axis of rotation.

25. The method of claim 24, wherein the optical element is a beam shaping optical element and wherein the causing the actuator to move the beam shaping optical element includes causing the actuator to translate the beam shaping optical element in a direction parallel to an optical plane of the beam shaping optical element.

* * * * *